United States Patent
Nakano et al.

(10) Patent No.: US 11,367,907 B2
(45) Date of Patent: Jun. 21, 2022

(54) BATTERY PACK AND ELECTRIC APPARATUS USING BATTERY PACK

(71) Applicant: Koki Holdings Co., Ltd., Tokyo (JP)

(72) Inventors: Yasushi Nakano, Ibaraki (JP); Satoshi Yamaguchi, Ibaraki (JP); Hiroyuki Hanawa, Ibaraki (JP); Kazuhiko Funabashi, Ibaraki (JP); Tomomasa Nishikawa, Ibaraki (JP); Shota Kanno, Ibaraki (JP); Toshio Mizoguchi, Ibaraki (JP); Takuya Teranishi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 248 days.

(21) Appl. No.: 16/622,283

(22) PCT Filed: May 30, 2018

(86) PCT No.: PCT/JP2018/020633
§ 371 (c)(1),
(2) Date: Dec. 12, 2019

(87) PCT Pub. No.: WO2018/230337
PCT Pub. Date: Dec. 20, 2018

(65) Prior Publication Data
US 2020/0212505 A1 Jul. 2, 2020

(30) Foreign Application Priority Data

Jun. 16, 2017 (JP) .............................. JP2017-118574
Jun. 16, 2017 (JP) .............................. JP2017-118575

(51) Int. Cl.
*H01M 50/20* (2021.01)
*H01M 10/42* (2006.01)
(Continued)

(52) U.S. Cl.
CPC ............. *H01M 10/425* (2013.01); *B25F 5/02* (2013.01); *H01M 10/0525* (2013.01);
(Continued)

(58) Field of Classification Search
CPC ... H01M 10/425; H01M 50/20; H01M 10/482
See application file for complete search history.

(56) References Cited

U.S. PATENT DOCUMENTS

| 1,957,831 A | 9/1990 | Meredith et al. |
| 2004/0101744 A1 | 5/2004 | Suzuki |

(Continued)

FOREIGN PATENT DOCUMENTS

| EP | 3113912 | 1/2017 |
| JP | 2003111284 | 4/2003 |

(Continued)

OTHER PUBLICATIONS

"Office Action of New Zealand Counterpart Application", dated May 19, 2020, p. 1-p. 2.

(Continued)

*Primary Examiner* — Olatunji A Godo
(74) *Attorney, Agent, or Firm* — JCIPRNET

(57) ABSTRACT

A battery pack includes cell units in which upper and lower battery cells are connected in series, wherein an output of series-connection and an output of parallel-connection can be switched. The cell units are respectively provided with protection circuit ICs for monitoring the state of the battery cells, and only the protection circuit on the lower cell unit side is provided with a controller 350 including a microcomputer. To adjust the power consumption for the microcomputer only provided in the lower cell unit, the circuit on the upper cell unit side is provided with a current consumption control means including dummy loads. The current consumption control means is operated in conjunction with the start-up of the microcomputer in the controller so as to equalize power consumption on the upper cell unit side and the lower cell unit side.

16 Claims, 29 Drawing Sheets

(51) Int. Cl.
  *B25F 5/02* (2006.01)
  *H01M 10/0525* (2010.01)
  *H01M 10/48* (2006.01)
  *H02H 7/18* (2006.01)
  *B25B 21/02* (2006.01)

(52) U.S. Cl.
  CPC ......... *H01M 10/482* (2013.01); *H01M 50/20* (2021.01); *H02H 7/18* (2013.01); *B25B 21/02* (2013.01); *H01M 2010/4271* (2013.01); *H01M 2220/30* (2013.01)

(56) References Cited

U.S. PATENT DOCUMENTS

| | | | |
|---|---|---|---|
| 2012/0253716 A1* | 10/2012 | Tsuchiya | B60L 3/0046 702/63 |
| 2014/0009857 A1 | 1/2014 | Suzuki | |
| 2016/0126533 A1 | 5/2016 | Velderman et al. | |

FOREIGN PATENT DOCUMENTS

| | | |
|---|---|---|
| JP | 2007229827 | 9/2007 |
| JP | 2011161602 | 8/2011 |
| JP | 2011526217 | 10/2011 |
| JP | 2014017954 | 1/2014 |
| WO | 2015166907 | 11/2015 |

OTHER PUBLICATIONS

"International Search Report (Form PCT/ISA/210) of PCT/JP2018/020633," dated Jul. 17, 2018, with English translation thereof, pp. 1-4.

Office Action of Canadian Counterpart Application, dated Apr. 16, 2021, pp. 1-6.

Office Action of Australian Counterpart Application, dated Sep. 6, 2021, pp. 1-4.

"Search Report of Europe Counterpart Application", dated Feb. 23, 2021, pp. 1-8.

"Office Action of Japan Counterpart Application" with English translation thereof, dated Mar. 8, 2022, p. 1-p. 6.

* cited by examiner

| | | INPUT OUTPUT PORT | | | | |
|---|---|---|---|---|---|---|
| | | IO0 | IO1 | IO2 | IO3 | |
| LIGHTING STATE OF LED | LD/TH OFF | HZ | HZ | HZ | HZ | 353a |
| | LD0:ON | L | HZ | HZ | HZ | |
| | LD0,1:ON | L | L | HZ | HZ | |
| | LD0,1,2 ON | L | L | L | HZ | |
| | LD0,1,2,3 ON | L | L | L | L | |
| DETECTION | TH1 DETECTION | H | H | L | L | 353b |
| | TH2 DETECTION | H | L | H | L | |
| | DETECTION OF POSITIVE VOLTAGE | H | L | L | H | |

H=VDD
L=GND
HZ=High impedance (1)

(2)

BATTERY PACK AND ELECTRIC APPARATUS USING BATTERY PACK

CROSS-REFERENCE TO RELATED APPLICATION

This application is a 371 application of the International PCT application serial no. PCT/JP2018/020633, filed on May 30, 2018, which claims the priority benefits of Japan Patent Application No. 2017-118574, filed on Jun. 16, 2017 and Japan Patent Application No. 2017-118575, filed on Jun. 16, 2017. The entirety of each of the above-mentioned patent applications is hereby incorporated by reference herein and made a part of this specification.

TECHNICAL FIELD

The present disclosure relates to an electric apparatus such as a motor or lighting having a load, and a battery pack supplying power to such an electric apparatus.

BACKGROUND ART

Electric apparatuses such as power tools are driven by battery packs using secondary batteries such as lithium ion batteries, and therefore cordless electric apparatuses have been devised. For example, a battery pack accommodating a plurality of secondary battery cells is used in handheld power tools in which a tip tool is driven by a motor, and the motor is driven by electric energy stored in the battery pack. The battery pack is configured to be attachable to and detachable from a power tool main body. When a voltage drops due to discharging, the battery pack is detached from the power tool main body and is charged using an external charging device.

Cordless power tools and electric apparatuses need to maintain a predetermined operation time and to maintain a predetermined output, and therefore higher outputs and higher voltages have been achieved as performance of secondary batteries has improved. In addition, as electric apparatuses using battery packs as a power source have been developed, battery packs using various voltages have become commercialized. In general, battery packs have a fixed output voltage. However, Patent Literature 1 proposes a power source device for an electric apparatus, in which a plurality of battery units are provided inside a housing accommodating batteries and which can select an output in series-connection or an output in parallel-connection using a connection means so that the device can support apparatuses using different voltages.

CITATION LIST

Patent Literature

[Patent Literature 1]
  Japanese Patent Laid-Open No. 2014-17954

SUMMARY OF INVENTION

Technical Problem

It is troublesome for a user to prepare a plurality of kinds of battery packs when using a plurality of electric apparatuses, and therefore it is desired to realize a convenient battery pack that supports electric apparatuses using different voltages by switching the voltage. Furthermore, instead of a power source device that is separate from an electric apparatus main body as in Patent Literature 1, it has been desired to realize voltage switchable battery packs that can be easily mounted in electric apparatuses.

According to the present disclosure, there are provided a battery pack capable of switching an output voltage so that it can be shared between electric apparatuses using different voltages, and an electric apparatus using the battery pack.

In addition, according to an aspect of the present disclosure, there is provided a battery pack that can be mounted in an electric apparatus main body. The battery pack can switch a connection state of a plurality of cell units.

In addition, according to the aspect of the present disclosure, there is provided a battery pack including a controller that can control discharging or charging of the battery pack while monitoring the state of the plurality of cell units.

In addition, according to the aspect of the present disclosure, there is provided a battery pack in which discharging or charging of the battery pack can be stably controlled regardless of the connection state of the plurality of cell units.

According to another aspect of the present disclosure, there are provided a battery pack that balances consumption currents of a plurality of cell units included in the battery pack that is switchable between output voltages such as a high voltage and a low voltage, and an electric apparatus using the battery pack.

According to still another aspect of the present disclosure, there is provided a battery pack in which a microcomputer is provided in any one of battery cell protection circuits provided in a plurality of cell units.

According to still another aspect of the present disclosure, there is provided a battery pack that can efficiently draw out capability of an electric apparatus.

According to still another aspect of the present disclosure, there is provided a high-function battery pack.

According to still another aspect of the present disclosure, there is provided a battery pack having a terminal structure that can be favorably fitted into a connection terminal on an electric apparatus main body side.

Solution to Problem

The following is description of representative features of the disclosure disclosed in this application.

A feature of the battery pack according to a first aspect of the disclosure is as follows.

There is provided a battery pack including at least first and second cell units as cell units in which a plurality of battery cells are connected in series. The cell units are configured to be switched between a series-connection state in which the first and second cell units are connected to each other in series while the first cell unit is connected to a higher voltage side than the second cell unit and a connection state other than the series-connection state. The battery pack includes a controller that is directly or indirectly connected to the first and second cell units and is configured to monitor a state of the battery cells constituting the first cell unit and a state of the battery cells constituting the second cell unit and to be able to output a control signal for controlling discharging of the battery pack; a power source circuit that is connected to the controller and is configured to be able to supply a power source voltage to the controller; and a casing that accommodates the first cell unit, the second cell unit, the controller, and the power source circuit and is configured to be able to connect the battery pack to an electric apparatus main body. The power source circuit is configured to be connected to one cell unit of the first and second cell units, the controller is configured to be connected to the power source circuit and a negative electrode of the one cell unit, and the power source circuit is configured to generate the power source voltage from a voltage input from the one cell unit and to supply the power source voltage to the controller.

According to the first aspect of the disclosure, it is possible to provide a battery pack that can be mounted in an electric apparatus main body. The battery pack can switch a connection state of a plurality of cell units. In addition, it is possible to provide a battery pack including the controller that can control discharging of the battery pack while monitoring the state of the plurality of cell units. Moreover, it is possible to provide a battery pack in which discharging of the battery pack can be stably controlled regardless of the connection state of the plurality of cell units because a circuit for supplying a power source voltage to the controller is closed in one cell unit.

A feature of the battery pack according to a second aspect of the disclosure is as follows.

The battery pack includes a first protection circuit that is connected to the first cell unit and monitors a state of the battery cells constituting the first cell unit and a second protection circuit that is connected to the second cell unit and monitors a state of the battery cells constituting the second cell unit. The controller is configured to be connected to the first and second protection circuits and is configured to be able to monitor the state of the battery cells constituting the first cell unit via the first protection circuit and to monitor the state of the battery cells constituting the second cell unit via the second protection circuit.

A feature of the battery pack according to a third aspect of the disclosure is as follows.

In the battery pack, the power source circuit is configured to be connected to the second cell unit as the one cell unit such that the power source voltage is supplied from the second cell unit to the controller via the power source circuit.

A feature of the battery pack according to a fourth aspect of the disclosure is as follows.

The battery pack has a signal terminal that is configured to be able to be connected to the electric apparatus main body, and the control signal output from the controller is configured to be output to the electric apparatus main body via the signal terminal.

A feature of the battery pack according to a fifth aspect of the disclosure is as follows.

In the battery pack, a consumption current controller is connected to the other cell unit of the first and second cell units, and the consumption current controller is configured to consume power having substantially the same magnitude as power consumed by the controller.

A feature of the battery pack according to a sixth aspect of the disclosure is as follows.

In the battery pack, the consumption current controller is configured to also consume power when the controller consumes power.

A feature of the battery pack according to a seventh aspect of the disclosure is as follows.

The battery pack has a detection unit that is connected to the controller, and the detection unit is configured to detect a physical quantity related to the battery pack or the electric apparatus main body connected to the battery pack and to be able to output information of the physical quantity to the controller.

A feature of the battery pack according to an eighth aspect of the disclosure is as follows.

The battery pack has a first voltage detection unit as the detection unit connecting the other cell unit of the first and second cell units and the controller to each other, and the first voltage detection unit is configured to output information of a voltage of the first cell unit to the controller as the physical quantity.

A feature of the battery pack according to a ninth aspect of the disclosure is as follows.

In the battery pack, the controller is configured to control discharging or charging of the battery pack depending on whether the battery pack is in the series-connection state or a connection state other than the series-connection state.

A feature of the battery pack according to a tenth aspect of the disclosure is as follows.

The battery pack has a current detection unit as the detection unit for detecting a current flowing in at least one battery cell of the plurality of battery cells constituting the first and second cell units, and the current detection unit is configured to output information of a current flowing in the battery cell to the controller as the physical quantity.

A feature of the battery pack according to an eleventh aspect of the disclosure is as follows.

The battery pack has a temperature detection unit as the detection unit for detecting a temperature of at least one battery cell of the plurality of battery cells constituting the first and second cell units, and the temperature detection unit is configured to output information of the temperature of the battery cell to the controller as the physical quantity.

A feature of the battery pack according to a twelfth aspect of the disclosure is as follows.

The battery pack has a second voltage detection unit as the detection unit configured to be able to be connected to a terminal of the electric apparatus main body, and the second voltage detection unit is configured to output information of a voltage input from the terminal of the electric apparatus main body to the controller as the physical quantity.

A feature of the battery pack according to a thirteenth aspect of the disclosure is as follows.

In the battery pack, the controller is configured to change a condition for overload protection in accordance with a kind of the electric apparatus main body.

A feature of the electric apparatus according to a fourteenth aspect of the disclosure is as follows.

There is provided an electric apparatus including the battery pack, and at least a first electric apparatus main body as an electric apparatus main body that is able to be connected to the battery pack. When the battery pack is connected to the first electric apparatus main body, the battery pack is in a series-connection state in which the first and second cell units are connected to each other in series. A second electric apparatus main body has a parallel-connection circuit connecting the first and second cell units to each other in parallel. When the battery pack is connected to the second electric apparatus main body, the battery pack is in a parallel-connection state, and when the battery pack is not connected to the first electric apparatus main body, the battery pack is in a non-connection state in which the first and second cell units are electrically independent from each other.

A feature of the battery pack according to a fifteenth aspect of the disclosure is as follows.

There is provided the battery pack including a plurality of cell units in which a plurality of battery cells are connected in series. The cell units are switchable between an output of series-connection and an output of parallel-connection. A protection circuit that monitors a state of the battery cells is provided for every cell unit. A microcomputer to which signals of a plurality of protection circuits are input such that all the battery packs are monitored is provided in the protection circuit that is provided in the cell unit of the plurality of cell units in a lowermost stage connected to a ground side at a time of series-connection. In addition, a power source circuit that generates power for driving the microcomputer is provided, and the power source circuit generates the power from an output of the cell unit in the lowermost stage that becomes close to the ground side at the time of series-connection. There are two cell units constituted of an upper stage cell unit (first cell unit) that is disposed on a side close to a positive electrode terminal at the time of series-connection and a lower stage cell unit (second cell unit) that is disposed on a side close to a negative electrode terminal. When the battery pack is mounted in the electric apparatus main body, a connection form of the upper stage cell unit and the lower stage cell unit is set to any one of series-connection and parallel-connection.

According to another feature of the present disclosure, the battery pack has the signal terminal for sending out a stoppage signal (discharging stoppage signal) to the electric apparatus main body. When an output of an abnormality is detected from any of the plurality of protection circuits, the microcomputer outputs a stoppage signal for stopping an operation of a motor of the connected electric apparatus main body. In addition, the protection circuit connected to the upper stage cell unit is configured to serve as a battery protection IC (integrated circuit) which individually monitors voltages between terminals of the battery cells included in the upper stage cell unit, and the protection circuit connected to the lower stage cell unit is configured to serve as a battery management IC in which a function of a protection circuit IC and a microcomputer are integrated in one chip. Here, an adjustment circuit for balancing total power consumption of the protection circuit including the microcomputer in the lower stage cell unit and power consumption of the protection circuit in the upper stage cell unit is provided, such that power consumption of the protection circuits becomes uniform. The adjustment circuit has a dummy load for consuming power as much as that consumed by the microcomputer. Here, the adjustment circuit is provided in a circuit on the upper stage cell unit side where the microcomputer is not provided.

According to still another feature of the present disclosure, the microcomputer has a sleep function in which power is turned off by itself when not in operation, and the adjustment circuit includes a circuit for causing the protection circuit on the upper stage cell unit side to be in a sleep state when the microcomputer is in a sleep mode. Moreover, the protection circuit has a voltage balance adjusting function of balancing voltages at both ends of the plurality of cells. Two sets of positive electrode terminal and negative electrode terminal are provided independently in the battery pack. The upper stage cell unit is connected to the positive electrode terminal and the negative electrode terminal of one set, and the lower stage cell unit is connected to the positive electrode terminal and the negative electrode terminal of the other set. When the battery pack is connected to a high-voltage electric apparatus main body, the upper stage cell unit and the lower stage cell unit are in the series-connection state. When the battery pack is connected to a low-voltage electric apparatus main body, the upper stage cell unit and the lower stage cell unit are in the parallel-connection state. When the battery pack is not mounted in a different apparatus, power lines of the upper stage cell unit and the lower stage cell unit are in a separated state.

According to still another feature of the present disclosure, the battery pack in which an output voltage is switched by changing two cell units between series-connection and parallel-connection, is provided with the first protection circuit that monitors the state of the battery cells in the first cell unit on the high voltage side at the time of series-connection and the second protection circuit that monitors the state of the battery cells in the second cell unit on a low voltage side at the time of series-connection. A discharging prohibition signal or a charging prohibition signal is sent out to the connected electric apparatus main body side by monitoring the output states of the first and second protection circuits using the microcomputer. Since power for the microcomputer is generated from an output of the second cell unit by the power source circuit, power can be stably generated from the cell unit on a side where a ground potential does not change even at the time of series-connection or at the time of parallel-connection. Various electric apparatuses and power tools can be operated using the battery pack described above.

According to still another feature of the present disclosure, the battery pack has the first cell unit and the second cell unit in which a plurality of cells are connected in series. An output of series-connection or an output of parallel-connection of the first cell unit and the second cell unit are switchable depending on a connected electric apparatus main body. The microcomputer that monitors the first cell unit and the second cell unit is provided. The microcomputer determines whether an output of series-connection of the first cell unit and the second cell unit is supplied or an output of parallel-connection is supplied to the connected electric apparatus main body side and changes a condition for overload protection in accordance with a determination result. The condition for overload protection is a limit value for a current flowing in the first cell unit or the second cell unit. When the microcomputer detects that the current has exceeded the limit value, a stoppage signal for stopping an operation of the electric apparatus main body is output.

According to still another feature of the present disclosure, two sets of positive electrode terminal and negative electrode terminal are provided independently. The first cell unit is connected to the positive electrode terminal and the negative electrode terminal of one set, and the second cell unit is connected to the positive electrode terminal and the negative electrode terminal of the other set. When the battery pack is connected to a high-voltage electric apparatus main body, the first cell unit and the second cell unit are in the series-connection state. When the battery pack is connected to a low-voltage electric apparatus main body, the first cell unit and the second cell unit are in the parallel-connection state. The protection circuit that monitors the state of the battery cells is provided for every cell unit. The microcomputer that monitors the plurality of protection circuits is provided in the protection circuit of any cell unit of the plurality of cell units. The microcomputer determines whether an output of the battery pack is an output in the series-connection state or an output in the parallel-connection state by comparing the ground potential of the positive electrode in the first cell unit provided on a side close to the positive electrode terminal when the first cell unit and the second cell unit are in series-connection and the ground potential of the positive electrode in the second cell unit. The limit value (condition for overload protection) for a current is switched between when the battery pack is connected to a high-voltage electric apparatus main body and when the battery pack is connected to a low-voltage electric apparatus main body. It is favorable that the limit value for a current when the battery pack is connected to a high-voltage electric apparatus main body be larger than the limit value for a current when the battery pack is connected to a low-voltage electric apparatus main body. Only the limit value for a current when the battery pack is connected to a low-voltage electric apparatus main body may be set without setting the limit value for a current when the battery pack is connected to a high-voltage electric apparatus main body.

According to still another feature of the present disclosure, the battery pack has an LD terminal (abnormality signal terminal) for outputting a discharging stoppage signal output from the microcomputer. A semiconductor switching element is provided between the LD terminal and the ground. When a discharging stoppage signal is emitted from the microcomputer, the LD terminal is subjected to grounding by inputting the discharging stoppage signal of the microcomputer to a gate signal of the semiconductor switching element. When the battery pack is not mounted in a different apparatus, the power lines of the first cell unit and the second cell unit are in an electrically separated state. In addition, the condition for overload protection includes any one of or both an allowable upper limit temperature of the first cell unit and the second cell unit and an upper limit voltage value at the time of charging. When the microcomputer detects that the value has exceeded the upper limit value, a discharging stoppage signal for stopping an operation of the electric apparatus main body is output.

According to still another feature of the present disclosure, the protection circuit that monitors the state of the battery cells is provided in each of an upper level cell unit and a lower level cell unit. The microcomputer is provided in the protection circuit on the lower level cell unit side positioned on the ground side at the time of series-connection. The microcomputer determines whether an output in the series-connection state is supplied or an output in the parallel-connection state is supplied to the electric apparatus main body side by also inputting a signal of the protection circuit on the upper level cell unit side and comparing the potential of the positive electrode in the upper level cell unit and the potential of the positive electrode in the lower level cell unit and changes the condition for overload protection in accordance with a determination result.

Advantageous Effects of Invention

According to the present disclosure, it is possible to provide the battery pack that can be mounted in the electric apparatus main body. The battery pack can switch the connection state of the plurality of cell units. In addition, it is possible to provide the battery pack including the controller that can control discharging or charging of the battery pack while monitoring the state of the plurality of cell units. Moreover, it is possible to provide the battery pack in which discharging or charging of the battery pack can be stably controlled regardless of the connection state of the plurality of cell units.

In addition, since an appropriate output voltage can be automatically obtained by only mounting the battery pack in the electric apparatus main body without depending on a mechanical switching mechanism for switching the output voltage, the battery pack can be shared between electric apparatuses using different voltages.

In addition, since the protection circuit that monitors the state of the battery cells is provided for every cell unit, the balance of a consumption current can be adjusted for every battery cell.

Moreover, since the adjustment circuit for balancing the total power consumption of the protection circuit including the microcomputer in the lower stage cell unit and power consumption of the protection circuit in the upper stage cell unit is provided on the upper stage cell unit side, deterioration in voltage balance between the cell units can be suppressed.

In addition, since the condition for overload protection can be changed in accordance with the kind of the electric apparatus main body, it is possible to realize the battery pack in which capability of the electric apparatus can be drawn out efficiently.

Figure 7:
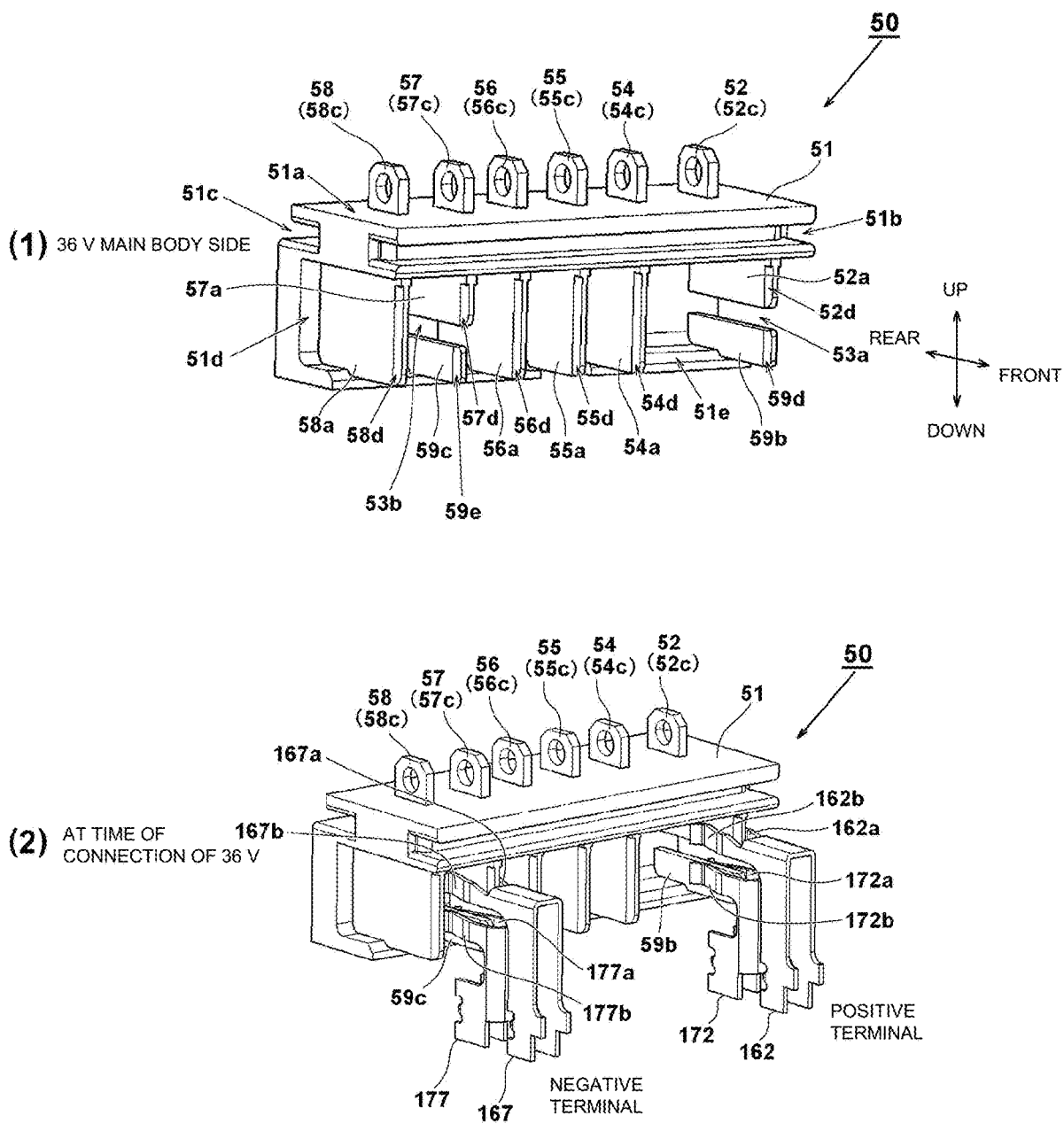

(1) of FIG. 7 is a perspective view of a terminal portion 50 of the power tool main body 30 of the present example, and (2) of FIG. 7 is a view illustrating a connection situation of the terminal portion 50 and the power terminals of the battery pack 100.

Figure 8:
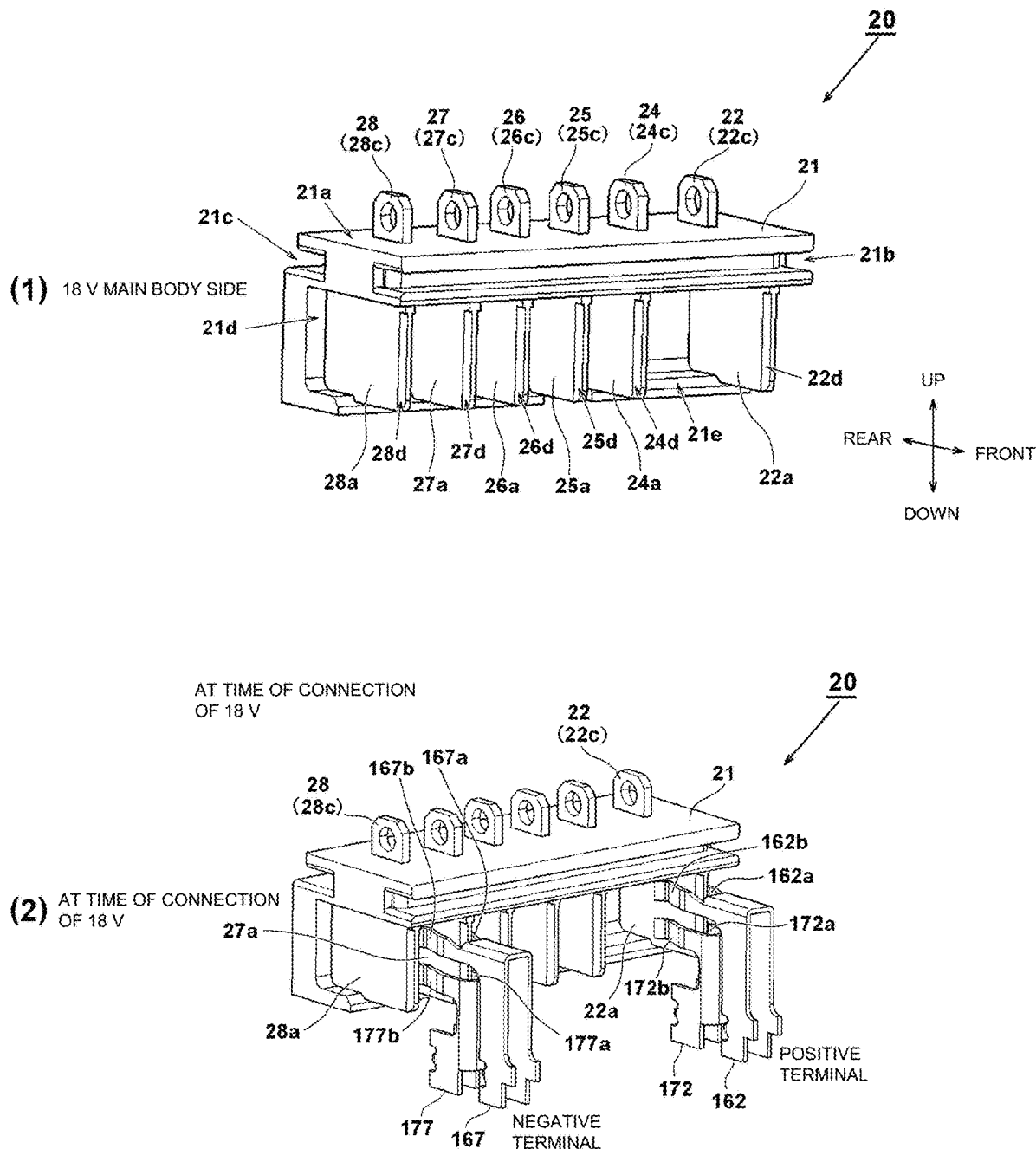

(1) of FIG. 8 is a perspective view of a terminal portion 20 of the power tool main body 1 in the related art, and (2) of FIG. 8 is a view illustrating a connection situation of the terminal portion 20 and the power terminals of the battery pack 100.

Figure 9:
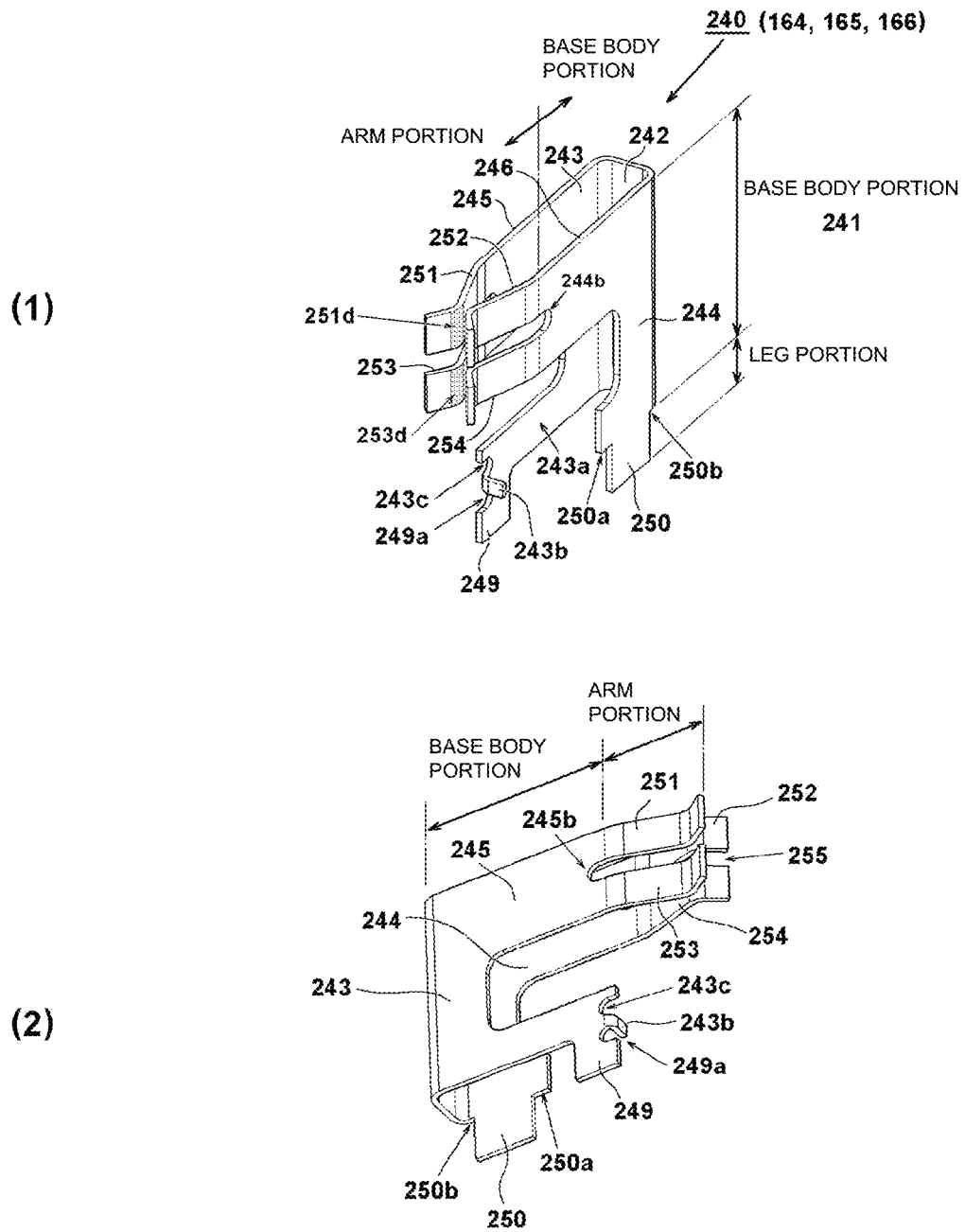

FIG. 9 is a view illustrating a shape of a single body of a signal terminal component 240 in FIG. 4, (1) of FIG. 9 is a perspective view viewed from the front on the left side, and (2) of FIG. 9 is a perspective view viewed from below on the right side.

Figure 10:
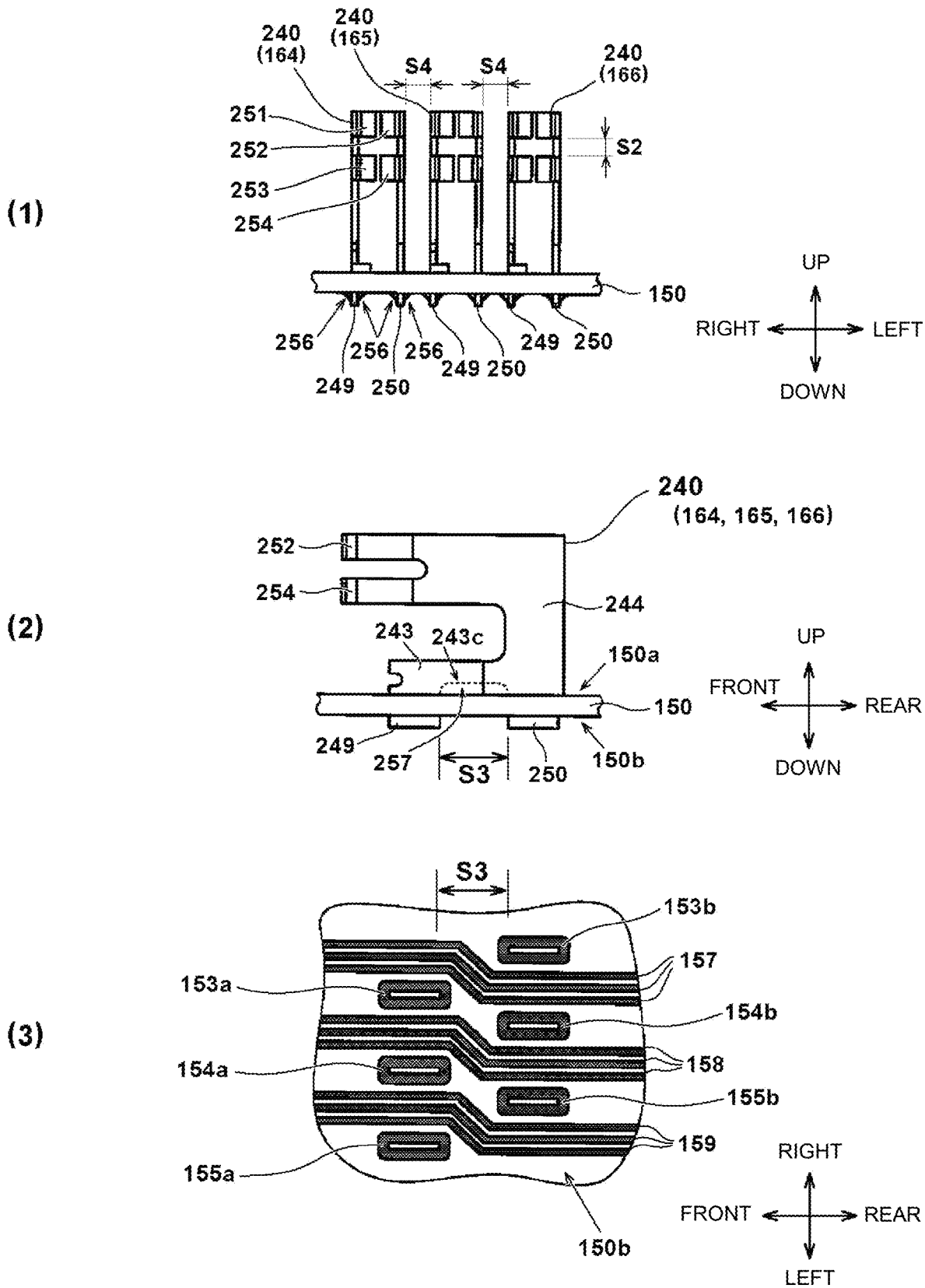

FIG. 10 is a view illustrating a situation of fixing a plurality of signal terminal components 240 to a circuit board 150, (1) of FIG. 10 is a view viewed from the front, (2) of FIG. 10 is a view of the signal terminal component 240 viewed from the left, and (3) of FIG. 10 is a bottom view of that in (1) of FIG. 10 viewed from a lower side.

Figure 4:
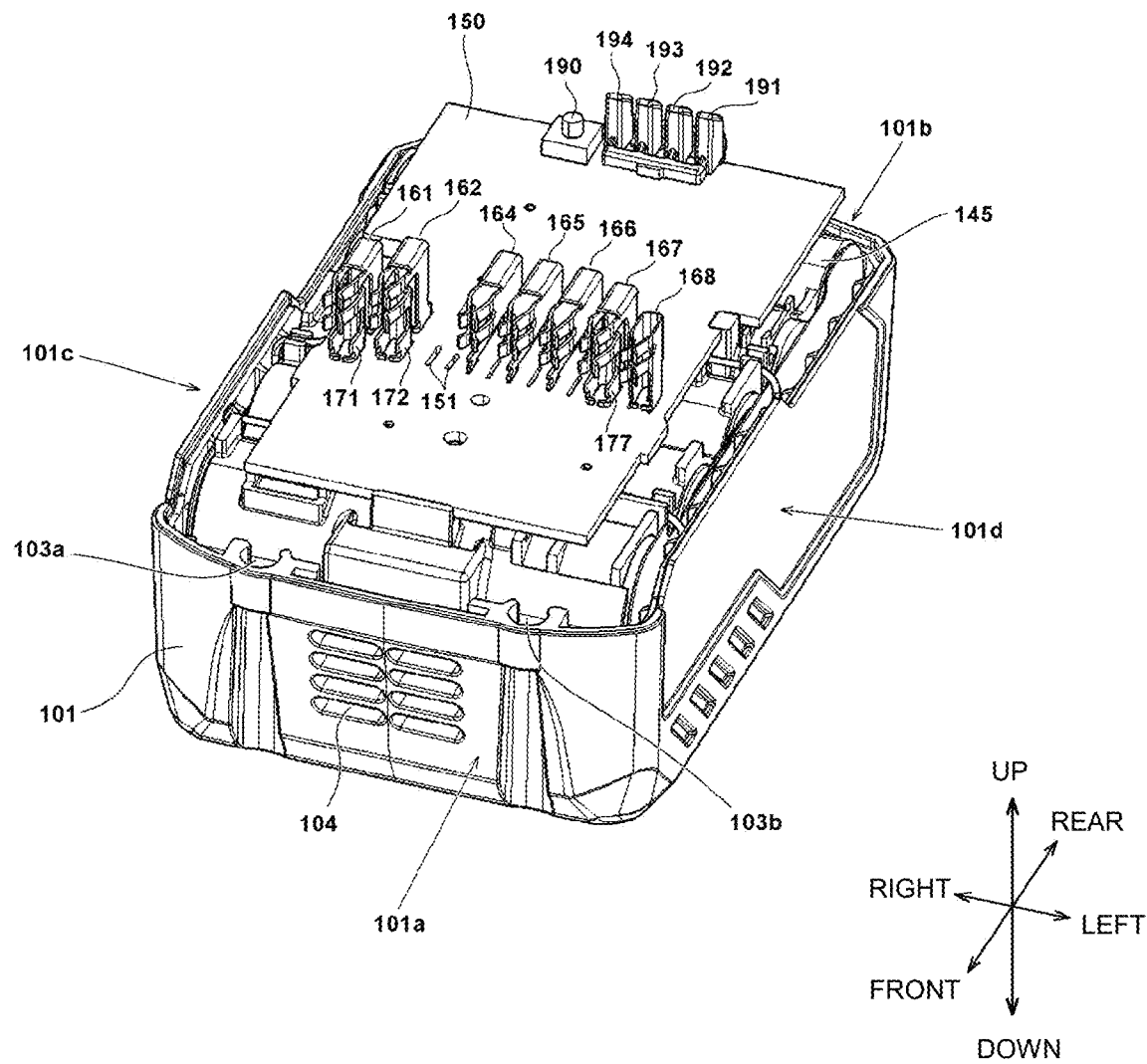
FIG. 4 is a perspective view of a state where an upper casing 110 of the battery pack 100 in FIG. 3 is detached.
Figure 11:
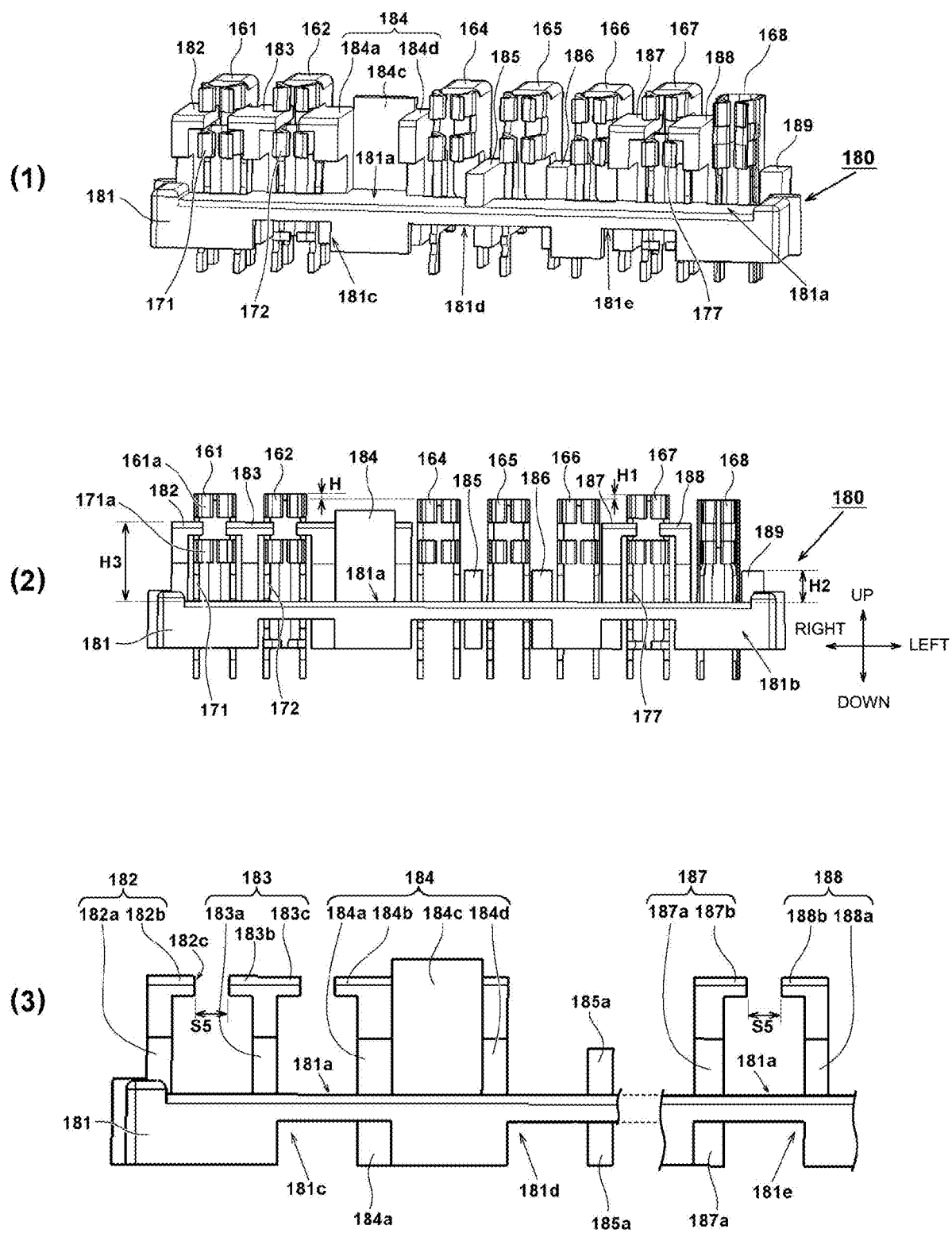

FIG. 11 is a view illustrating shapes of a connection terminal group in FIG. 4 and a board cover 180 disposed around thereof, (1) of FIG. 11 is a perspective view, (2) of FIG. 11 is a front view, and (3) of FIG. 11 is an enlarged view of a part of the board cover 180 in (2) of FIG. 11.

Figure 3:
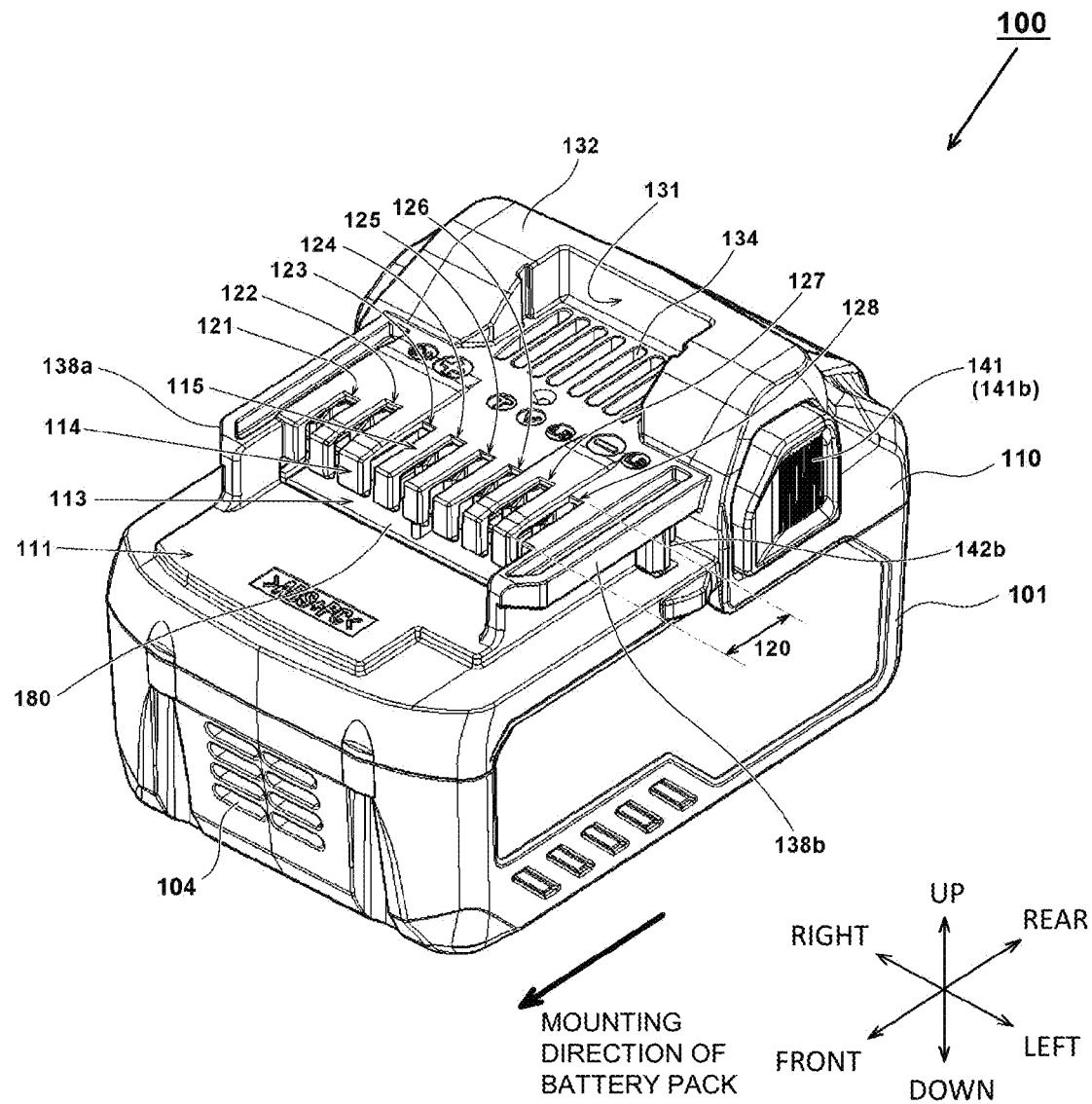
FIG. 3 is a perspective view of a battery pack 100 according to an example of the present disclosure.
Figure 12:
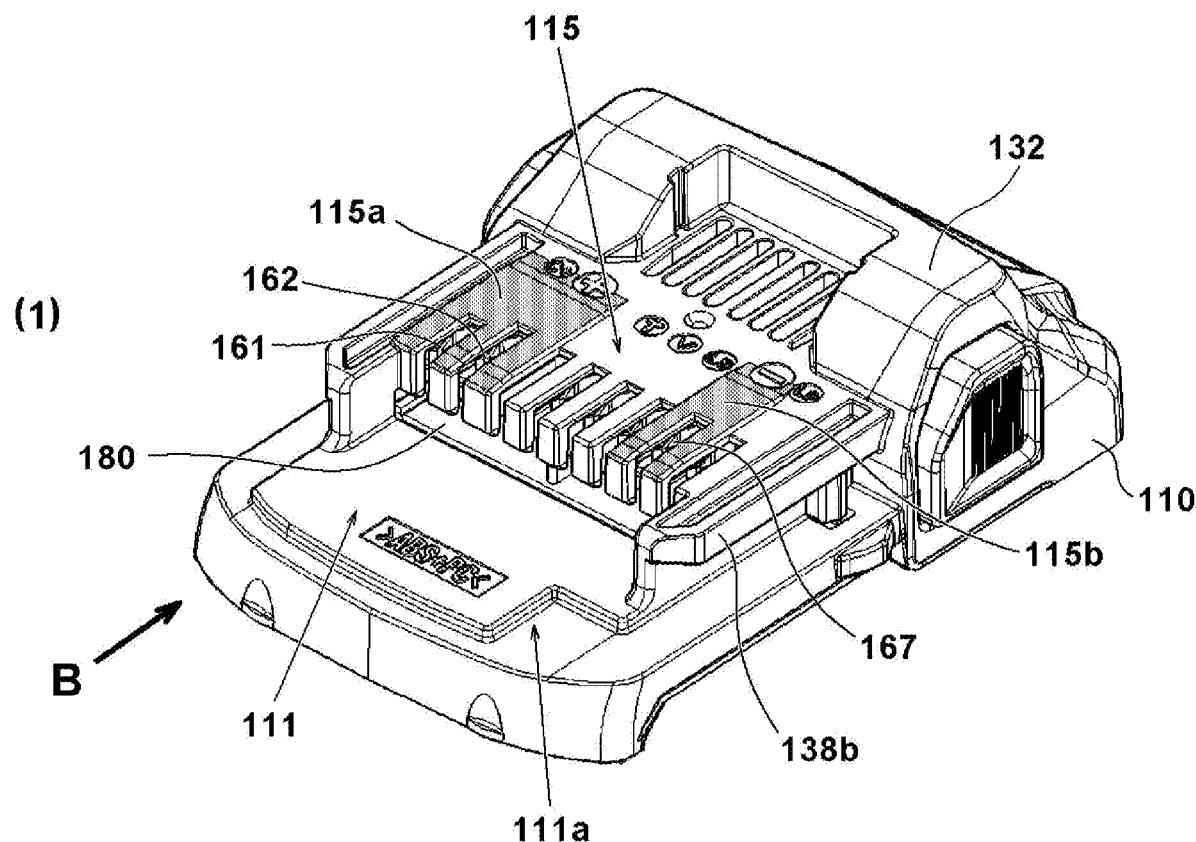
Figure 12:
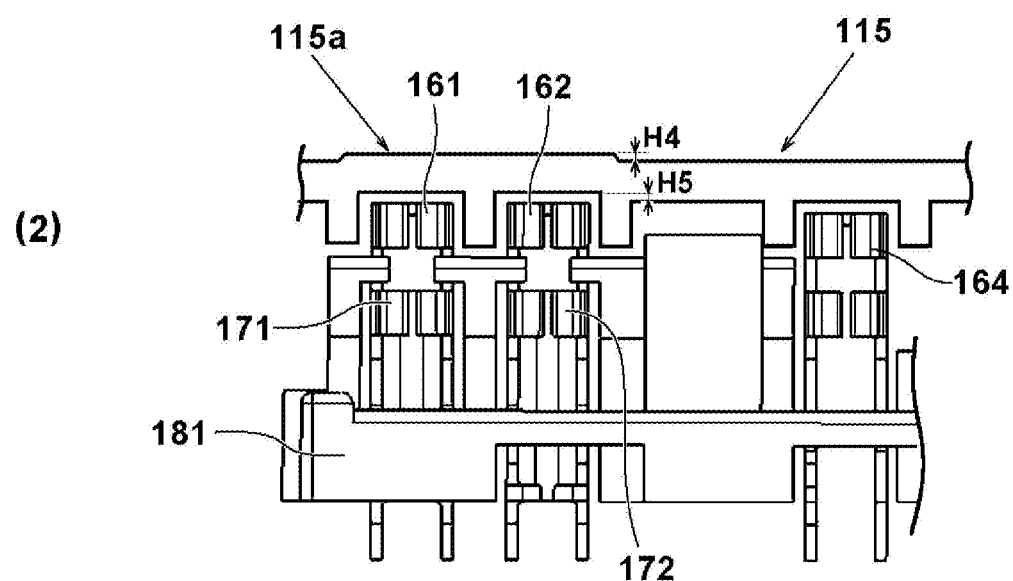

FIG. 12 is a perspective view of the upper casing 110 in FIG. 3.

Figure 13:
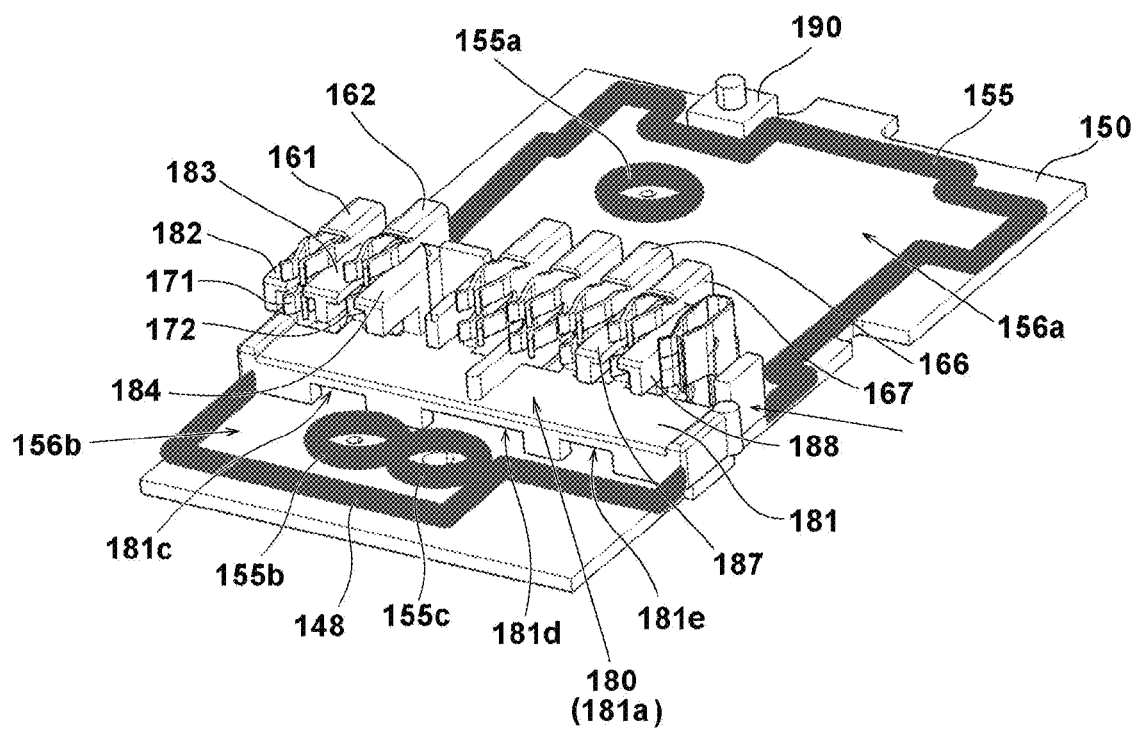

FIG. 13 is a perspective view for describing a method of applying a resin to the circuit board 150.

Figure 14:
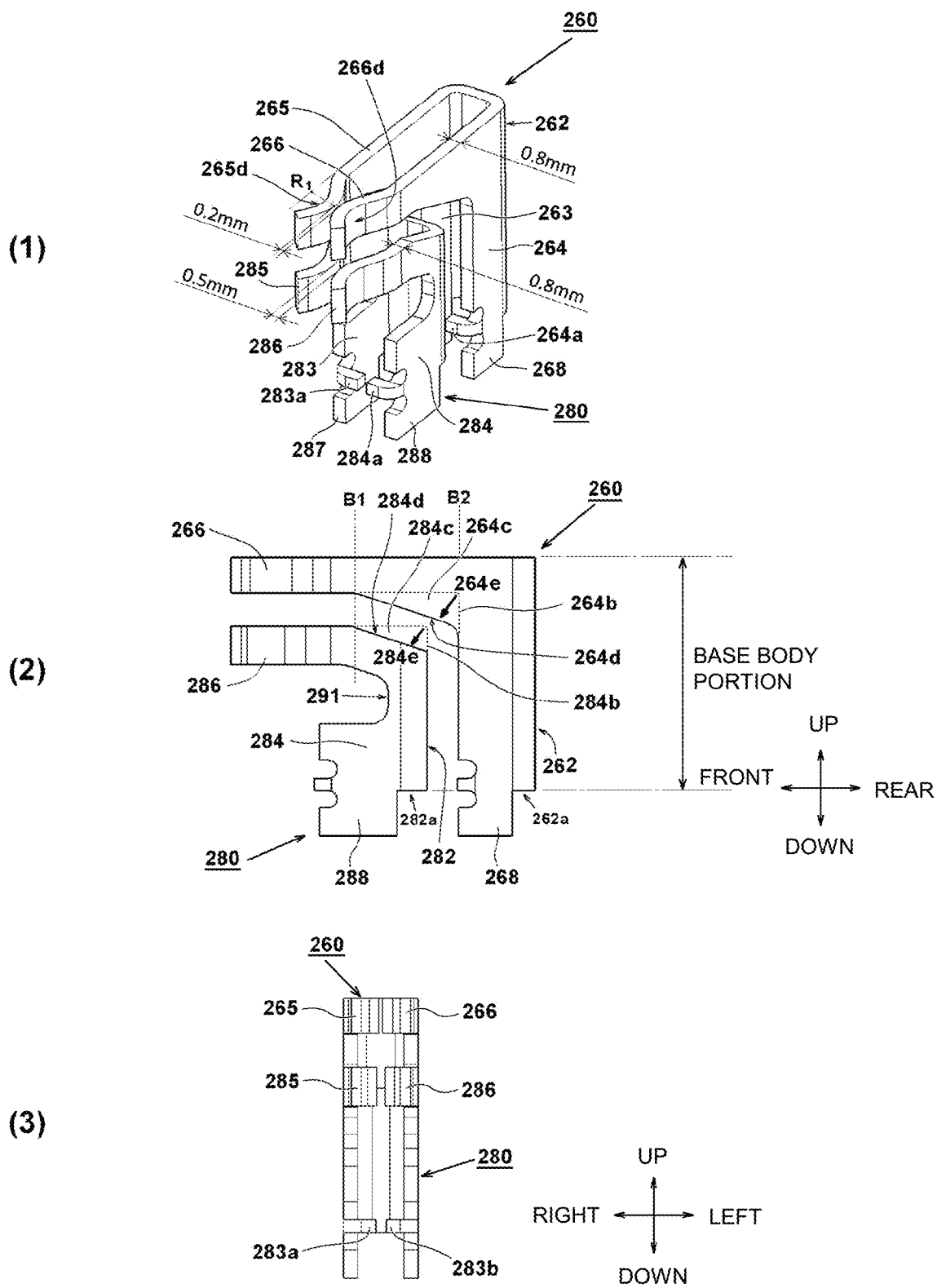

FIG. 14 is a view illustrating a first modification example of the present example, (1) of FIG. 14 is a perspective view of an upper terminal component 260 and a lower terminal component 280, (2) of FIG. 14 is a left-side view, and (3) of FIG. 14 is a front view.

Figure 15:
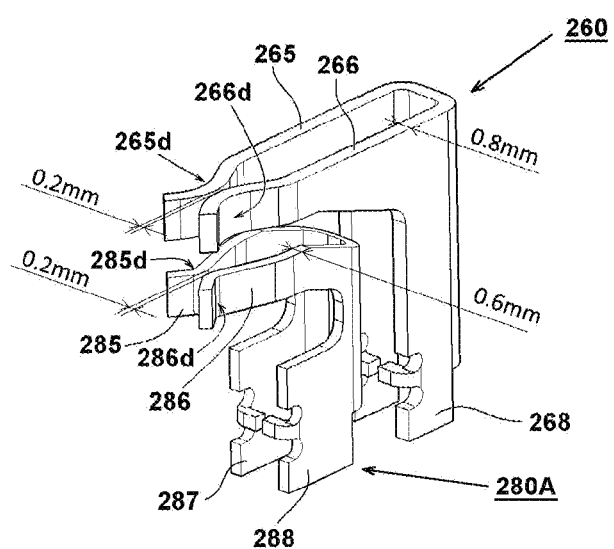

FIG. 15 is a view illustrating a second modification example of the present example and is a perspective view illustrating the upper terminal component 260 and a lower terminal component 280A.

Figure 16:
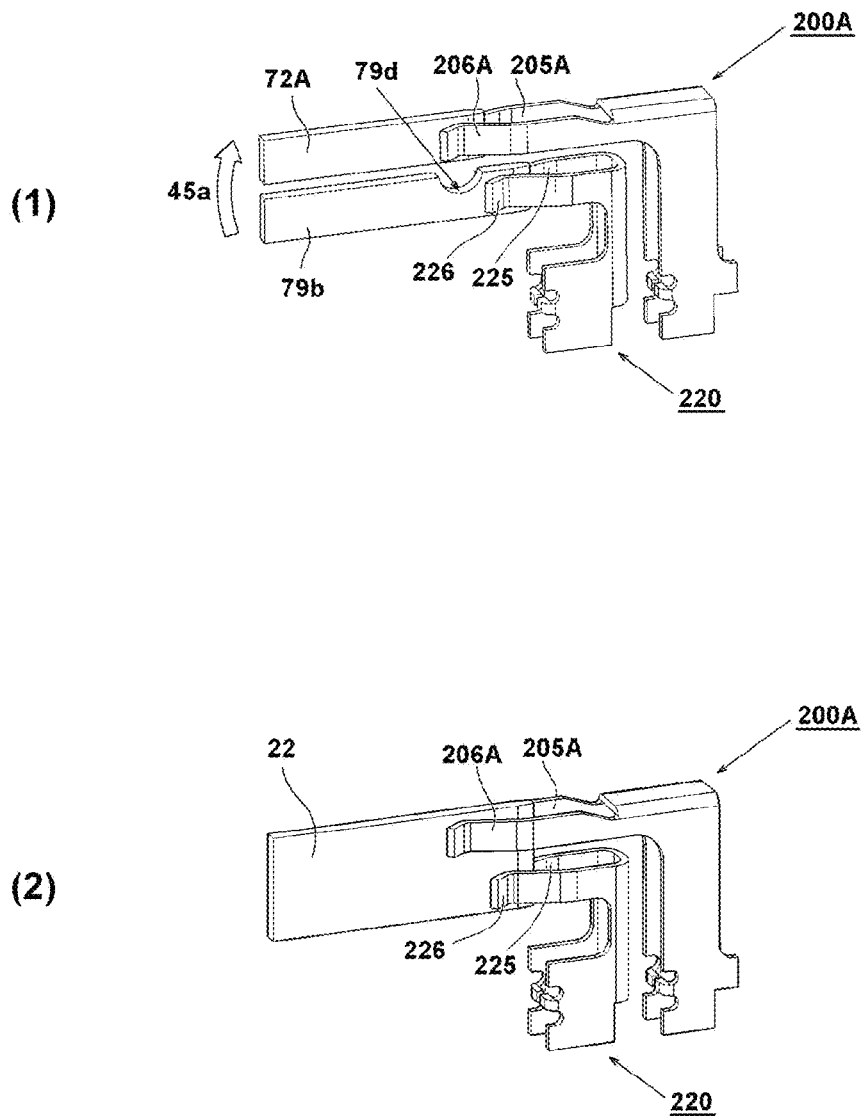

FIG. 16 is a perspective view illustrating an upper terminal component 200A and the lower terminal component 220 according to a third modification example of the present example, (1) of FIG. 16 is a view illustrating a state where these are connected to a main body side terminal of a power tool main body 30A, and (2) of FIG. 16 is a view illustrating a state where these are connected to the main body side terminal of the power tool main body 1 in the related art.

Figure 17:
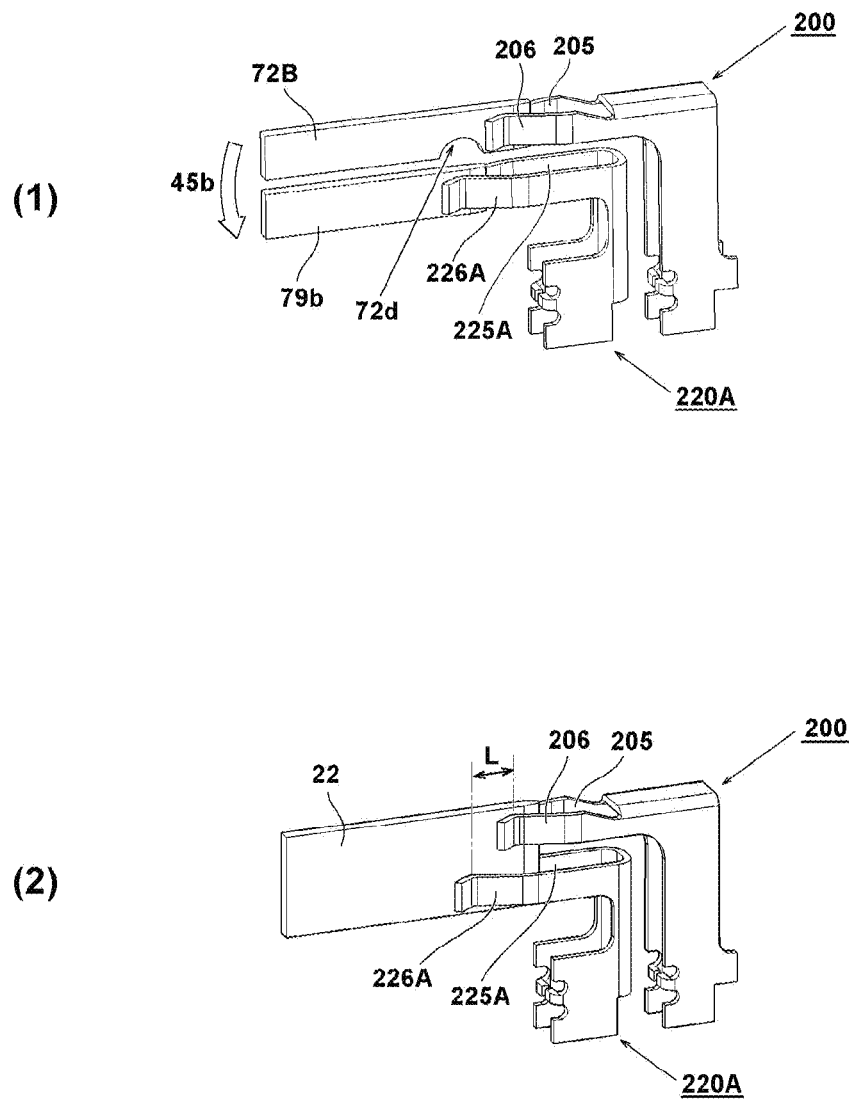

FIG. 17 is a perspective views illustrating the upper terminal component 200 and a lower terminal component 220A according to a fourth modification example of the present example, (1) of FIG. 17 is a view illustrating a state where these are connected to the main body side terminal of a power tool main body 30B, and (2) of FIG. 17 is a view illustrating a state where these are connected to the main body side terminal of the power tool main body 1 in the related art.

Figure 18:
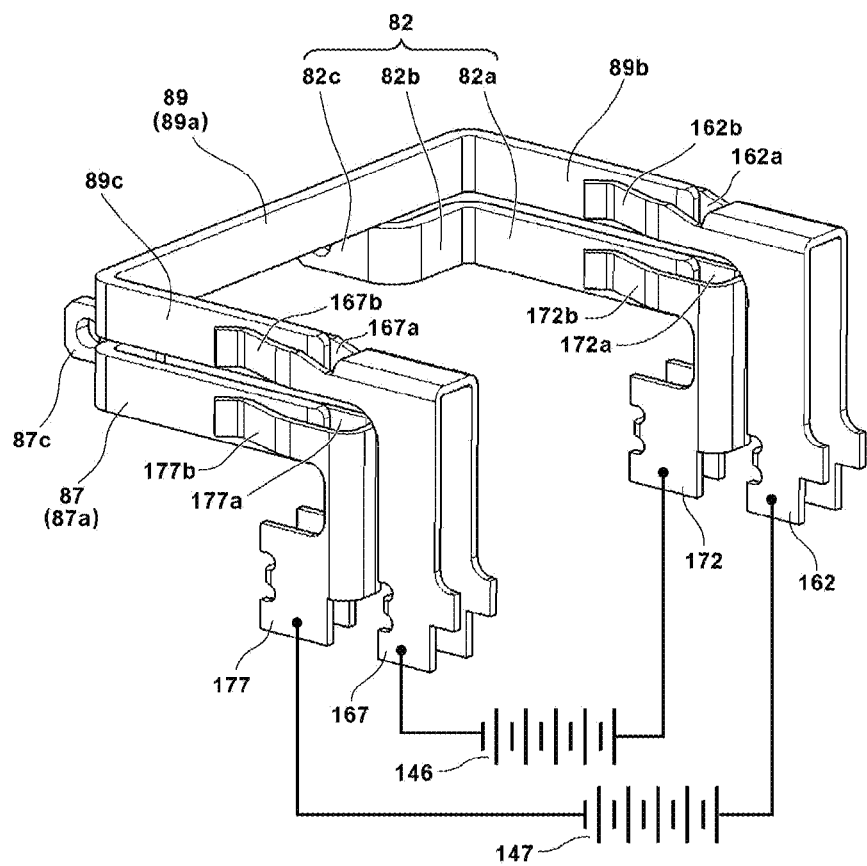

FIG. 18 is a perspective view illustrating a connection state with respect to the terminal portion of a power tool main body according to a fifth modification example of the present example.

Figure 19:
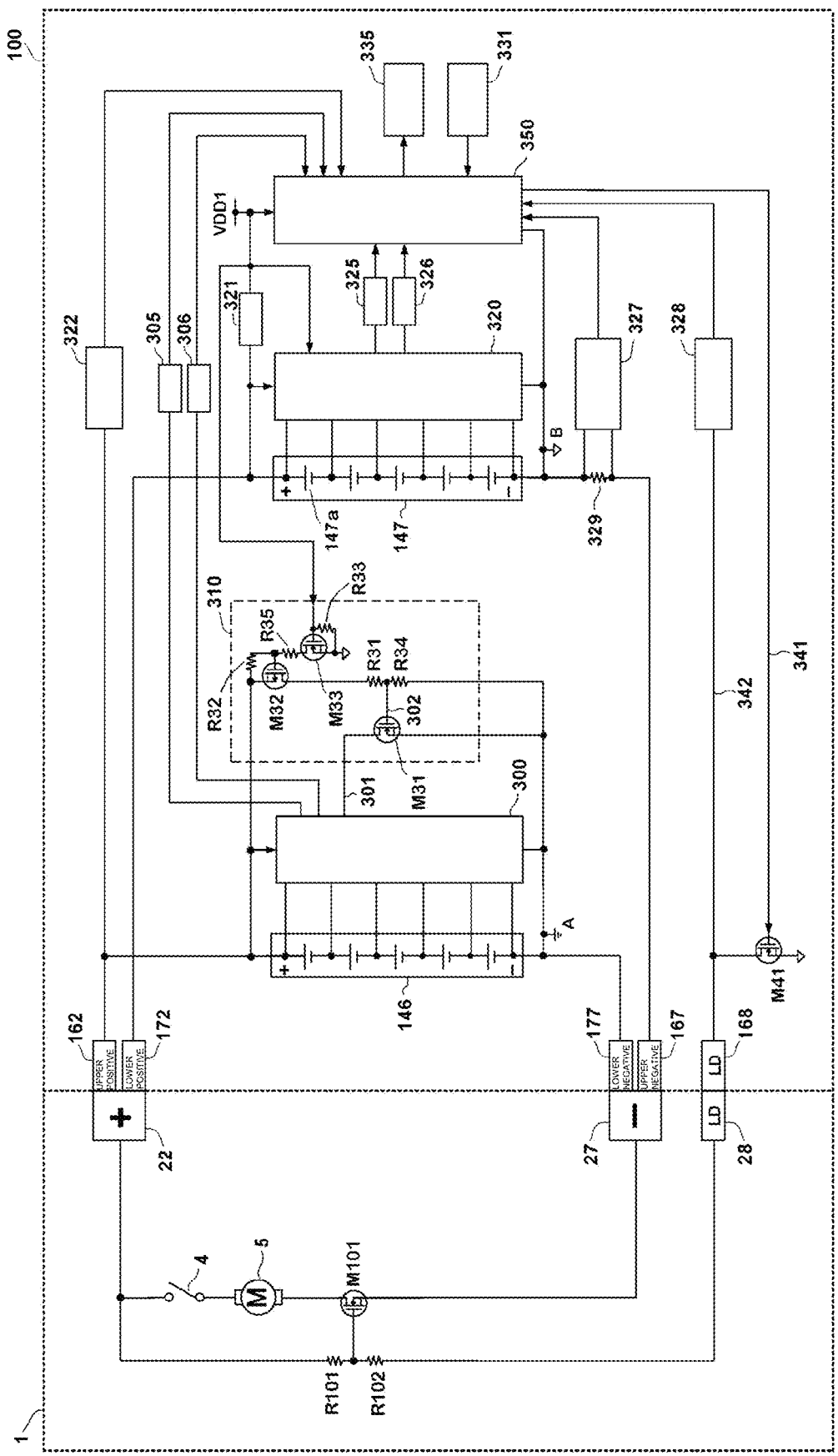

FIG. 19 is a circuit diagram illustrating a state where the battery pack 100 of the present example is connected to the power tool main body 1 in the related art.

Figure 20:
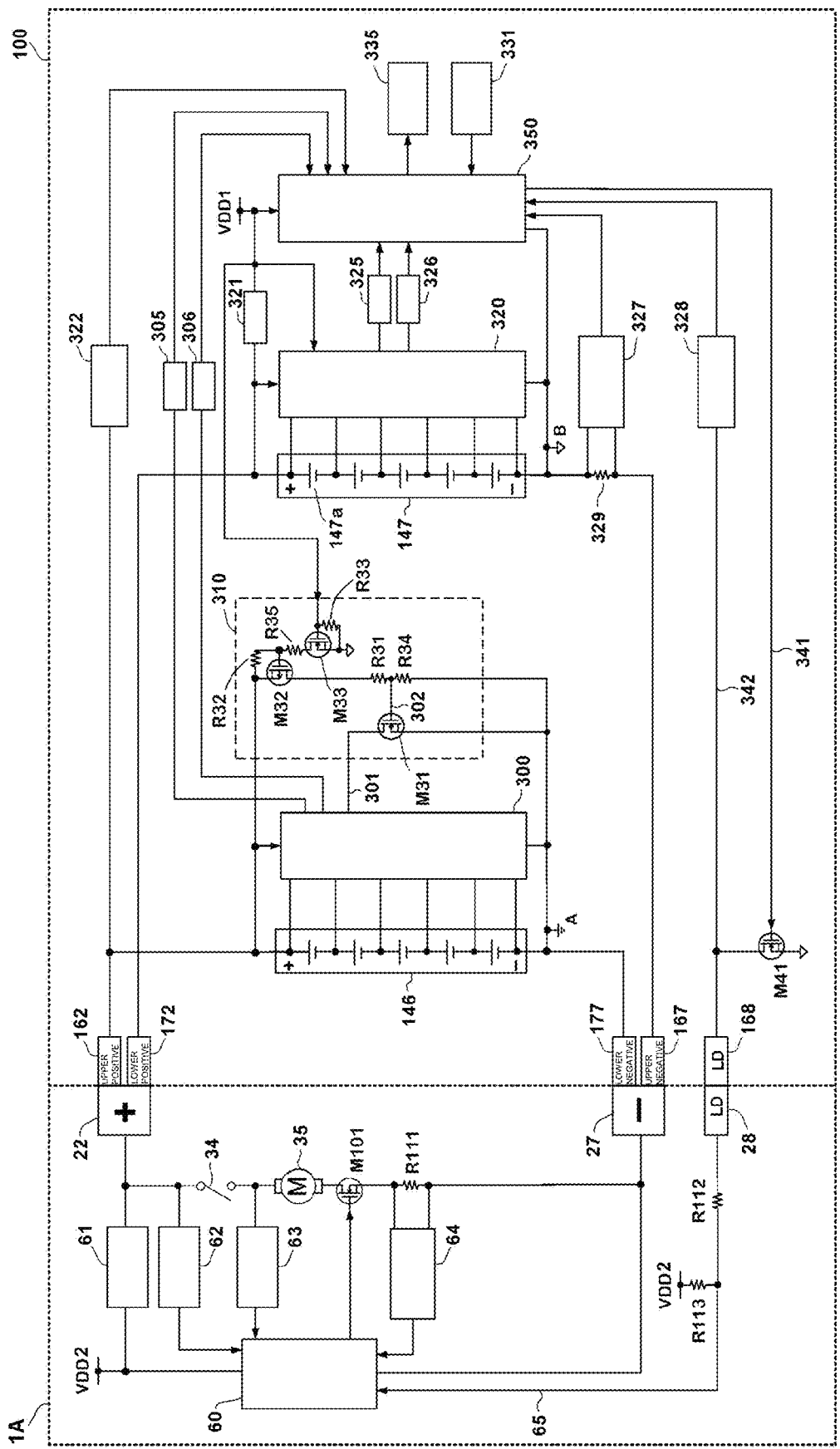

FIG. 20 is a circuit diagram of the battery pack 100 of the present example and is a view illustrating a state where the battery pack is connected to an 18 V power tool main body 1A with a microcomputer.

Figure 21:
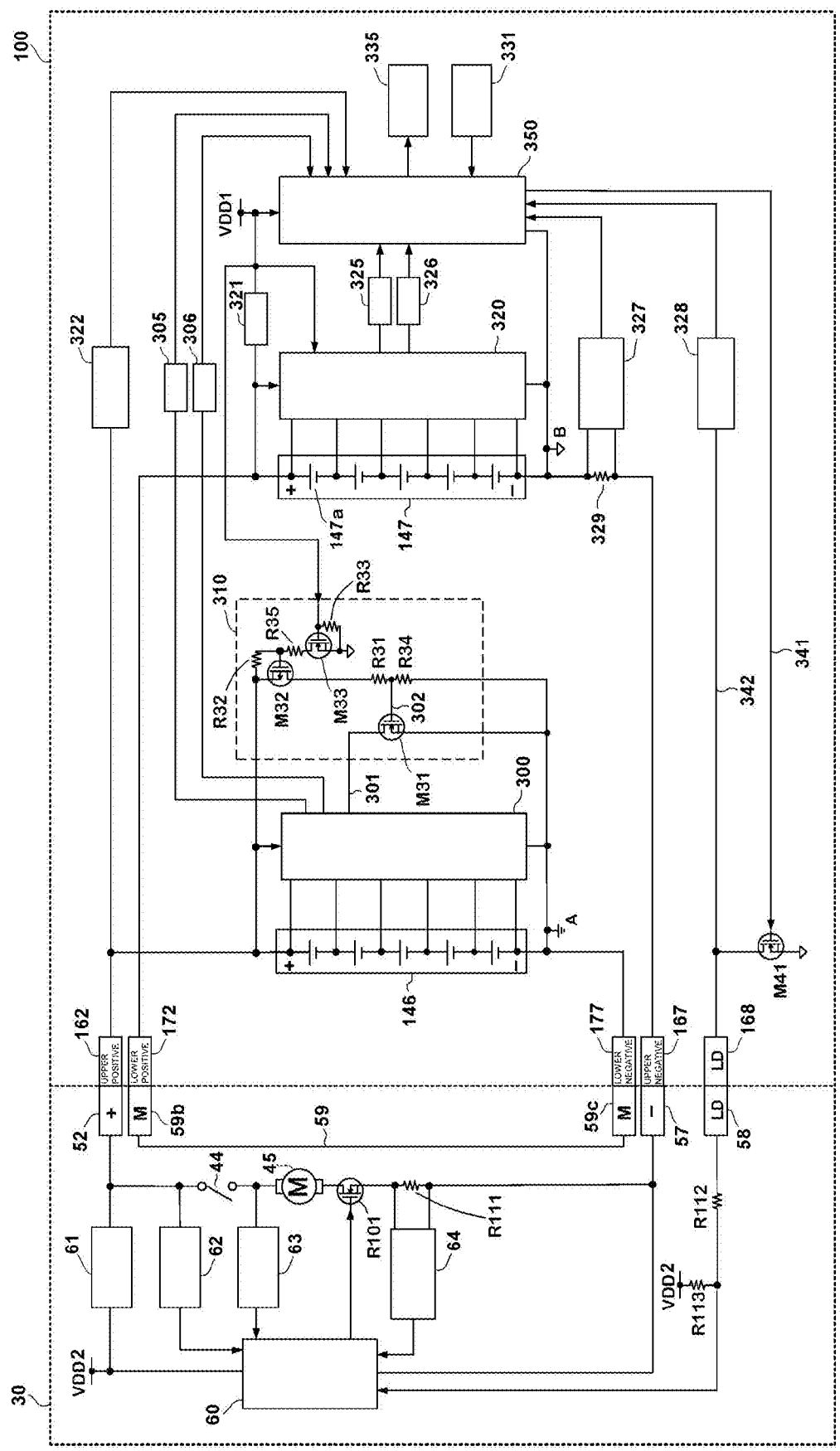

FIG. 21 is a circuit diagram of the battery pack 100 of the present example and is a view illustrating a state where the battery pack is connected to a 36 V power tool main body 30.

Figure 22:
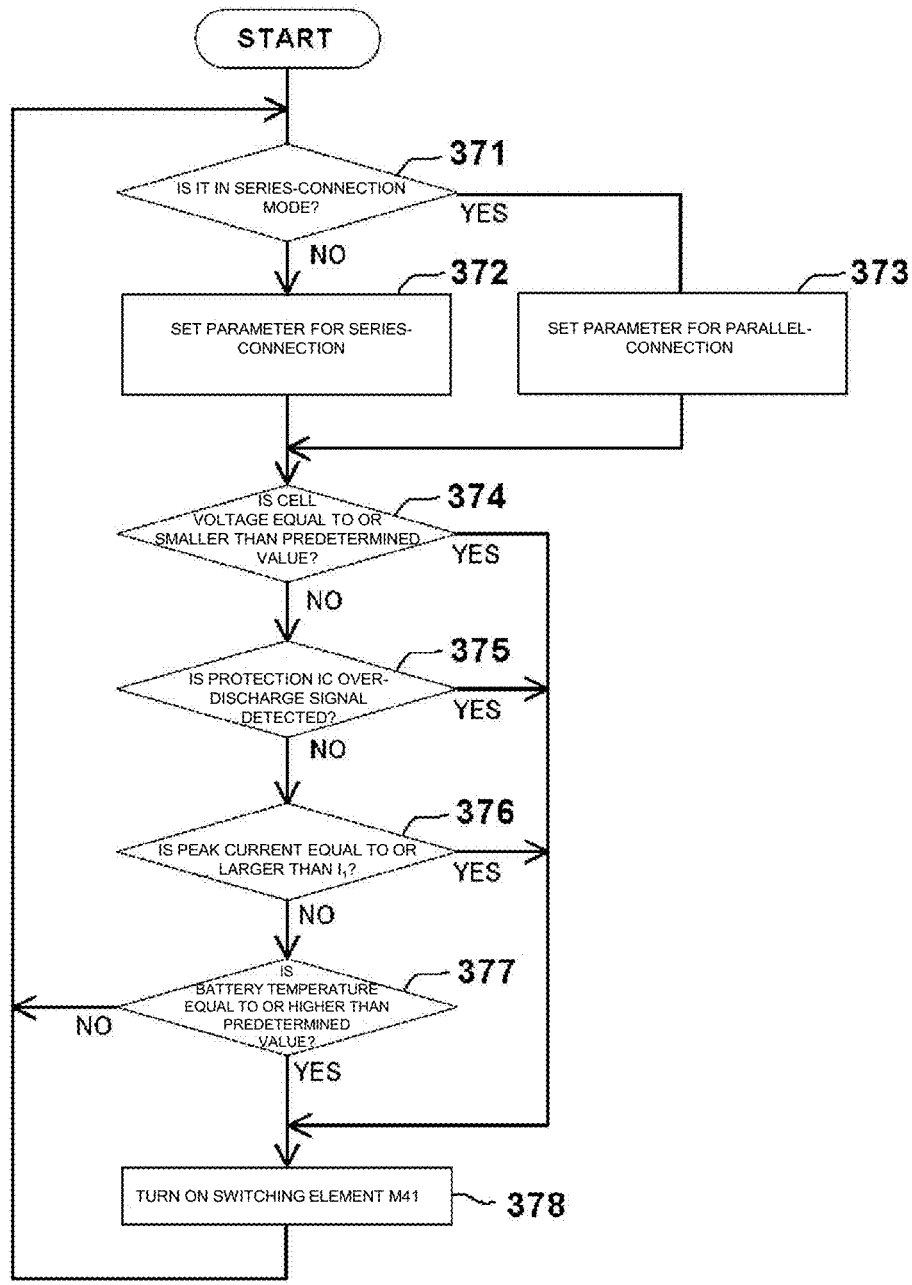

FIG. 22 is a flowchart illustrating a control procedure of the battery pack 100.

Figure 23:
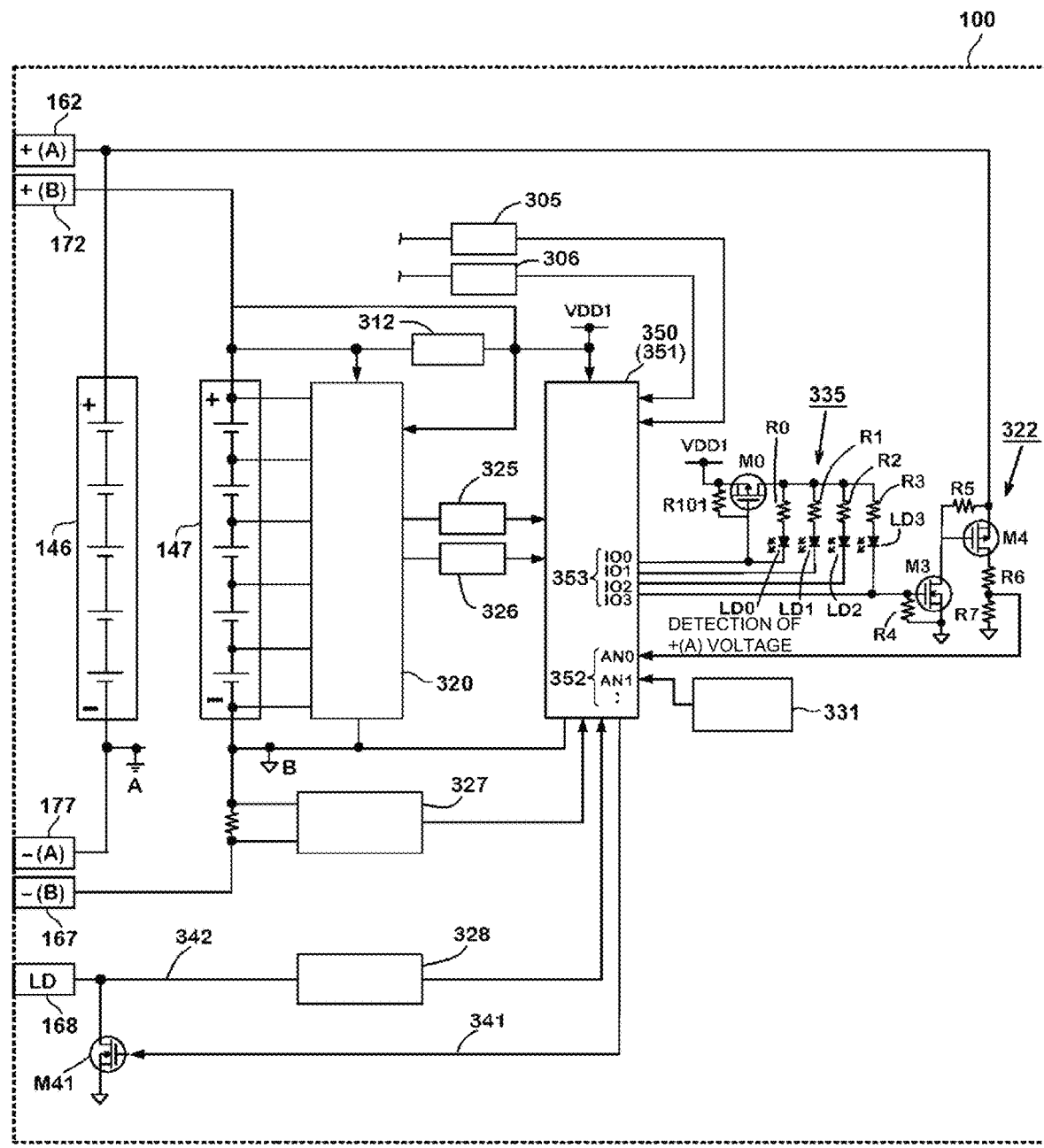

FIG. 23 is a view describing a specific circuit configuration of a residual quantity display means 335 of the battery pack 100 and an upper voltage detection circuit 322.

Figures 24, 25:
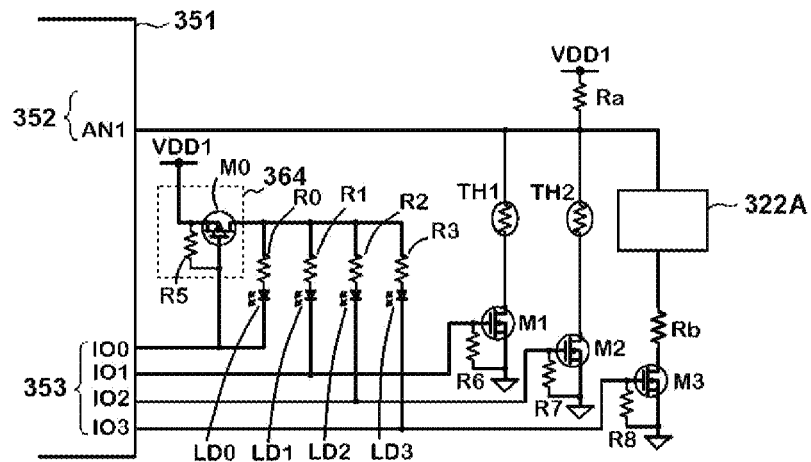

FIG. 24 is a detailed diagram of an input/output circuit with respect to a microcomputer 351 in FIG. 23.

FIG. 25 is a table showing a corresponding relationship between signal levels of input output ports IO0 to IO3 and a signal level of an input port AN1 in FIG. 23.

Figure 26:
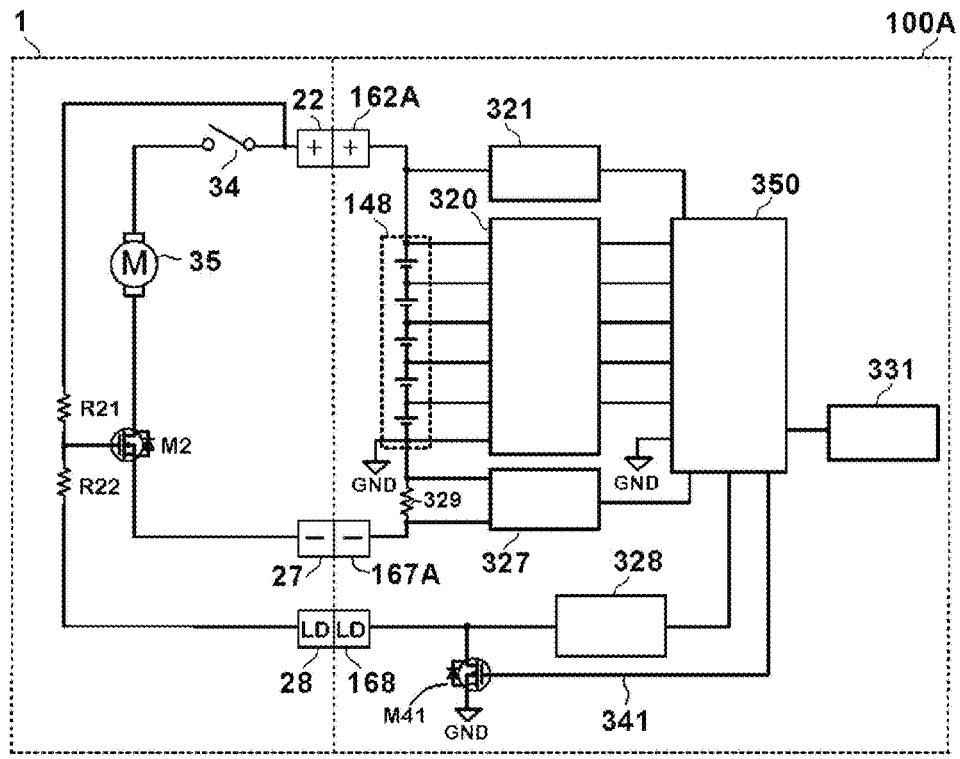

FIG. 26 is a circuit diagram of a battery pack 100A according to a second example of the present disclosure and is a view illustrating a state where the battery pack is connected to the power tool main body 1 in the related art.

Figure 27:
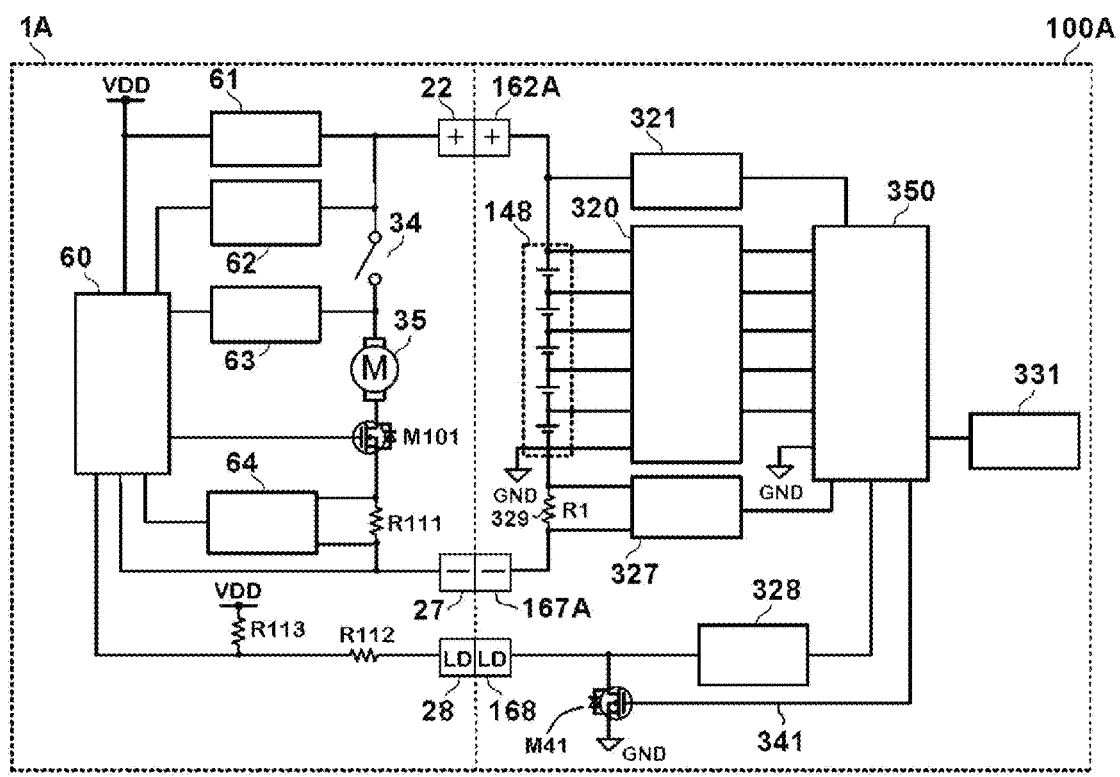

FIG. 27 is a circuit diagram of the battery pack 100A according to the second example of the present disclosure and is a view illustrating a state where the battery pack is connected to the 18 V power tool main body 1A with a microcomputer.

Figure 28:
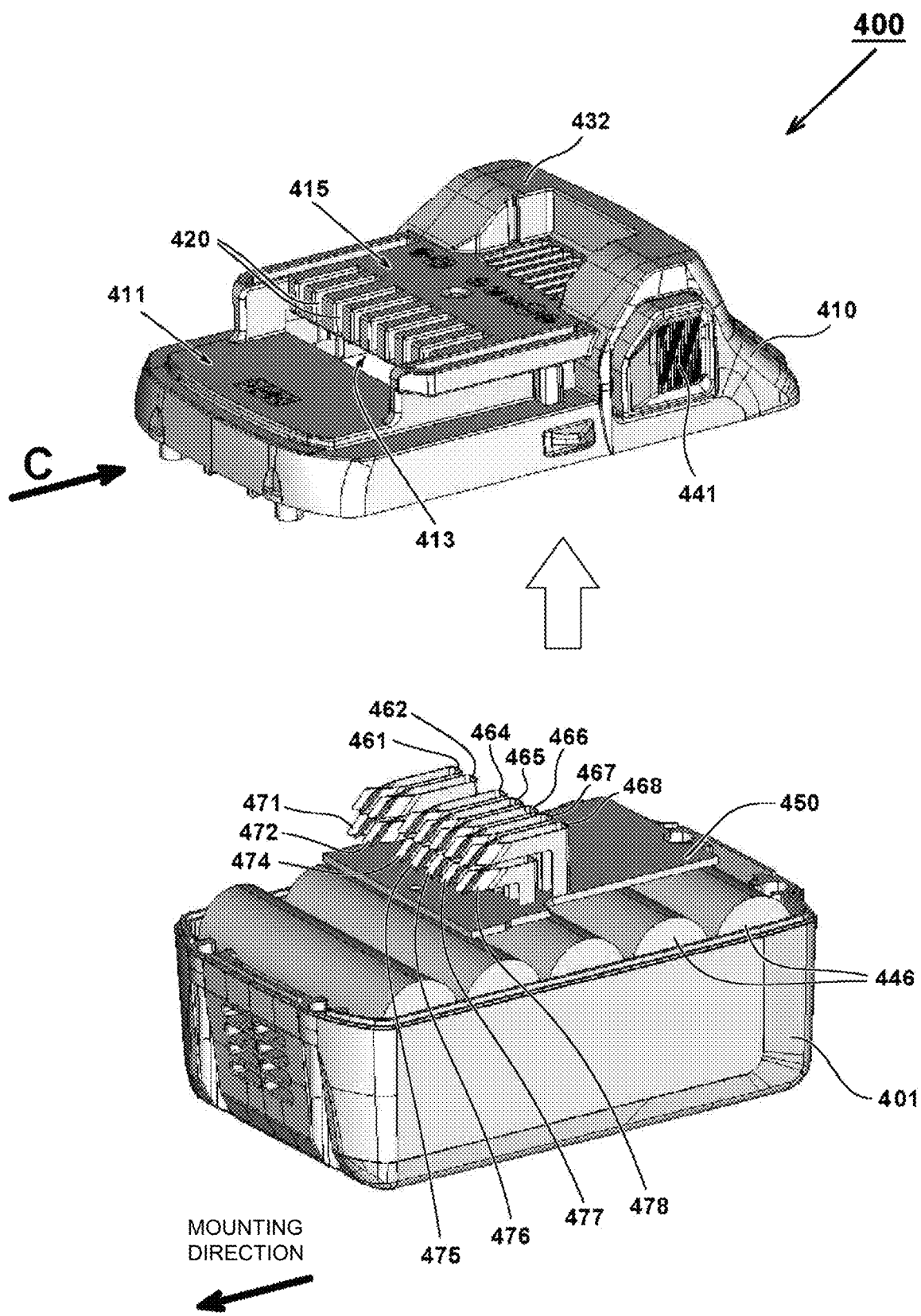

FIG. 28 is an exploded perspective view illustrating a battery pack 400 according to a third example of the present disclosure.

Figure 29:
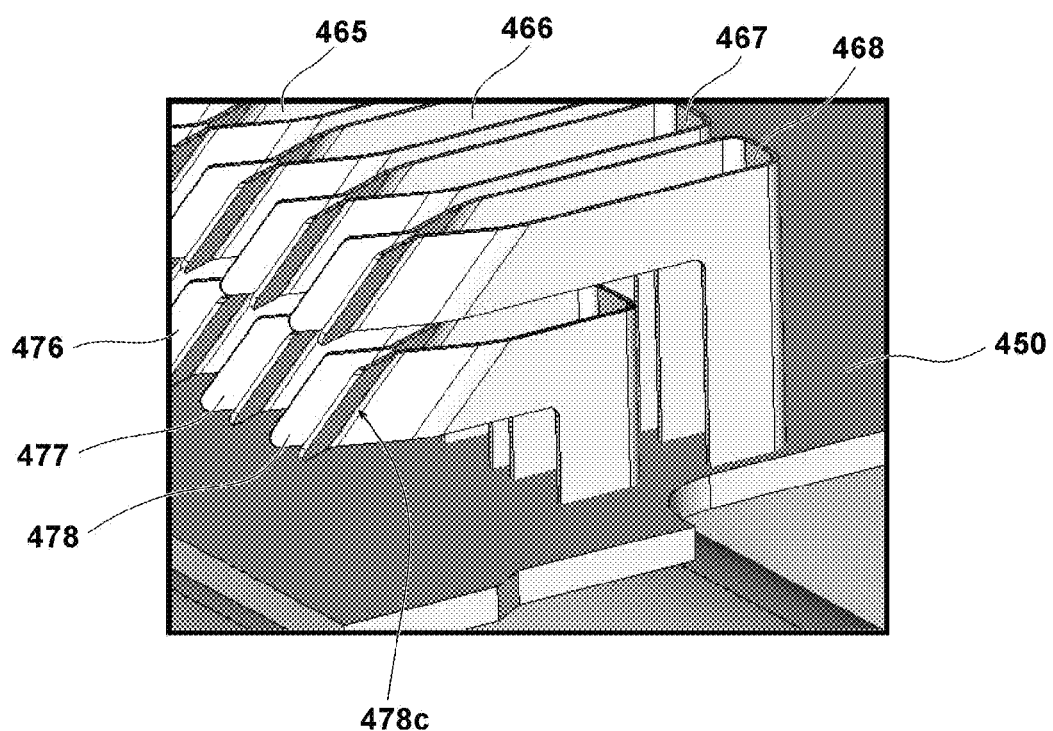

FIG. 29 is an enlarged view of a part of connection terminals in FIG. 28.

Figure 30:
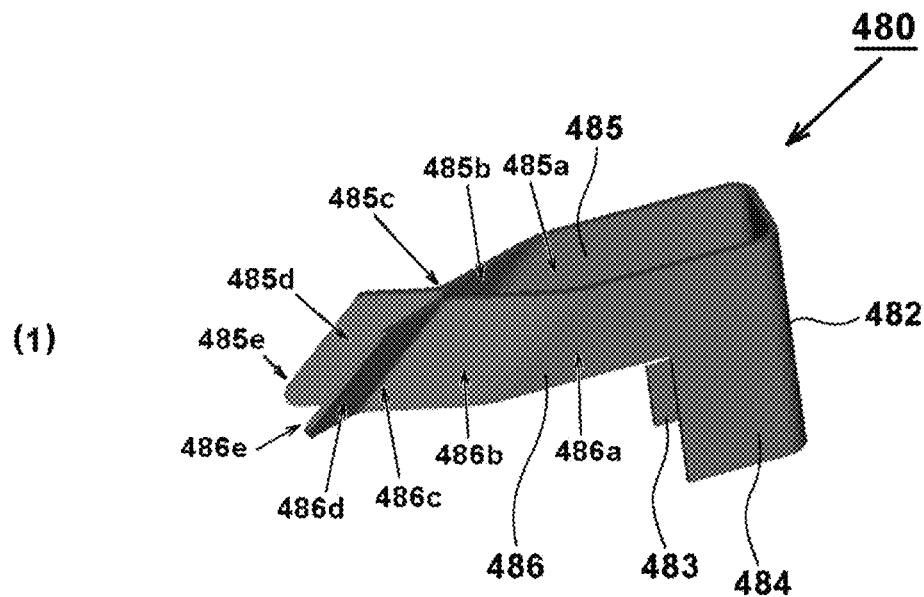
Figure 30:
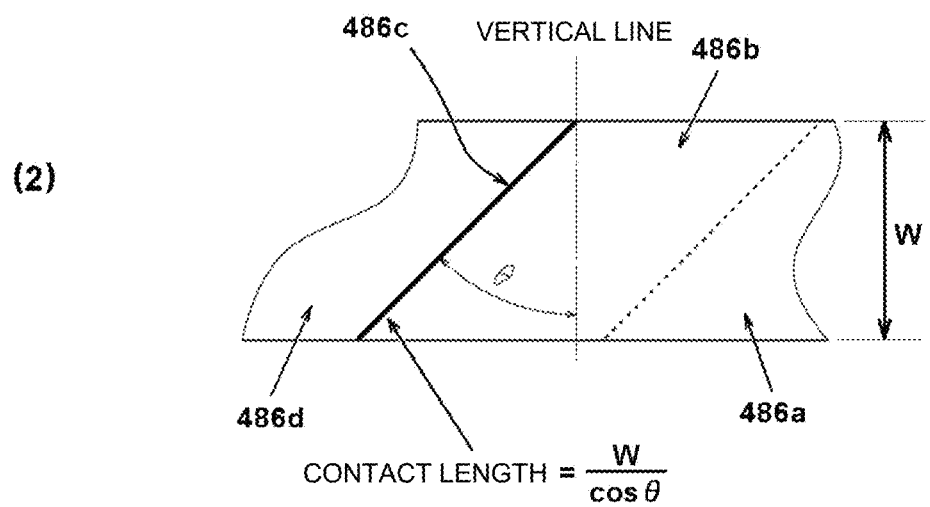

FIG. 30 is an enlarged view of the terminal component in FIG. 28, (1) of FIG. 30 is a perspective view, and (2) of FIG. 30 is a view for describing a contact length in a fitting portion.

Figure 31:
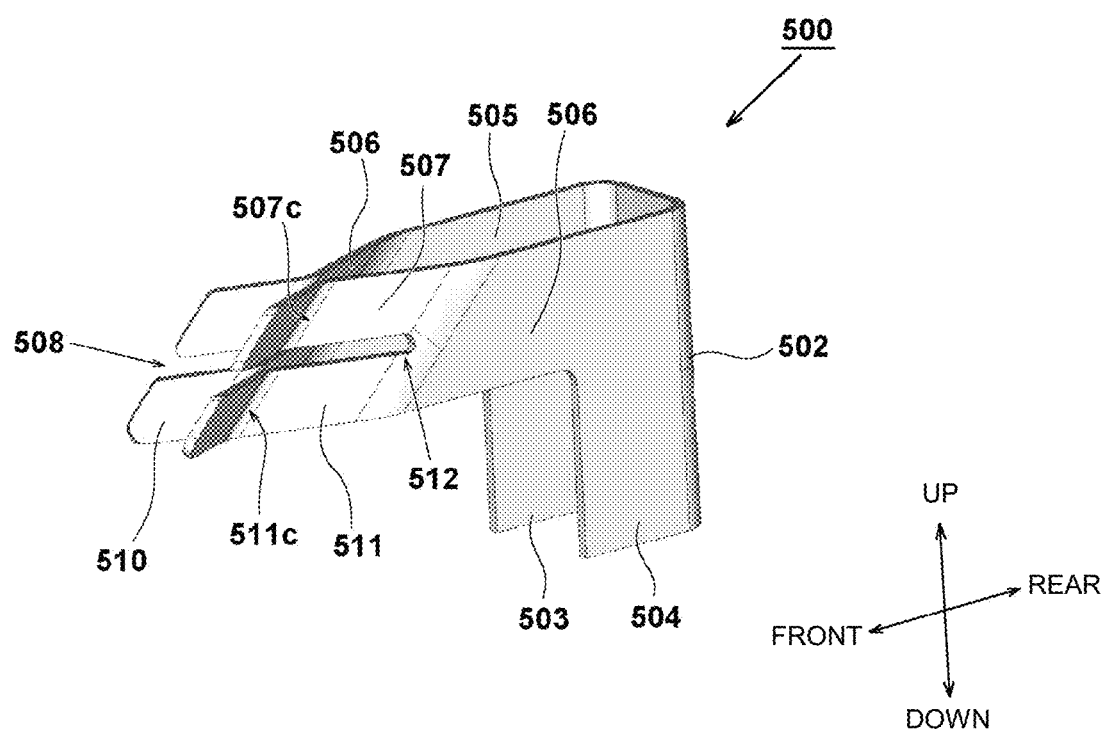

FIG. 31 is a perspective view illustrating a terminal component 500 according to a modification example of the third example.

DESCRIPTION OF EMBODIMENTS

Example 1

Hereinafter, examples of the present disclosure will be described based on the drawings. In the following diagrams, the same reference signs are applied to the same parts, and description thereof will not be repeated. In this specification, as an example of an electric apparatus, a power tool that is operated by a battery pack will be described. In the description, a front-rear direction and a right-left direction on a main body side of the power tool are the directions indicated in FIG. 2, and the front-rear direction, the right-left direction, and an up-down direction when the battery pack is viewed in a single body are the directions indicated in FIG. 3 based on a mounting direction of the battery pack. For convenience of description, the mounting direction of the battery pack will be described as a direction based on a situation in which the battery pack side is moved without moving the power tool main body side.

Figure 1:
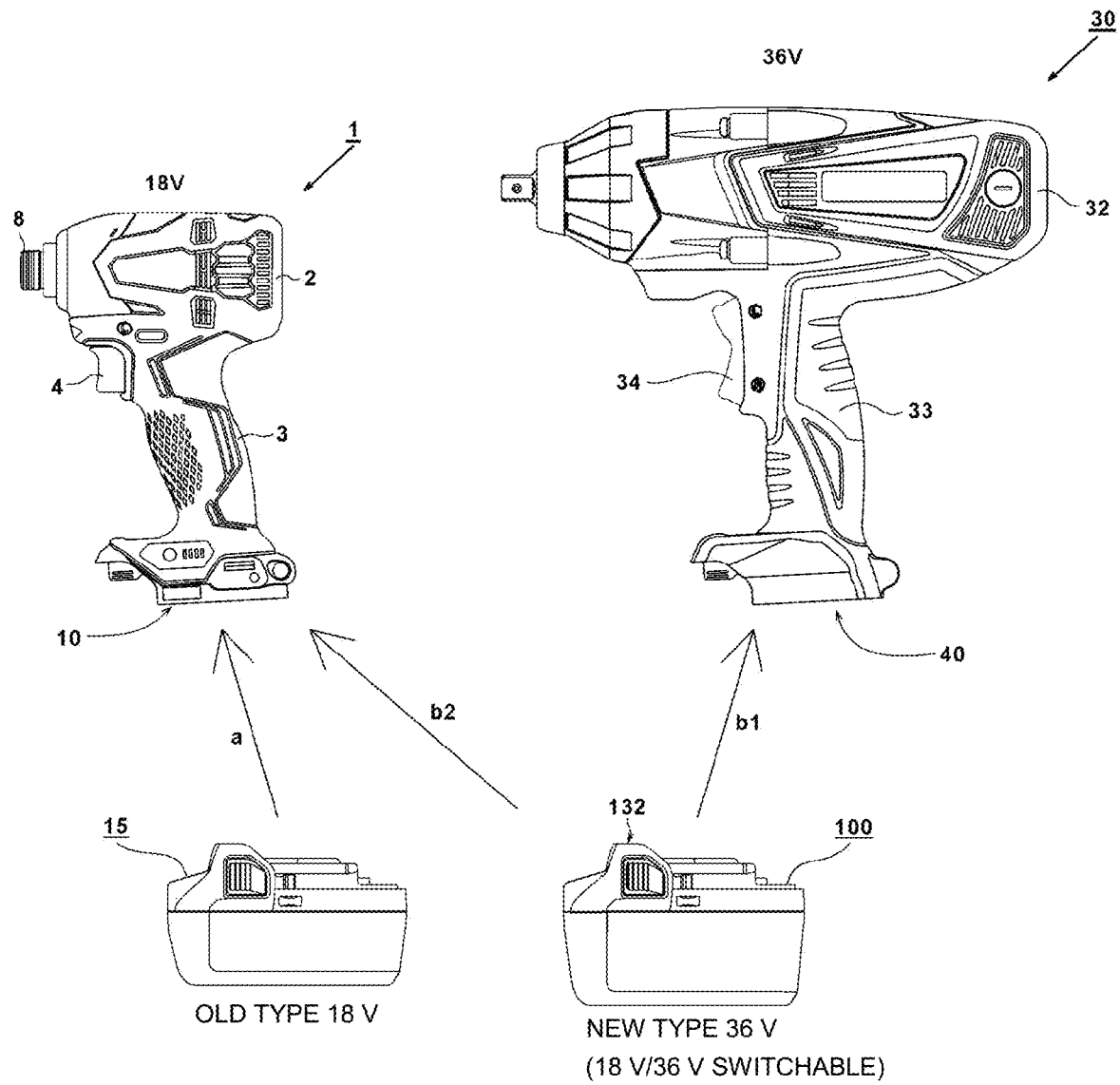
FIG. 1 is a view for describing a situation of mounting a battery pack according to the present disclosure in a power tool.

FIG. 1 is a view for describing a situation of mounting a battery pack according to the present example in a power tool. The power tool that is a form of an electric apparatus has a battery pack, and a tip tool or a working apparatus is driven using a rotation driving force of a motor. Various kinds of power tools have been realized, and both power tool main bodies 1 and 30 illustrated in FIG. 1 are referred to as impact tools. The power tool main bodies 1 and 30 are tools for performing tightening work by applying a rotation force or a striking force in an axial direction to a tip tool such as a bit or a socket wrench (not illustrated). The power tool main bodies 1 and 30 include housings 2 and 32 that are outer frames forming external shapes, and handle portions 3 and 33 are formed in the housing 2 and 32. Trigger-shaped operation switches 4 and 34 are provided in parts of the handle portions 3 and 33, that is, near places that the index finger reaches when a worker holds the power tool main bodies 1 and 30. Battery pack mounting portions 10 and 40 for mounting battery packs 15 and 100 are formed below the handle portions 3 and 33.

The power tool main body 1 is an electric apparatus in the related art using the battery pack 15 adapted to a rated voltage of 18 V. The battery pack 15 is a battery pack in the related art and can be mounted in the battery pack mounting portion 10 of the electric apparatus (power tool main body 1) supporting 18 V as in the combination indicated by the arrow a. Inside the battery pack 15, only one set of a cell unit constituted of five lithium ion battery cells of a rated voltage of 3.6 V connected in series is accommodated, or two sets of such cell units are accommodated and are connected to each other in parallel. Here, a voltage of 18 V will sometimes be referred to as a low voltage in the sense that it is a relatively low voltage. Similarly, the power tool main body 1 or the electric apparatus main body of a rated voltage of 18 V will sometimes be referred to as a low-voltage power tool main body or a low-voltage electric apparatus main body. Similarly, the battery pack 15 of a nominal voltage of 18 V will sometimes be referred to as a low-voltage battery pack.

The power tool main body 30 is the electric apparatus main body of a rated voltage of 36 V, and the battery pack 100 that can output 36 V as indicated by the arrow b1 is mounted in the battery pack mounting portion 40. Here, a voltage of 36 V will sometimes be referred to as a high voltage in the sense that it is a relatively high voltage. Similarly, the power tool main body 30 or the electric apparatus main body of a rated voltage of 36 V will sometimes be referred to as a high-voltage power tool main body or a high-voltage electric apparatus main body. Inside the battery pack 100, two sets of cell units having five lithium ion battery cells of a rated voltage of 3.6 V connected in series are accommodated, such that the battery pack 100 can be switched between an output of 18 V and an output of 36 V by changing a method of connecting the two sets of cell units. In the present example, the battery pack 100 is configured to support two voltages such that a low voltage and a high voltage can be output. Therefore, the battery pack 100 can be mounted in the power tool main body 1 supporting 18 V as indicated by the arrow b2 and can also be mounted in the power tool main body 30 supporting 36 V as indicated by the arrow b1. Here, the battery pack 100 that can output a low voltage and a high voltage in this manner will sometimes be referred to as a voltage changeable battery pack. In order to mount the battery pack 100 in the power tool main bodies 1 and 30 using different voltages as indicated by the arrows b1 and b2, it is important that shapes of rail portions or terminal portions of the battery pack mounting portions 10 and 40 be substantially the same shapes and that an output voltage of the battery pack 100 be switchable. At this time, it is important that an output voltage of the battery pack 100 reliably support a rated voltage of the electric apparatus main body or the power tool main body to be mounted such that erroneous voltage setting does not occur.

Figure 2:
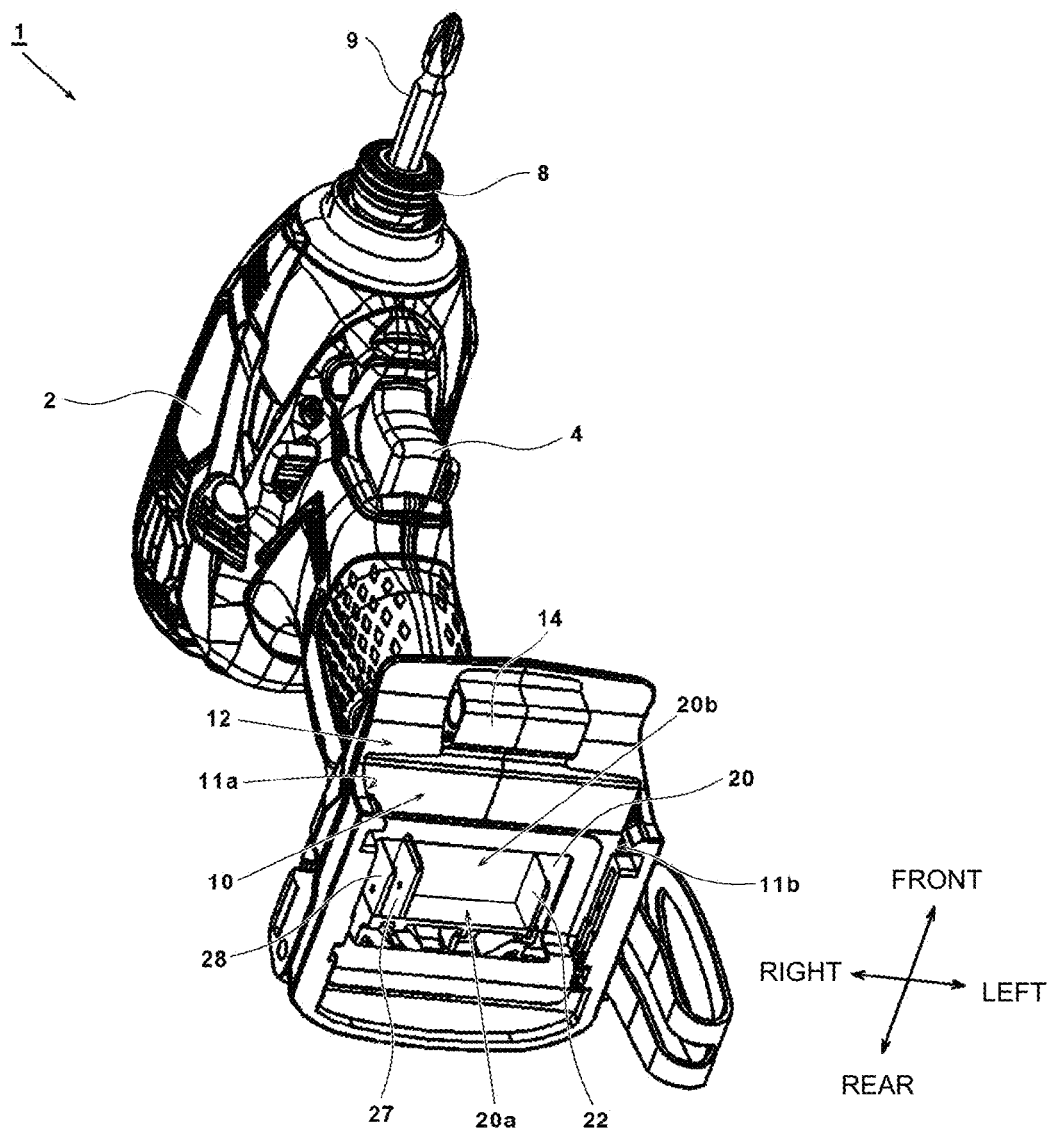
FIG. 2 is a perspective view illustrating a shape of a battery pack mounting portion 10 of a power tool main body 1 in FIG. 1.

FIG. 2 is a perspective view illustrating a shape of the battery pack mounting portion 10 of the power tool main body 1. The power tool main body 1 illustrated herein is an impact driver, in which a handle portion extending downward from a body part of the housing 2 is provided and the battery pack mounting portion 10 is formed on a lower side of the handle portion. A trigger switch 4 (operation switch) is provided in the handle portion. An anvil (not illustrated) serving as an output shaft is provided on the front side of the housing 2, and a tip tool holding portion 8 for mounting a tip tool 9 is provided at the tip of the anvil. Here, a Phillips-head screwdriver bit is mounted as the tip tool 9. This is not limited to only power tools, and all electric apparatuses using a battery pack are configured to have a battery pack mounting portion 10 that is formed to correspond to the shape of the battery pack to be mounted, so that a battery pack that is not suitable for the battery pack mounting portion 10 cannot be mounted. In the battery pack mounting portion 10, rail grooves 11a and 11b extending in parallel to the front-rear direction are formed in inner wall parts on both right and left sides, and a terminal portion 20 is provided therebetween. The terminal portion 20 is manufactured through integrated molding using a non-conducting material such as a synthetic resin, and a plurality of metal terminals, for example, a positive electrode input terminal 22, a negative electrode input terminal 27, and an LD terminal (abnormality signal terminal) 28 are cast therein. In the terminal portion 20, a vertical surface 20a that constitutes an abutment surface in the mounting direction (front-rear direction) and a horizontal surface 20b are formed. The horizontal surface 20b constitutes a surface that is adjacent to and faces an upper stage surface 115 (which will be described below with reference to FIG. 3) when the battery pack 100 is mounted. A curved portion 12 that abuts a raised portion 132 (which will be described below with reference to FIG. 3) of the battery pack 100 is formed on the front side of the horizontal surface 20b, and a projection portion 14 is formed near the center of the curved portion 12 in the right-left direction. The projection portion 14 also serves as a screw stopper boss of a housing of the power tool main body 1 formed to be divided into two in the right-left direction and serves as a stopper for limiting relative movement of the battery pack 100 in the mounting direction.

FIG. 3 is a perspective view of the battery pack 100 according to the example of the present disclosure. The battery pack 100 can be attached to and detached from the battery pack mounting portions 10 and 40 (refer to FIG. 1), and the battery pack 100 is automatically switched between outputs of a low voltage (here, 18 V) and a high voltage (here, 36 V) in accordance with the terminal shape on the power tool main body 1 or 30 side. In order to have compatibility in attachment with a rated 18 V battery pack 15 (refer to FIG. 1) in the related art, the shape of the mounting part of the battery pack 100 is the same as that of the battery pack 15 in the related art. A casing of the battery pack 100 is formed to include a lower casing 101 and an upper casing 110 that can be divided in the up-down direction. The lower casing 101 and the upper casing 110 are made of members that do not conduct electricity, for example, a synthetic resin, and are fixed to each other using four screws. A mounting mechanism in which two rails 138a and 138b are formed to be attached to the battery pack mounting portion 10 is formed in the upper casing 110. The rails 138a and 138b are formed to extend in a direction parallel to the mounting direction of the battery pack 100 and to protrude to right and left side surface sides of the upper casing 110. The front side end portions of the rails 138a and 138b become open ends, and the rear side end portions become closed ends connected to the front wall surface of the raised portion 132. The rails 138a and 138b are formed to have shapes corresponding to the rail grooves 11a and 11b (refer to FIG. 2) formed in the battery pack mounting portion 10 of the power tool main body 1. In a state where the rails 138a and 138b are fitted into the rail grooves 11a and 11b, the battery pack 100 is fixed to the power tool main body 1 or 30 by being engaged with an engagement portion 142a (engagement portion on the right side, not shown in FIG. 3) and an engagement portion 142b that constitute claws of latches. When the battery pack 100 is detached from the power tool main body 1 or 30, latches 141 on both right and left sides are pushed such that the engagement portions 142a and 142b move inward and the engagement state is canceled. In this state, the battery pack 100 is moved to an opposite side in the mounting direction. The upper casing 110 and the lower casing 101 are an example of "a casing" in the present disclosure.

A flat lower stage surface 111 is formed on the front side of the upper casing 110, and the upper stage surface 115 formed to be higher than the lower stage surface 111 is formed near the center. The lower stage surface 111 and the upper stage surface 115 are formed to have a stepped shape, and a connection part therebetween constitutes a stepped portion 114 (vertical surface). The front side part of the upper stage surface 115 from the stepped portion 114 constitutes a slot group disposition region 120. A plurality of slots 121 to 128 extending rearward from the stepped portion 114 on the front side are formed in the slot group disposition region 120. The slots 121 to 128 are cutout parts having a predetermined length in the battery pack mounting direction, and a plurality of connection terminals (which will be described below with reference to FIG. 4) that can be fitted into apparatus side terminals of the power tool main bodies 1 and 30 or an external charging device (not illustrated) are arranged inside the cutout parts. In the slots 121 to 128, cutouts are formed not only on the upper surface parallel to the mounting direction but also on the vertical surface such that the terminals on the power tool main body side can be inserted from the lower stage surface 111 side. In addition, an opening portion 113 that opens continuously in the lateral direction is formed on the lower side of the slots 121 to 128 and between the stepped portion 114 and the lower stage surface 111.

In the slots 121 to 128, the slot 121 on a side close to the rail 138a on the right side of the battery pack 100 constitutes an insertion port of a charging positive electrode terminal (C-positive terminal), and the slot 122 constitutes an insertion port of a discharging positive electrode terminal (positive terminal). In addition, the slot 127 on a side close to the rail 138b on the left side of the battery pack 100 constitutes an insertion port of a negative electrode terminal (negative terminal). Generally, in the battery pack 100, the positive electrode side and the negative electrode side of the power terminal are disposed sufficiently apart from each other. When viewed from a vertical imaginary surface positioned at the center in the right-left direction, the positive electrode terminal is provided at a sufficiently far position on the right side, and the negative electrode terminal is provided at a sufficiently far position on the left side. A plurality of signal terminals for transmitting a signal to the battery pack 100, the power tool main bodies 1 and 30, and an external charging device (not illustrated) are disposed between the positive electrode terminal and the negative electrode terminal. Here, four slots 123 to 126 for signal terminals are provided in a power terminal group. The slot 123 is a preliminary terminal insertion port, and no terminal is provided in the present example. The slot 124 is an insertion port for a T terminal for outputting a signal that becomes identification information of the battery pack 100 to the power tool main body or the charging device. The slot 125 is an insertion port for a V terminal for inputting a control signal from the external charging device (not illustrated). The slot 126 is an insertion port for an LS terminal for outputting temperature information of the battery obtained by a thermistor (thermosensitive element) (not illustrated) that is provided in contact with the cell. The slot 128 for an LD terminal outputting an abnormality stoppage signal of a battery protection circuit (which will be described below) that is further included in the battery pack 100 is provided on the left side of the slot 127 constituting the insertion port of the negative electrode terminal (negative terminal).

The raised portion 132 is formed to be raised on the rear side of the upper stage surface 115. The external shape of the raised portion 132 has a shape that is raised upward from the upper stage surface 115, and a depressed stopper portion 131 is formed near the center thereof. The stopper portion 131 constitutes an abutment surface of the projection portion 14 (refer to FIG. 2) when the battery pack 100 is mounted in the battery pack mounting portion 10. If the projection portion 14 on the power tool main body 1 side is inserted until it abuts the stopper portion 131, a plurality of terminals (apparatus side terminals) arranged in the power tool main body 1 and a plurality of connection terminals (which will be described below with reference to FIG. 4) arranged in the battery pack 100 come into contact with each other, and are thus in a conducting state. In addition, the engagement portion 142a (engagement portion on the right side, not shown in FIG. 3) and the engagement portion 142b of the latches 141 of the battery pack 100 are ejected outward in the vertical direction in lower portions of the rails 138a and 138b due to action of a spring and are interlocked with recessed portions (not illustrated) formed in the rail grooves 11a and 11b of the power tool main body 1, such that the battery pack 100 is prevented from falling off. A slit 134 (cooling air inlet) connected to the inside of the battery pack 100 is provided on the inner side of the stopper portion 131. In addition, in a state where this battery pack 100 is mounted in the power tool main body 1, the slit 134 is covered in a closed state such that it is not visible from the outside. The slit 134 is a vent-hole used for causing air for cooling to forcibly flow into the battery pack 100 when the battery pack 100 is coupled to the charging device (not illustrated) and is charged, and cooling air taken into the battery pack 100 is discharged to the outside through a slit 104 (exhaust vent-hole) provided in a front wall of the lower casing 101.

FIG. 4 is a perspective view of a state where the upper casing 110 of the battery pack 100 in FIG. 3 is detached. Ten battery cells are accommodated in an internal space of the lower casing 101. Two screw holes 103a and 103b for screwing to the upper casing 110 are formed on the front wall surface of the lower casing 101, and screws (not illustrated) pass through the screw holes 103a and 103b in a penetrating manner in the upward direction from below. Two screw holes are also formed in a rear wall surface of the lower casing 101 (not shown in this diagram). A plurality of battery cells (not illustrated) are fixed by a separator 145 in a state of being stacked in two stages with five in each stage. The separator 145 is made of a synthetic resin and is formed such that only both right and left sides constituting both end portions of the battery cells open. Inside the separator 145, the battery cells are stacked such that axes thereof are parallel to each other, and adjacent cells are disposed such that directions thereof are alternately opposite to each other. Five battery cells are connected in series by connecting the positive electrode terminals and the negative electrode terminals of adjacent battery cells using metal connection tab (not illustrated). Here, an upper cell unit 146 (which will be described below with reference to FIG. 6) constituted of five battery cells that are installed in an upper stage and are connected in series is formed, and five battery cells that are installed on the lower side and are connected in series forms a lower cell unit 147 (which will be described below with reference to FIG. 6). Here, the upper side and the lower side of the cell unit do not denote that the battery cell is in the upper stage or the lower stage inside the lower casing 101. The cell unit positioned on the ground side when two cell units are connected in series will be referred to as "a lower cell unit", and the cell unit positioned on a high voltage side when connected in series will be referred to as "an upper cell unit". The upper cell unit 146 is an example of "a first cell unit" in the present disclosure, and the lower cell unit 147 is an example of "a second cell unit" in the present disclosure. In addition, a state where the upper cell unit 146 and the lower cell unit 147 are connected in series is an example of "a series-connection state" in the present disclosure.

Regarding the battery cells, lithium ion battery cells (not illustrated) that have a so-called size of 18650 with a diameter of 18 mm and a length of 65 mm and can be charged and discharged a plurality of times are used. In the present example, in order to have a switchable output voltage from the battery pack 100, the forms of a series-connection voltage (high voltage side output) and a parallel-connection voltage (low voltage side output) of the plurality of cell units can be selected. Therefore, conforming to the idea of the present example, as long as the same number of cells are included in each of the cell units, the number of cell units is arbitrary. However, the number of cell units is set to be an even number, such as two or four. The battery cells to be used are not limited to only the size of 18650, and they may be battery cells having a so-called size of 21700 or battery cells having other sizes. In addition, the shapes of the battery cells are not limited to only a cylindrical shape, and they may have a rectangular parallelepiped shape, a laminated shape, and other shapes. The kind of the battery cells is not limited to only lithium ion batteries, and secondary batteries of an arbitrary kind such as nickel-hydride battery cells, lithium ion polymer battery cells, and nickel-cadmium battery cells may be used. Two electrodes are provided at both ends of the battery cell in the length direction. One of the two electrodes is a positive electrode and the other is a negative electrode. However, positions for providing the electrodes are not limited to only both ends side, and the electrodes may be arbitrarily disposed as long as a cell unit can be easily formed inside the battery pack.

A circuit board 150 is disposed on the upper side of the separator 145 holding the battery cells. In the circuit board 150, a plurality of connection terminals (161, 162, 164 to 168, 171, 172, and 177) are fixed through soldering, and a circuit pattern and the connection terminals are electrically connected to each other. Moreover, various electronic elements (not illustrated herein) such as a battery protection IC, a microcomputer, a PTC (positive temperature coefficient) thermistor, a resistor, a capacitor, a fuse, or a light emitting diode are mounted in the circuit board 150. The circuit board 150 is fixed such that it extends in the horizontal direction on the upper side of the separator 145 that is a non-conductor formed of a synthetic resin or the like. Regarding the material of the circuit board 150, it is possible to use a single-layer substrate, a double-sided substrate, or a multi-layer substrate referred to as a printed board in which a pattern wiring is printed using a conductor such as a copper foil on a substrate realized by having a raw material impregnated with a resin having insulation properties. In the present example, a double-sided substrate is used, so that the circuit board 150 has the upper surface (front surface, that is a surface on the upper side as seen in FIG. 4) and the lower surface (rear surface). The plurality of connection terminals (161, 162, 164 to 168, 171, 172, and 177) are disposed on the front side slightly from the center of the circuit board 150 in the front-rear direction. Here, the plurality of connection terminals are disposed substantially side by side in the lateral direction.

Each of the connection terminals is provided by being engraved on the upper stage surface of the upper casing 110 as illustrated in FIG. 3. Sequentially from the right side to the left side in the circuit board 150, the C-positive terminals (161 and 171: charging positive electrode terminals), the positive terminals (162 and 172: discharging positive electrode terminals), the T terminal 164, the V terminal 165, the LS terminal 166, the negative terminals (167 and 177: negative electrode terminals), the LD terminal 168 are disposed side by side. Here, the power supply line connection terminals from the battery pack, that is, the power terminals are constituted of two separated terminal components. That is, the C-positive terminals (charging positive electrode terminals) are constituted of the upper positive electrode terminal 161 and the lower positive electrode terminal 171, and the pair of positive electrode terminals (161 and 171) is disposed at a place corresponding to the single slot 121. An arm portion set of the upper positive electrode terminal 161 is disposed on the upper side of the inner part of the slot 121, and an arm portion set of the lower positive electrode terminal 171 is disposed on the lower side of the arm portion set of the upper positive electrode terminal 161. In a similar manner, the positive terminals (discharging positive electrode terminals) provided by being engraved on the upper casing 110 are constituted of the upper positive electrode terminal 162 and the lower positive electrode terminal 172, and the pair of positive electrode terminals (162 and 172) is disposed at a place corresponding to the single slot 122. An arm portion set of the upper positive electrode terminal 162 is disposed on the upper side of the slot 122 part, and an arm portion set of the lower positive electrode terminal 172 is disposed on the lower side of the arm portion set of the upper positive electrode terminal 162. The negative terminals (negative electrode terminals) provided by being engraved on the upper casing 110 are constituted of the upper negative electrode terminal 167 and the lower negative electrode terminal 177, and the pair of negative electrode terminals (167 and 177) is disposed at a place corresponding to the single slot 127. An arm portion set of the upper negative electrode terminal 167 is disposed on the upper side of the slot 127 part, and an arm portion set of the lower negative electrode terminal 177 is disposed on the lower side of the arm portion set of the upper negative electrode terminal 167.

The connection terminals (161, 162, and 164 to 168) are disposed at positions corresponding to the slots 121 to 128 as illustrated in FIG. 3. Therefore, the connection terminals are disposed such that fitting parts of the connection terminals open toward the upper side and the front side from the circuit board 150. However, a part between the upper positive electrode terminal 162 and the T terminal 164 becomes a free space that is not used in the battery pack 100 of the present example, similar to the battery pack 1 in the related art (refer to FIG. 1).

The pair of charging positive electrode terminals (161 and 171) is configured to be offset to the front side beyond the pair of discharging positive electrode terminals (162 and 172) disposed to be adjacent thereto. The configuration is realized due to spatial restriction and in order to avoid a movement range of a latch mechanism (not illustrated) immediately behind the pair of positive electrode terminals (161 and 171). Therefore, if there is no spatial restriction, it is favorable that the pair of positive electrode terminals (161 and 171) be disposed such that front end positions of the pair of positive electrode terminals (162 and 172) and the pair of negative electrode terminals (167 and 177) are aligned.

The positive electrode terminals (161, 162, 171, and 172) and the negative electrode terminals (167 and 177) are disposed at places far away from each other in the right-left direction, and three signal terminals (T terminal 164, V terminal 165, and LS terminal 166) are provided therebetween. In the present example, as a component for a signal terminal, a component provided with two sets of arm portions extending in the horizontal direction in total including one set on the right and left on the upper side and another set on the right and left on the lower side are used. However, the detailed shape thereof will be described below with reference to FIG. 9. Regarding the signal terminals (164 to 166 and 168), a signal terminal component having one arm portion in the up-down direction used in the related art can be used without any change. However, in the present example, in order to achieve an equivalent fitting state of the positive electrode terminals (161, 162, 171, and 172) and the negative electrode terminals (167 and 177) with respect to the apparatus side terminals, a signal terminal component (which will be described below with reference to FIG. 9) having two arm portions on the upper and lower sides on the signal terminal side is used.

A signal terminal, that is, the LD terminal 168 is further provided on the left side of the pair of negative electrode terminals (167 and 177). The LD terminal 168 is also formed to have two sets of arm portions on the upper side and the lower side. However, the LD terminal 168 differs from other signal terminals (T terminal 164, V terminal 165, and LS terminal 166) in size. The configuration is realized due to spatial restriction. Since the latch mechanism (not illustrated) reaches a place immediately behind the LD terminal 168, the LD terminal 168 is formed to be smaller than other signal terminals in order to avoid the latch mechanism. Leg portions of all the signal terminals (164 to 166 and 168) penetrate the attachment hole 151 formed in the circuit board 150 from the front surface to the rear surface and are fixed to the rear surface side through soldering. The present example also has a feature in a method of fixing three signal terminals (164 to 166), and details thereof will be described below with reference to FIG. 9 and FIG. 10. As described above, an electronic element (not illustrated) is mounted on the circuit board 150, and the plurality of connection terminals are fixed through soldering. Thereafter, the circuit board 150 is fixed to the separator 145 through screwing, bonding, or the like.

Four LEDs (not illustrated) are provided near the rear side of the circuit board 150, and prisms 191 to 194 having a slender rectangular parallelepiped shape in the up-down direction are provided on the upper side of the LEDs. The prisms 191 to 194 are disposed to face lighting surfaces of the LEDs (light emitting diodes, not illustrated) of which bottom surfaces performs upward irradiation and are provided such that obliquely-cut upper surfaces are exposed to the outside through a slit (not illustrated) formed in the upper casing 110. The prisms 191 to 194 are provided to scatter light and to perform irradiation to the outside of the upper casing 110. The four LEDs (not illustrated) are used for displaying the residual quantity of the battery pack 100. When a worker pushes a switch 190, as many LEDs as the number corresponding to the voltage of the battery cell are lit only for a certain period of time (details will be described below with reference to FIG. 24 and FIG. 25). An operation lever (not illustrated) for operating the switch 190 is provided in an outer surface part of the upper casing 110 such that it can be operated by a worker. The lower casing 101 has a substantially rectangular parallelepiped shape in which the upper surface opens, and the lower casing 101 is constituted of a bottom surface; and a front surface wall 101*a*, a rear surface wall 101*b*, a right side wall 101*c*, and a left side wall 101*d* extending in the vertical direction with respect to the bottom surface. The slit 104 is provided substantially in the center of the front surface wall 101*a*. The slit 104 is used as a discharge port for discharging cooling air sent out from the charging device side to the internal space of the battery pack 100 when charging is performed by the charging device.

Figure 5:
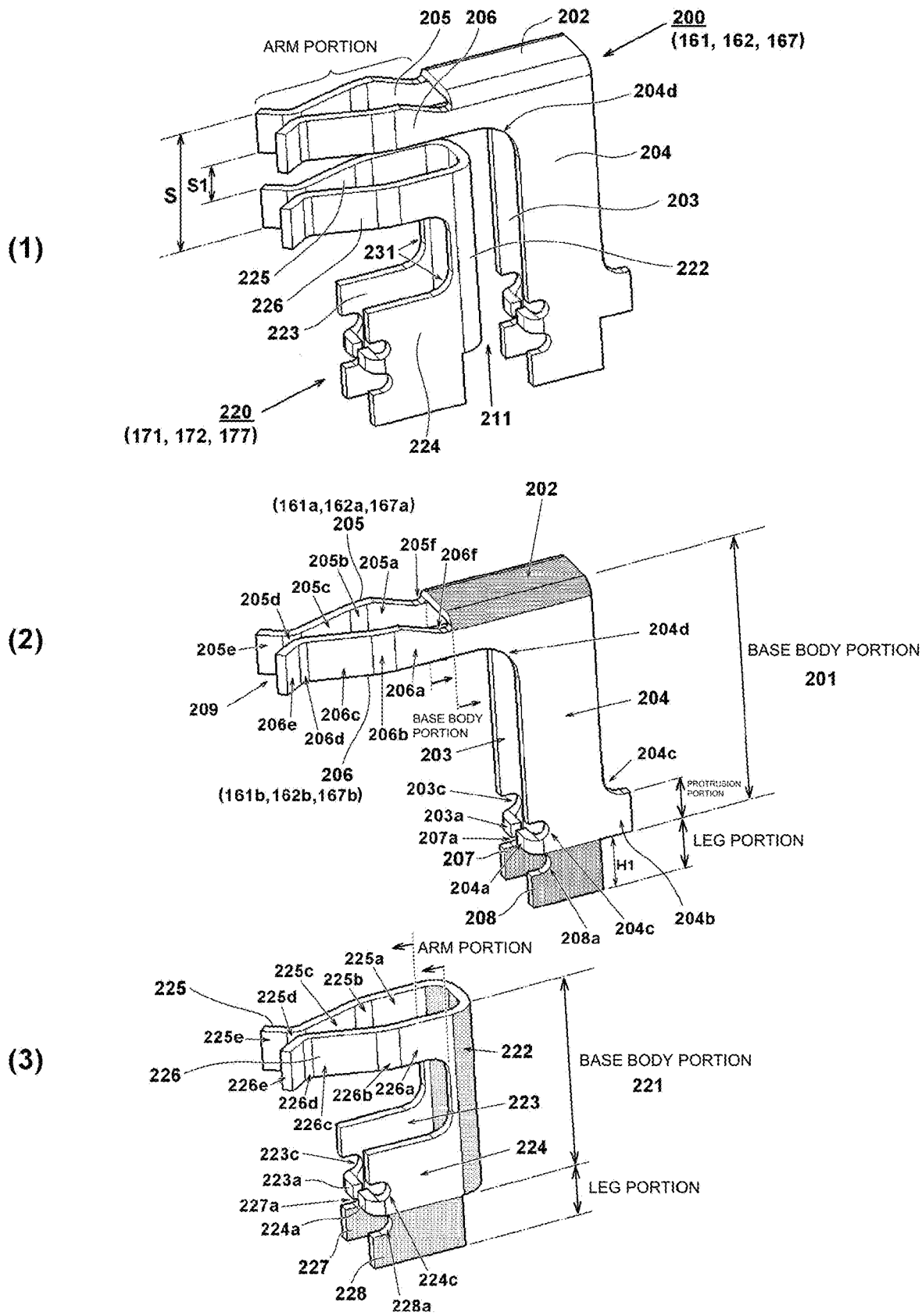
FIG. 5 is a view illustrating a shape of a single body of power terminals (161 and 171, 162 and 172, and 167 and 177) in FIG. 4, (1) of FIG. 5 is a perspective view of the entirety, (2) of FIG. 5 is a perspective view of an upper terminal component 200, and (3) of FIG. 5 is a perspective view of a lower terminal component 220.

Next, shapes of components (200 and 220) used for the power terminals will be described using FIG. 5. FIG. 5(1) is a perspective view illustrating component single bodies of the upper terminal component 200 and the lower terminal component 220. The upper terminal component 200 is a common component used for the upper positive electrode terminals 161 and 162 and the upper negative electrode terminal 167, and the lower terminal component 220 is a common component used for the lower positive electrode terminals 171 and 172 and the lower negative electrode terminal 177. The upper terminal component 200 and the lower terminal component 220 are formed by press-cutting a flat plate formed of a conductive metal through pressing and bending the cut plate into a U-shape. The upper terminal component 200 is folded such that a surface constituting a U-shaped bottom portion, that is, a bridge portion 202 becomes the upper side. The lower terminal component 220 is folded such that a bridge portion 222 becomes the rear side. The bridge portions 202 and 222 formed to be folded into a U-shape are disposed to intersect each other substantially at a right angle in this manner because an area of the side wall surface cannot be sufficiently ensured in the front-rear direction for the bridge portion 222 on the front side, and the bridge portion is reduced in size if the bridge portion is disposed on the upper side. In the lower terminal component 220 of the present example, the bridge portion 222 is provided in the vertical surface direction. Therefore, the length in the front-rear direction required for disposition can be shortened, and the size of the bridge portion, particularly the length in the up-down direction can be sufficiently ensured, so that the rigidity of the lower terminal component 220 can be enhanced. Meanwhile, in the upper terminal component 200, long arm portions 205 and 206 straddling the lower terminal component 220 can be formed, and the bridge portion 202 that constitutes a surface extending in the same direction as the front-rear direction in which the arm portions 205 and 206 extend is provided, so that the attachment rigidity of the arm portions 205 and 206 can be enhanced.

The upper terminal component 200 has a right side surface 203 and a left side surface 204 that are formed by being folded into a U-shape to be parallel to each other, and the bridge portion 202 that constitutes the upper surface connecting those to each other. The arm portions 205 and 206 are provided inward from both right and left sides on the front side of the right side surface 203 and the left side surface 204 while sandwiching the apparatus side terminal therebetween. A region of the front side portion on the left side surface 204 from the lower side to a position near the upper end is formed to extend linearly in the vertical direction and to extend to the front side from a place near an arrow 204*d* close to the upper end in a manner of exhibiting a curve having a significant radius of curvature. The shape of the right side surface 203 is formed to have plane symmetry with the left side surface 204. The arm portion 205 is disposed to extend to the front side from the upper front side of the right side surface 203, and the arm portion 206 is disposed to extend to the front side from the upper front side of the left side surface 204. In this manner, the arm portions 205 and 206 are formed to extend to the front side from the upper side part of the front side portion of a base body portion 201, that is, in a direction parallel to the mounting direction of the battery pack 100. The arm portions 205 and 206 face each other when viewed in the right-left direction and have spring properties through pressing such that the smallest gap parts, that is, fitting portions fitted into the apparatus connection terminals approach a position where they almost come into contact with each other. Here, pressing denotes plastic working performed by using a press machine. A raw material such as a sheet metal is pressed to a die with a high pressure, is subjected to shearing such as cutting, punching, and drilling, and is further subjected to bending or drawing as necessary, and are thus sheared and formed to have a desired shape. In the present example, the upper terminal component 200 and the lower terminal component 220 are formed of flat plates having a thickness of approximately 0.5 to 0.8 mm, for example. Accordingly, the positive electrode terminals 161, 162, 171, and 172 and the negative electrode terminals 167 and 177 have a high mechanical strength, so that a fitting pressure when being fitted into the apparatus side terminals is enhanced. Heat treatment, plating treatment, or the like may be performed after pressing.

The lower terminal component 220 is also manufactured in a similar manner and has a right side surface 223 and a left side surface 224 that are formed by being folded into a U-shape to be parallel to each other, and a base body portion 221 that constitutes the bridge portion 222 connecting those to each other. The arm portions 225 and 226 are formed on the front side from places near slender upper portions on the right side surface 223 and the left side surface 224. The arm portions 225 and 226 have shapes sandwiching the apparatus side terminal therebetween inward from both right and left sides. A distance S between the upper end position of the arm portion set (205 and 206) on the upper side and the lower end position of the arm portion set (225 and 226) on the lower side is configured to be substantially equivalent to the width of the power terminal provided in the 18 V battery pack in the related art. Meanwhile, the arm portion set (205 and 206) on the upper side and the arm portion set (225 and 226) on the lower side are disposed to be away from each other by a predetermined distance S1 in the up-down direction. A cutout portion 231 significantly cut out from the front side is formed below the arm portion set (225 and 226) on the lower side. The rear side of the lower terminal component 220 is fixed side by side with the right side surface 203 and the left side surface 204 of the upper terminal component 200 in the front-rear direction with a predetermined clearance 211 therebetween such that they do not come into contact with each other.

FIG. 5(2) is a perspective view of a single body of the upper terminal component 200. Here, the region of the bridge portion 202 and parts of leg portions 207 and 208 are illustrated by applying hatching thereto, such that the area thereof becomes clear. In this specification, the base body portion 201 indicates a part exposed to the upper side from the front surface of the circuit board 150 to be attached, that is, a part excluding the arm portions 205 and 206. The base body portion 201 of the upper terminal component 200 is constituted of the right side surface 203, the left side surface 204, and the bridge portion 202. The leg portions 207 and 208 are connected to parts below the lower side portion of the base body portion 201. The leg portions 207 and 208 are inserted into the attachment hole (penetration hole) of the circuit board 150. The leg portions 207 and 208 protrude from an attachment surface (front surface) of the circuit board 150 to a surface on a side opposite to an attachment surface (rear surface), the leg portions 207 and 208 are soldered to the circuit board 150 on the rear surface. In addition, through soldering, the arm portions 205 and 206 are electrically connected to the battery cells, the electronic element, and the like mounted on the circuit board 150. Here, the leg portions 207 and 208 are formed to have a height H1 greater than the thickness of the circuit board 150 to an extent smaller than twice thereof. In addition, a protrusion portion 204b protruding to the rear side is formed in the lower part of the rear side on the left side surface 204. A similar protrusion portion (not shown in FIG. 5) is also formed in the lower part of the rear side on the right side surface 203. Parts extending in projected shapes in the horizontal direction are formed on the front side of the lower part of the right side surface 203 and the left side surface 204, thereby forming bent portions 203a and 204a realized by folding the projected parts inward. In order to facilitate folding, cutout portions 203c, 204c, 207a, and 208a are formed in crooked portions on the upper side and the lower side of the bent portions 203a and 204a. The bent portions 203a and 204a and protrusion portions 203b and 204b are formed to come into contact with the upper surface in the vicinity of the attachment hole of the circuit board 150 for positioning of the upper terminal component 200 in the up-down direction.

The base body portion 201 has a substantially L-shape standing upside down in a side view. Flat surface portions 205a and 206a in which the right side surface 203 and the left side surface 204 extend forward from parts near connection portions on the rear side in a flush surface shape are formed in the rear parts of the arm portions 205 and 206. A gap between the flat surface portions 205a and 206a in the right-left direction is uniform such that they are parallel to each other. Crooked portions 205b and 206b that are bent inward when viewed in the right-left direction are formed in front of the flat surface portions 205a and 206a. Again, flat surface portions 205c and 206c are formed on the front side of the crooked portions 205b and 206b. The flat surface portion 205c and the flat surface portion 206c facing each other are surfaces extending in the vertical direction and having a tapered shape in which a gap on the rear side is large and is gradually narrowed toward the front side. Fitting portions 205d and 206d that are bent to expand outward at a large radius of curvature $R_1$ are formed in tip parts of the flat surface portions 205c and 206c. When curved surface parts of the fitting portions 205d and 206d on the inner side come into contact with the terminals of the power tool main bodies 1 and 30, the upper terminal component 200 is electrically conducted with the connection terminals on the power tool main bodies 1 and 30 side. The inner sides of the fitting portions 205d and 206d have a shape in which the battery pack 100 has a slight clearance 209 in a state of being detached from the power tool main bodies 1 and 30. The front sides of the fitting portions 205d and 206d are connected to guide portions 205e and 206e that are formed such that the gap suddenly increases toward the front, thereby guiding the terminals on the power tool main bodies 1 and 30 side. Here, surfaces of the guide portions 205e and 206e on the inner side have a flat surface shape. However, the surfaces may have a curved surface shape. They are formed such that the height in the up-down direction becomes uniform from the crooked portion 205b to the guide portion 205e and from the crooked portion 206b to the guide portion 206e. Meanwhile, cutout portions 205f and 206f are formed in the downward direction on the flat surface portions 205a and 206a such that the heights decrease toward the rear side. The cutout portions 205f and 206f are formed for the reason of manufacturing facilitating folding of the arm portions 205 and 206 at the time of pressing, and for adjusting a sandwiching load (or a fitting pressure) in a set of the fitting portions 205d and 206d. Through formation as described above, it is possible to realize the upper terminal component 200 that has excellent durability and is easy to use. It is preferable that the sizes of the fitting portions 205d and 206d of the arm portions 205 and 206 in the height direction be large as much as possible. However, the heights of the crooked portions 205b and 206b, the flat surface portions 205c and 206c, and the guide portions 205e and 206e in the up-down direction are not necessarily uniform and may be formed to have a shape that varies in the front-rear direction.

FIG. 5(3) is a perspective view of a single body of the lower terminal component 220. Here, the region of the bridge portion 222 and parts of leg portions 227 and 228 are illustrated by applying hatching thereto, such that the area thereof becomes clear. As it can be seen in this diagram, the lower terminal component 220 differs from the upper terminal component 200 in direction of being bent into a U-shape. Here, the base body portion 221 has substantially an L-shape standing upright in a side view, and the arm portions 225 and 226 are connected to the front side beyond the upper front sides of the right side surface 223 and the left side surface 224. Parts near connection portions with respect to the base body portion 221 of the arm portions 225 and 226 are flush with the right side surface 223 and the left side surface, and flat surface portions 225a and 226a of which facing surfaces are parallel to each other are formed. Crooked portions 225b and 226b that are bent inward when viewed in the right-left direction are formed in front of the flat surface portions 225a and 226a. Again, flat surface portions 225c and 226c are formed on the front side of the crooked portions 225b and 226b. The flat surface portion 225c and the flat surface portion 226c facing each other have a tapered shape in which a gap on the rear side is large and is gradually narrowed toward the front side. Fitting portions 225d and 226d that are bent at a large radius of curvature are formed in tip parts of the flat surface portions 225c and 226c. When curved surfaces of the fitting portions 225d and 226d on the inner side come into contact with the terminals of the power tool main bodies 1 and 30, and are thus in an electrically conducting state. The inner sides of the fitting portions 225d and 226d have a shape in which the battery pack 100 has a slight clearance in a state of being detached from the power tool main bodies 1 and 30. The front sides of the fitting portions 225d and 226d are formed such that the gap suddenly increases toward the front, thereby forming guide portions 225e and 226e for guiding the terminals on the power tool main bodies 1 and 30 side. Surfaces of the guide portions 225e and 226e on the inner side may have a flat surface shape or a curved surface shape. They are formed such that the height in the up-down direction becomes uniform from the flat surface portion 225a to the guide portion 225e and from the flat surface portion 226a to the guide portion 226e. However, similar to the arm portions 205 and 206 of the upper terminal component 200, they may be formed such that the height in the up-down direction varies excluding the fitting portions 225d and 226d. Through formation as described above, in the present example, it is possible to realize the lower terminal component 220 that has excellent durability and is easy to use.

The cutout portion 231 (refer to FIG. 5(1)) cut out into a U-shape in a side view is formed on the lower side of the arm portions 225 and 226 of the lower terminal component 220 from the front side toward the rear side. The cutout portion 231 is formed because a board cover 180 (which will be described below with reference to FIG. 11) for partitioning the upper terminal component 200 and the lower terminal component 220 is provided in this part. The leg portions 227 and 228 are connected to the lower side of the base body portion 221. The leg portions 227 and 228 are inserted into the attachment hole of the circuit board 150. The leg portions 227 and 228 protrude from the attachment surface (front surface) of the circuit board 150 to a surface (rear surface) on a side opposite thereto, and the protruding parts are soldered. In addition, an electrical connection state with respect to the battery cells, the electronic element, and the like mounted on the circuit board 150 is established through soldering from the arm portions 225 and 226. Here, the set of the leg portions 227 and 228 is independently wired in a state where they are not short-circuited with the set of the leg portions 207 and 208 of the upper terminal component 200. The dimensions or the shapes of the leg portions 227 and 228 are substantially the same as those of the leg portions 207 and 208, and bent portions 223a and 224a are formed on the front side. Cutout portions 223c, 224c, 227a, and 228a are formed on the upper side and the lower side of the crooked portions of the bent portions 223a and 224a. However, the cutout portions are formed for accurate bending at the time of pressing. Therefore, the cutout portions are not necessarily provided.

Figure 6:
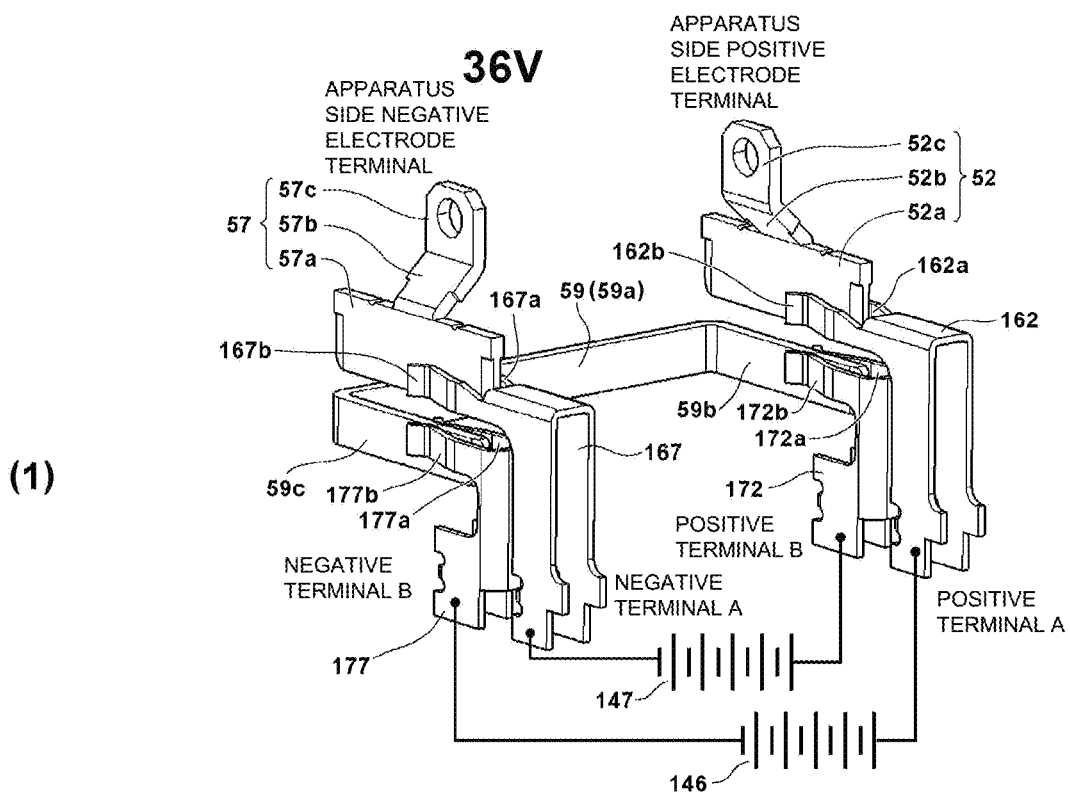
FIG. 6 is a perspective view illustrating a state connecting the power terminals to the power tool main body, (1) of FIG. 6 illustrates a state where the power terminals are connected to a power tool main body 30 of the present example, and (2) of FIG. 6 illustrates a state where the power terminals are connected to the power tool main body 1 in the related art.
Figure 6:
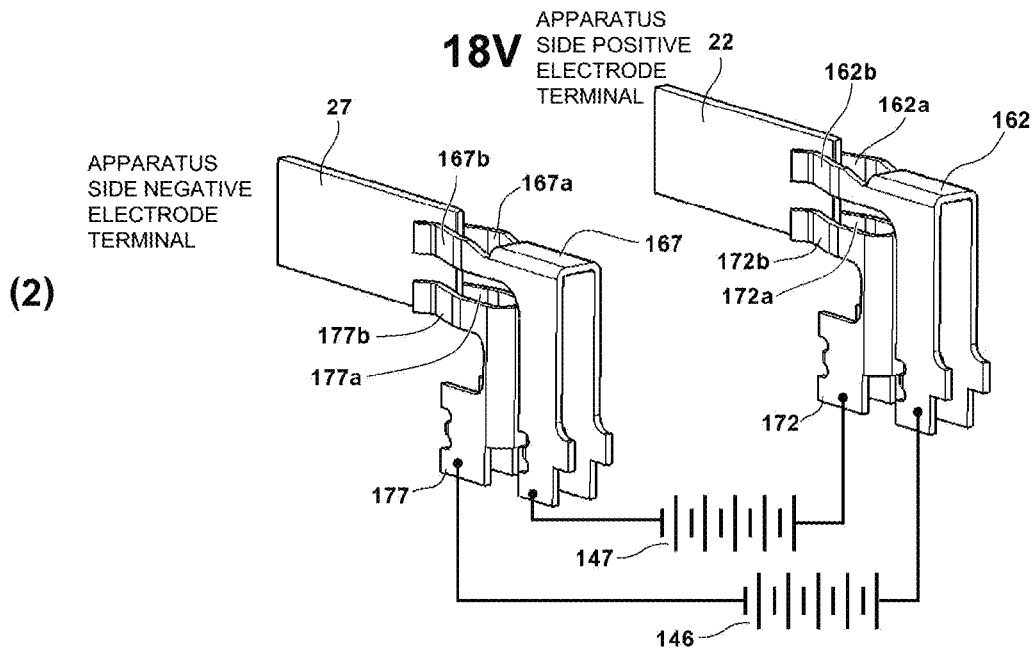

Next, the shape of the terminal portion 20 on the power tool main bodies 1 and 30 side and a connection state of the battery pack 100 and the connection terminals when the battery pack 100 is mounted in the power tool main bodies 1 or 30 will be described using FIG. 6. Here, the discharging positive electrode terminals (upper positive electrode terminal 162 and lower positive electrode terminal 172) and the negative electrode terminals (upper negative electrode terminal 167 and lower negative electrode terminal 177) of the connection terminals of the battery pack 100 are illustrated. The LD terminals 28 and 58 (not illustrated herein) are further provided in the terminal portions 20 and 50 of the power tool main bodies 1 and 30. FIG. 6(1) is a view illustrating a state where the battery pack 100 is mounted in the 36 V power tool main body 30. As described above, ten battery cells are accommodated inside the battery pack 100. Five battery cells constitute the upper cell unit 146, and the remaining five battery cells constitute the lower cell unit 147. Here, regarding the terminal portion, terminal portions 52a and 57a of a positive electrode input terminal 52 and a negative electrode input terminal 57 are smaller than the terminal portion 20 of the power tool main body 1 in the related art. That is, the width in the up-down direction is formed to be small such that the terminal portions come into contact with only the upper positive electrode terminal 162 and the upper negative electrode terminal 167 disposed on the upper side. The positive electrode side output terminal of the upper cell unit 146 is connected to the upper positive electrode terminal 162, and the negative electrode side output terminal is connected to the lower negative electrode terminal 177. Meanwhile, the positive electrode side output terminal of the lower cell unit 147 is connected to the lower positive electrode terminal 172, and the negative electrode side output terminal is connected to the upper negative electrode terminal 167. That is, two sets of positive electrode terminal and negative electrode terminal are provided independently. One terminal set (upper positive electrode terminal 162 and lower negative electrode terminal 177) crossing in the right-left direction and in the vertical direction is connected to the upper cell unit 146, and the other terminal set (lower positive electrode terminal 172 and upper negative electrode terminal 167) is connected to the lower cell unit 147. Since the upper positive electrode terminal 162 and the lower positive electrode terminal 172 are not electrically connected to each other, they are in an electrically independent state in a state where the battery pack 100 is not mounted in the electric apparatus main body (state where the battery pack 100 is detached). Similarly, since the upper negative electrode terminal 167 and the lower negative electrode terminal 177 are not electrically connected to each other inside the battery pack 100, they are in an electrically independent state in a state where the battery pack 100 is not mounted in the electric apparatus main body (state where the battery pack 100 is detached). The state where the upper cell unit 146 and the lower cell unit 147 are electrically independent from each other is an example of "a non-connection state" in the present disclosure.

As illustrated in FIG. 6(1), the positive electrode input terminal 52 and the negative electrode input terminal 57 for receiving power are provided in the terminal portion of the rated 36 V power tool main body 30. Regarding a positional relationship at the time of mounting, the positive electrode input terminal 52 is fitted into only the upper positive electrode terminal 162, and the negative electrode input terminal 57 is fitted into only the upper negative electrode terminal 167. Meanwhile, a short bar 59 for connecting the lower positive electrode terminal 172 and the lower negative electrode terminal 177 to each other such that they are short-circuited is further provided in the terminal portion of the power tool main body 30. The short bar 59 is a short circuit member constituted of a metal conductive member, in which one end side of the metal member bent into a U-shape constitutes a terminal portion 59*b* fitted into the lower positive electrode terminal 172, and the other end side constitutes a terminal portion 59*c* fitted into the lower negative electrode terminal 177. The terminal portion 59*b* and the terminal portion 59*c* are connected to each other by a connection portion 59*a*. The short bar 59 is fixed such that it is cast in a synthetic resin base 51 (which will be described below with reference to FIG. 7) together with a different apparatus side terminal such as the positive electrode input terminal 52 or the negative electrode input terminal 57. Since the short bar 59 is used for only causing the lower positive electrode terminal 172 and the lower negative electrode terminal 177 to be short-circuited, there is no need for the short bar 59 to be wired to the control circuit or the like of the power tool main body.

The positive electrode input terminal 52 is formed to have a terminal portion 52*a* that is a part fitted into the upper positive electrode terminal 162 and formed to have a flat plate shape, a wiring portion 52*c* for soldering a lead wire performing wire connection with respect to the circuit board side on the power tool main body 30 side, and a coupling portion 52*b* that connects the terminal portion 52*a* and the wiring portion 52*c* to each other and constitutes a part cast in the synthetic resin base 51. Here, the position of the wiring portion 52*c* is disposed to deviate inward compared to the position of the terminal portion 52*a* in the right-left direction, in order to adjust the gap of the wiring portion 52*c* and to ensure that the coupling portion 52*b* is stably held by the base 51 through casting. Moreover, right and left corner portions of the terminal portion 52*a* on the front side are configured to be obliquely chamfered such that the terminal portion 52*a* easily enter a space between an arm portion 162*a* and an arm portion 162*b*. The negative electrode input terminal 57 and the positive electrode input terminal 52 can be common components. When the terminal is disposed in a state of being rotated by 180 degrees about the vertical axis, it can be used as either the negative electrode input terminal 57 or the positive electrode input terminal 52. Therefore, the negative electrode input terminal 57 is also formed to have a terminal portion 57*a*, a wiring portion 57*c*, and a coupling portion 57*b* connecting these to each other. The front side corner portion (corner portion on the rear side when this component is used as the positive electrode input terminal 52) of the terminal portion 57*a* is also obliquely chamfered, such that the terminal portion 57*a* easily enter a space between an arm portion 167*a* and an arm portion 167*b*.

In FIG. 6(1), when the battery pack 100 is mounted, if the battery pack 100 is relatively moved in the insertion direction with respect to the power tool main body 30, the positive electrode input terminal 52 and the terminal portion 59*b* are inserted thereinto through the same slot 122 (refer to FIG. 3) and are fitted into the upper positive electrode terminal 162 and the lower positive electrode terminal 172. At this time, the positive electrode input terminal 52 is press-fitted between the arm portions 162*a* and 162*b* of the upper positive electrode terminal 162 such that a space between the fitting portions of the upper positive electrode terminal 162 is widened. In addition, the negative electrode input terminal 57 and the terminal portion 59*c* are inserted thereinto through the same slot 127 (refer to FIG. 3) and are fitted into the upper negative electrode terminal 167 and the lower negative electrode terminal 177. At this time, the negative electrode input terminal 57 is press-fitted between the arm portions 167*a* and 167*b* of the upper negative electrode terminal 167 such that a space between the fitting portions of the upper negative electrode terminal 167 is widened. Moreover, the terminal portions 59*b* and 59*c* of the short bar 59 is press-fitted such that a space between a space between the arm portions 172*a* and 172*b* of the lower positive electrode terminal 172 and the lower negative electrode terminal 177 and a space between arm portions 177*a* and 177*b* is widened. In addition, as illustrated in FIG. 7(1), the front side corner portions of the terminal portions 52*a*, 54*a* to 58*a*, 59*b*, and 59*c* are obliquely chamfered as indicated by the arrows 52*d*, 54*d* to 59*d*, and 59*e* such that they can be smoothly inserted into a space between the arm portions of the connection terminals on the battery pack 100 side.

The plate thicknesses of the terminal portion 52*a*, the terminal portion 57*a*, and the terminal portions 59*b* and 59*c* are greater than an initial clearance (clearance when the battery pack 100 is not mounted) of the fitting portion of each arm portion. Therefore, a predetermined fitting pressure acts on a fitting point of each of the terminal portion 52*a*, the terminal portion 57*a*, and the terminal portions 59*b* and 59*c* with respect to the upper positive electrode terminal 162, the upper negative electrode terminal 167, the lower positive electrode terminal 172, and the lower negative electrode terminal 177. As a result of such connection, the apparatus side terminals (terminal portion 52*a*, terminal portion 57*a*, and terminal portions 59*b* and 59*c*) of the power tool main body 30 and the power terminals (upper positive electrode terminal 162, upper negative electrode terminal 167, lower positive electrode terminal 172, and lower negative electrode terminal 177) of the battery packs favorably come into contact with each other in a state where electrical contact resistance is reduced. In this manner, the electric apparatus main body 30 has the third terminal (52*a*) that is inserted into the single slot (122) and is connected to only the first terminal (162) of the first and second terminals (162 and 172), and the fourth terminal (59*b*) that is inserted into the single slot (122) and is connected to only the second terminal (172). When the battery pack 100 is connected to the electric apparatus main body 30, the first and third terminals (162 and 52*a*) are connected to each other inside the single slot 122 and becomes a first potential, and the second and fourth terminals (172 and 59*b*) are connected to each other and becomes a second potential different from the first potential. Similarly, since the pair of negative electrode terminals (167 and 177) side is also in a connection state, the connection form in FIG. 6(1) is realized, so that an output of series-connection of the upper cell unit 146 and the lower cell unit 147, that is, a rated voltage of 36 V is output from the battery pack 100. The 36 V power tool main body 30 is an example of "a first electric apparatus main body" in the present disclosure. In addition, the short bar 59 of the 36 V power tool main body 30 is an example of "a series-connection circuit" in the present disclosure, and a state where the upper cell unit 146 and the lower cell unit 147 are connected in series is an example of "a series-connection state" in the present disclosure.

Meanwhile, when the battery pack 100 is mounted in the 18 V power tool main body 1 in the related art, a connection relationship is established as in FIG. 6(2). When the battery pack 100 is attached to the power tool main body 1, the positive electrode input terminal 22 is press-fitted such that both opening end portions of the upper positive electrode terminal 162 and the lower positive electrode terminal 172 are widened. Then, a region of a part of the positive electrode input terminal 22 on the upper side comes into contact with the upper positive electrode terminal 162, a region of a part thereof on the lower side comes into contact with the lower positive electrode terminal 172. The same applies to the negative electrode input terminal 27. In this manner, the positive electrode terminals 162 and 172 are in a short-circuited state by being fitted into the arm portions 162a and 162b of the upper positive electrode terminal 162 and the arm portions 172a and 172b of the lower positive electrode terminal 172 at the same time, and an output of parallel-connection of the upper cell unit 146 and the lower cell unit 147, that is, a rated voltage of 18 V is output to the power tool main body 1. The positive electrode input terminal 22 and the negative electrode input terminal 27 are formed of a metal plate having a uniform thickness. Therefore, it is important that a fitting pressure due to the arm portions of the upper positive electrode terminal 162 and the upper negative electrode terminal 167, and a fitting pressure due to the arm portions of the lower positive electrode terminal 172 and the lower negative electrode terminal 177 be equivalent to each other. In addition, in order to make the fitting pressures uniform, the thicknesses of the positive electrode input terminal 52 and the negative electrode input terminal 57 of the 36 V power tool main body 30 illustrated in FIG. 9(1), and the terminal portions 59b and 59c of the short bar 59 are set to be the same as the thicknesses of the positive electrode input terminal 22 and the negative electrode input terminal 27 of the 18 V power tool main body 1 in the related art. The 18 V power tool main body 1 is an example of "a second electric apparatus main body" in the present disclosure. In addition, the positive electrode input terminal 22 and the negative electrode input terminal 27 of the 18 V power tool main body 1 are examples of "a parallel-connection circuit" in the present disclosure, and a state where the upper cell unit 146 and the lower cell unit 147 are connected in parallel is an example of "a parallel-connection state" in the present disclosure.

As described above, in the battery pack 100 of the present example, since the output of the battery pack 100 is automatically switched when the battery pack 100 is mounted in the 18 V power tool main body 1 or the 36 V power tool main body 30, a convenient battery pack 100 supporting a plurality of voltages can be realized. This voltage switching is not performed on the battery pack 100 side but is automatically performed depending on the shape of the terminal portion on the power tool main bodies 1 and 30 side. Therefore, there is no possibility of occurrence of erroneous voltage setting. In addition, since there is no need to provide a dedicated voltage switching mechanism such as a mechanical switch on the battery pack 100 side, it is possible to realize a long-life battery pack with a simple structure and less possibility of malfunction. Since the short bar 59 causing the lower positive electrode terminal 172 and the lower negative electrode terminal 177 to be short-circuited can be mounted within the same space as the existing terminal portion 20 of the 18 V battery pack, it is possible to realize a voltage switchable battery pack having a compatible size with those in the related art. Moreover, when charging is performed using an external charging device, charging can be performed by the connecting method as in FIG. 6(2). Therefore, there is no need to prepare a charging device that performs charging of both a high voltage and a low voltage. When the battery pack 100 is charged using an external charging device (not illustrated), charging can be performed using the same charging device as that for the 18 V battery pack in the related art. In such a case, the terminal of the charging device has the shape equivalent to that in FIG. 6(2). However, instead of the discharging positive electrode terminals (162 and 172), the charging positive electrode terminal (upper positive electrode terminal 161 and lower positive electrode terminal 171) are connected to the positive electrode terminals of the charging device (not illustrated). At this time, the connection situation is also substantially equivalent to the connection relationship illustrated in FIG. 6(2). In this manner, charging is performed using an 18 V charging device in a state where the upper cell unit 146 and the lower cell unit 147 are connected in parallel. Therefore, in a case of charging the battery pack 100 of the present example, a new charging device does not have to be prepared.

FIG. 7(1) is a perspective view of a terminal portion 50 of the power tool main body 30 of the present example. The terminal portion 50 is manufactured by casting four metal connection terminals 54 to 56 and 58 in the synthetic resin base 51, in addition to the positive electrode input terminal 52, the negative electrode input terminal 57, and the short bar 59 illustrated in FIG. 6(1). Regarding the shapes of the connection terminals 54 to 56 and 58, parts of coupling portions 52b and 57b of the positive electrode input terminal 52 and the negative electrode input terminal 57 in FIG. 6(1) are formed linearly, terminal portions 54a to 56a and 58a fitted into the connection terminals on the battery pack 100 side are formed on one side, wiring portions 54c to 56c and 58c for soldering the lead wires are formed while holes are formed on the other side, and connection portions 54b to 56b and 58b that connect the terminal portions and wiring portions to each other and are cast in a synthetic resin are formed. The base 51 firmly holds the terminal portions 52a, 54a to 56a, and 58a such that all the upper side portions of the terminal portions 52a and 54a to 58a and all the rear side portions are cast. In addition, regarding the terminal portions 54a to 56a and 58a, a part of the lower side portion on the rear side is cast. In the short bar 59 of which the shape is illustrated in FIG. 6(1), the entire connection portion 59a (refer to FIG. 6) extending in the right-left direction is cast in the base 51, and front parts of the terminal portions 59b and 59c are exposed to the front side from the base 51. In addition, since a portion below a part on the rear side exposed to the outside of the terminal portions 59b and 59c is cast in the base 51, the terminal portions 59b and 59c are firmly held such that they do not move in the right-left direction. In this manner, a plurality of plate-shaped apparatus side terminals are disposed side by side in the terminal portion 50. Here, the terminal portion 52a and the terminal portion 59b are disposed to be away from each other with a uniform clearance 53a therebetween in the up-down direction. In a similar manner, the terminal portion 57a and the terminal portion 59c are disposed to be away from each other with a uniform clearance 53b therebetween in the up-down direction.

FIG. 7(2) is a view illustrating a connection situation of the terminal portion 50 and the power terminals (162, 172, 167, and 177) of the battery pack 100. The upper positive electrode terminal 162 has two arm portions 162a and 162b (corresponding to the arm portions 205 and 206 in FIG. 5(1)), and the lower positive electrode terminal 172 has two arm portions 172a and 172b (corresponding to the arm portions 225 and 226 in FIG. 5(1)). The arm portions 162a and 162b of the upper positive electrode terminal 162 are connected to each other such that the terminal portion 52a formed to have a plate shape is laterally sandwiched therebetween. At the time of this joining, the arm portions 162a and 162b are bent apart from each other in the right-left direction, so that a predetermined sandwiching load (fitting pressure) is applied to the terminal portion 52a due to a restoring force of spring action. As a result, the arm portions 162a and 162b and the terminal portion 52a favorably come into surface contact or line contact with each other. Therefore, favorable conductivity having extremely small contact resistance can be realized. In a similar manner, the arm portions 167a and 167b of the upper negative electrode terminal 167 are fitted such that the terminal portion 57a formed to have a plate shape is laterally sandwiched therebetween.

The arm portions 172a and 172b of the lower positive electrode terminal 172 are fitted such that the terminal portion 59b formed to have a plate shape is laterally sandwiched therebetween. At the time of this fitting, the arm portions 172a and 172b are bent apart from each other in the right-left direction, so that a predetermined sandwiching load (fitting pressure) is applied to the terminal portion 59b due to a restoring force of spring action. As a result, the arm portions 172a and 172b and the terminal portion 59b favorably come into surface contact or line contact with each other. Therefore, favorable conductivity can be realized without having contact resistance. In a similar manner, the arm portions 177a and 177b of the lower negative electrode terminal 177 are fitted such that the terminal portion 59c formed to have a plate shape is laterally sandwiched therebetween.

In the present example, it is important that a non-contact state between the connection part of the terminal portion 52a and the upper positive electrode terminal 162, and the connection part of the terminal portion 59b and the lower positive electrode terminal 172 be retained and that an electrically insulating state be maintained. In addition, it is important that a non-contact state between the connection part of the terminal portion 57a and the upper negative electrode terminal 167, and the connection part of the terminal portion 59c and the lower negative electrode terminal 177 be retained and that an electrically insulating state be maintained. In such a configuration, even when the battery pack 100 vibrates in a resonance frequency different from that of the power tool main body 30 due to various vibrations or shocks occurring while the power tool is in use, occurrence of a short circuit between the upper positive electrode terminal 162 and the lower positive electrode terminal 172 can be inhibited, and occurrence of a short circuit between the upper negative electrode terminal 167 and the lower negative electrode terminal 177 can be inhibit. In FIG. 7(2), illustration of the connection terminals on the battery pack side to be fitted into the terminal portions 54a to 56a and 58a is omitted. However, when the power terminals on the positive electrode side (upper positive electrode terminal 162 and lower positive electrode terminal 172) and the power terminals on the negative electrode side (upper negative electrode terminal 167 and lower negative electrode terminal 177) are connected to each other, the signal terminals (T terminal 164, V terminal 165, LS terminal 166, and LD terminal 168 illustrated in FIG. 4) are similarly fitted into the terminal portions 54a to 56a and 58a.

FIG. 8(1) is a perspective view of the terminal portion 20 of the power tool main body 1 in the related art, and FIG. 8(2) is a view illustrating a connection situation of the power terminals of the battery pack 100. The terminal portion 20 is manufactured by casting six metal terminals 22 and 24 to 28 in a synthetic resin base 21. Regarding the shapes of the terminals 22 and 24 to 28, as in FIG. 6(2) illustrating a part of the terminals 22 and 27 before casting, the terminal portions 22a and 24a to 28a fitted into the connection terminals on the battery pack 100 side are formed on one side, the wiring portions for soldering the lead wires are formed while holes are formed on the other side, and connection portions 22c and 24c to 28c that connect the terminal portions and wiring portions to each other and are cast in a synthetic resin of the base 21 are formed. The base 21 firmly holds the terminal portions 22a and 24a to 28a such that all the upper side portions of the terminal portions 22a and 24a to 28a, all the rear side portions, and part of the lower side portions on the rear side are cast. The front side corner portions of the terminal portions 22a and 24a to 28a are obliquely chamfered as indicated by the arrows 22d and 24d to 28d such that they can be smoothly inserted into a space between the arm portions of the connection terminal on the battery pack 100 side. Regarding the shape of the terminal portion 20, a groove portion 21b extending in the right-left direction is formed on the front side of the base 21, and a groove portion 21c extending in the right-left direction is similarly formed on the rear side. The groove portions 21b and 21c are pinched in an opening part of the housing in the terminal portion 20.

FIG. 8(2) is a view illustrating a connection situation of the terminal portion 20 and the power terminals (162, 172, 167, and 177) of the battery pack 100. Here, illustration of the signal terminals (T terminal 164, V terminal 165, LS terminal 166, and LD terminal 168) on the battery pack 100 side is omitted. The arm portions 162a and 162b of the upper positive electrode terminal 162 are fitted such that an upper region of a terminal portion 22a formed to have a plate shape is laterally sandwiched therebetween. At the time of this fitting, the arm portions 162a and 162b are bent apart from each other in the right-left direction, so that a predetermined sandwiching load (fitting pressure) is applied to the terminal portion 22a due to a restoring force of spring action. In addition, the arm portions 172a and 172b of the lower positive electrode terminal 172 are fitted such that the lower part of the terminal portion 22a formed to have a plate shape is laterally sandwiched therebetween. Each of the arm portions 167a, 167b, 177a, and 177b of the upper negative electrode terminal 167 and the lower negative electrode terminal 177 of the power terminals is in a similar fitting state. In this manner, four arm portions 162a, 162b, 172a, and 172b come into contact with one terminal portion 22a. In a similar manner, on the negative electrode side as well, the arm portions 167a and 167b of the upper negative electrode terminal 167 are fitted such that the upper region of a terminal portion 27a formed to have a plate shape is laterally sandwiched therebetween, and the arm portions 177a and 177b of the lower negative electrode terminal 177 are fitted such that the lower part of the terminal portion 27a is laterally sandwiched therebetween. In this manner, four arm portions 162a, 162b, 172a, and 172b come into contact with one terminal portion 22a. In a similar manner, four arm portions 167a, 167b, 177a, and 177b come into contact with the terminal portion 27a. Therefore, these can favorably come into surface contact or line contact with each other, so that favorable conductivity can be realized without having contact resistance.

Next, the shape of components used for three terminals (164 to 166), that is, a signal terminal component 240 will be described using FIG. 9. The signal terminal component 240 is manufactured by pressing one metal plate. From a base body portion 241 realized by bending a thin metal plate such that a bridge portion 242 constituting a U-shaped bottom part becomes a vertical surface on the rear side, the arm portion set (arm portion base portions 245 and 246) extends to the front side. The arm portion base portion 245 is formed to apart as an arm portion sets on the upper and lower side (arm portions 251 and 253), and since a cutout groove 244b extending in the horizontal direction is formed, the arm portion base portion 246 is formed to apart as an arm portion sets on the upper and lower side (252 and 254). A metal plate used in pressing is a flat plate having a thickness of 0.3 mm and it may be thinner than the plate thickness of 0.5 mm of the upper terminal component 200 and the lower terminal component 220 used for the power terminals. The arm portion sets on the upper side and the lower side are formed to have the same shape as each other, and the length in the front-rear direction, the width in the up-down direction, the plate thickness, and the like are the same as each other. The fitting portions (251d, 253d, and the like) are formed in each of the arm portion set (arm portions 251 and 252) on the upper side and the arm portion set (arm portions 253 and 254) on the lower side. However, the upper and lower shapes curved for the fitting portions are also the same as each other, and the right and left arm portions have plane-symmetrical shapes. Meanwhile, attachment positions of leg portions 249 and 250 are disposed to significantly deviate in the front-rear direction. The shape of the lower part of the base body portion 241 is different on the right and left, so that a right side surface 243 and a left side surface 244 have asymmetrical shapes. The leg portion 249 is disposed to significantly deviate forward compared to a position of a leg portion 250 in the related art, and the leg portions 249 and 250 are significantly distanced away from each other in the front-rear direction. In this manner, since the leg portion 249 and the leg portion 250 are disposed to deviate forward and rearward instead of being side by side adjacent to each other in the right-left direction, an extension portion 243a significantly extending forward is formed near a lower side of the right side surface 243, and the leg portion 249 is formed to extend in the downward direction from a front end part. Each of the leg portion 249 and the leg portion 250 is fixed to the circuit board 150 by penetrating the penetration hole (not illustrated) formed in the circuit board 150 from the front surface to the rear surface side and soldering the part protruding to the rear surface side, and the arm portion set (arm portions 251 and 252) on the upper side and the arm portion set (arm portions 253 and 254) on the lower side are electrically connected to the electronic element mounted in the circuit board 150.

A bent portion 243b that limits the insertion amount of the circuit board 150 in the attachment hole 151 (refer to FIG. 4) and is folded in the left direction is formed above the leg portion 249. Cutout portions 243c and 249a that are cut out into semicircular shapes in order to facilitate folding are formed on the upper side and the lower side of bent parts of the bent portion 243b. Stepped portions 250a and 250b formed on the front side and the rear side of the leg portion 250 are used for positioning of the leg portion 250 on the rear side with respect to the circuit board 150. The stepped portion 250a is formed by causing the lower part of the left side surface 244 to extend forward, and the stepped portion 250b is formed by utilizing the lower side portion of the bridge portion 242 curving in a U-shape. In this manner, when the stepped portions 250a and 250b abut the front surface of the circuit board 150, the attachment position of the leg portion 250 in the up-down direction can be determined. The attachment positions of the leg portions 249 and 250 in the front-rear direction are regulated by the position of the attachment hole 151 (refer to FIG. 4) in the circuit board 150.

FIG. 9(2) is a view of a single body of the signal terminal component 240 viewed from the front lower side. As it can be seen from this diagram, since a cutout groove 245b extending in the horizontal direction is formed on the front side of the arm portion base portion 245, the arm portion set is separated as the upper and lower arm portions (arm portions 251 and 253). In addition, the leg portion 249 on the right side is disposed to significantly deviate forward compared to the leg portion 250 on the left side. As a result, even if a force is applied to four arm portions 251, 252, 253, and 254 in the upward direction or the downward direction, the signal terminal component 240 can be firmly held in the circuit board. An external force applied to the arm portions 251, 252, 253, and 254 is applied such that the arm portion set is pushed to the rear side when the battery pack 100 is mounted in the power tool main bodies 1 and 30, and this force acts in a direction of tilting the signal terminal component 240 rearward. On the contrary, when the battery pack 100 is detached from the power tool main bodies 1 and 30, it becomes a force pushing the arm portion set to the front side, and this force acts in a direction tilting the signal terminal component 240 forward. In this manner, an external force that is applied when the battery pack 100 is mounted and detached can be effectively received by causing the positions of the leg portions 249 and 250 to deviate in the front-rear direction, and the attachment rigidity of the signal terminal component 240 can be strengthened drastically, so that durability of the battery pack 100 can be enhanced. Moreover, the arm portion set is also formed apart in two stages on the upper side and the lower side. Therefore, even if various vibrations are received or an external force is received during an operation of the power tool, a favorable contact state with respect to the terminals on the power tool main body side can be maintained due to four contact regions of the arm portions. Meanwhile, since the number of attachment holes and the number of soldering places in the circuit board 150 required when this signal terminal component 240 is manufactured are the same as those in the related art, increase in manufacturing cost can be suppressed.

The signal terminal component 240 of the present example exhibits another effect in addition to improvement in rigidity. In the signal terminal component in the related art (not illustrated), leg portions to be soldered to the circuit board and to be electrically and mechanically attached are provided at two places. However, the leg portions are arranged in the right-left direction, and there are many cases where the space between the leg portions is small and solder parts are connected to each other, so that it is not possible to perform wiring in which a signal pattern passes through a space between the right and left leg portions. In the battery pack 100 of the present example, one leg portion 249 of the signal terminal component 240 is disposed on the front side and the other leg portion 250 is disposed on the rear side, such that both the leg portions are disposed apart from each other. Accordingly, the distance between the leg portions of the signal terminal component 240 increases, so that it is possible to easily lay a plurality of wirings or to perform wiring of thick pattern in which a main current flows. Such a signal terminal component 240 is preferable when it is desired to achieve a high function in the battery pack 100 of the present example, that is, the battery pack in the related art and to promote miniaturization in voltage ratio. Particularly, when a voltage switching function is realized after the voltage is raised, the number of electronic elements to be mounted in the circuit board 150 increases. Here, there is a need to achieve efficient pattern wiring and to thicken the wiring in which the main current flows. In the present example, the circuit board 150 larger than that used in the related art is used, so that the electronic elements are mounted not only on the rear side of the connection terminal group but also in the front region. At this time, wiring patterns are also disposed on the lower side of the signal terminal component 240. A disposition method thereof will be described using FIG. 10.

FIG. 10 is a view illustrating a situation of fixing a plurality of signal terminal components 240 to the circuit board 150. FIG. 10(1) is a view viewed from the front, and FIG. 10(2) is a view of the signal terminal component 240 viewed from the left. The signal terminal components 240 are common components and are fixed side by side as the T terminal 164, the V terminal 165, and the LS terminal 166 in the right-left direction with a distance S4 therebetween on the circuit board 150. Since a cutout portion 255 (refer to FIG. 9(2)) is formed to generate a gap S2 near the center of the arm portion, the signal terminal component 240 has a shape in which the arm portion set (251 and 252) on the upper side and the arm portion set (253 and 254) the lower side are present in two stages on the upper and the lower side. In a state where no apparatus side terminal is mounted, parts (fitting portions) closest to the arm portion set (251, 252) on the upper side and the arm portion set (253 and 254) on the lower side are disposed with a slight clearance therebetween or in an abutting manner. Each of the leg portions 249 and 250 penetrates the attachment hole (refer to FIG. 4) of the circuit board 150, protrudes to the lower side, and is fixed by a solder 256 on the lower side (rear surface) of the circuit board 150.

In the side view of FIG. 10(2), the leg portion 249 positioned on the front side and the leg portion 250 positioned on the rear side are configured to be apart from each other by a distance S3. It is favorable that the distance S3 be larger than the gap (distance in the right-left direction) with respect to the leg portions 249 and 250. In this manner, when the clearance indicated by the arrow 257 is formed, it is easy to perform wiring of a circuit pattern in this clearance part. FIG. 10(3) is a bottom view of the circuit board 150 in FIG. 10(1) viewed from a lower side. The penetration hole for soldering the signal terminal component 240 is formed at the center on the rear surface of the circuit board 150, and lands 153a to 155a and 153b to 155b in which solder copper foils having a substantially quadrangular shape are disposed are formed around the penetration hole. Connection wiring patterns from the lands 153a to 155a and 153b to 155b to the upper cell unit 146 or the lower cell unit 147 are provided on the front surface side of the circuit board 150 and are not shown in the diagram of FIG. 10(3). The leg portion lands 153a to 155a on the left side and the leg portion lands 153b to 155b on the right side are disposed to deviate forward and rearward. As a result, a plurality of patterns 157 to 159 can be disposed between the lands 153a to 155a and the lands 153b to 155b as in the diagram. Here, the wiring patterns 157 to 159 are illustrated to be provided three for each. However, the wiring pattern may be realized in one thick wiring or may be a combination of a different number of patterns. In this manner, a wiring pattern is disposed between the leg portions 249 and 250 disposed to deviate in the front-rear direction. Therefore, while the same gap as that in the related art is maintained between the signal terminals 164 and 165, and 165 and 166 adjacent to each other, it is possible to provide a plurality of wiring patterns 157 to 159 connecting the rear side and the front side of the signal terminals 164 to 166 to each other. As another method of increasing the number of wiring patterns connecting the rear side and the front side of the signal terminals 164 to 166 to each other, a method of providing a cutout portion 243c as indicated by the dotted line in FIG. 10(2) may be used together. The cutout portion 243c cut out upward as indicated by the dotted line is formed near a lower side of the right side surface 243, that is, in a part in contact with the circuit board 150. Consequently, a part indicated by the arrow 257 becomes a gap to be distanced away from the circuit board 150. Similar to the wiring patterns 157 to 159 in FIG. 10(3), a circuit pattern can be disposed between this gap and the circuit board 150. In this manner, it is possible to dispose a plurality of wiring patterns connecting the rear side and the front side of the signal terminals 164 to 166 not only on a rear surface side 150b but also on a front surface side 150a of the circuit board. Therefore, execution efficiency of the circuit board 150 can be improved.

FIG. 11 is a view illustrating shapes of the connection terminal group (161 to 162 and 164 to 168) and the board cover 180 disposed around thereof. FIG. 11(1) is a perspective view, and FIG. 11(2) is a front view. Here, illustration of the circuit board 150 is omitted for understanding of the disclosure. In an actual product, a plurality of connection terminal groups (161 to 162, 164 to 168, 171, 172, and 177) are fixed to the circuit board 150 through soldering. Thereafter, the board cover 180 is attached around the connection terminals. The power terminals (161, 162, and 167) are formed to be higher than the signal terminals (164 to 166 and 168) in the upward direction by a distance H. The board cover 180 is a member that is manufactured using a non-conductor, for example, a synthetic resin molded article and covers an area around the leg portions of the connection terminals adjacent to each other. The board cover 180 has a coupling portion 181 having a flat surface-shaped upper surface 181a on the front side, and a plurality of partitioning walls 182, 183, and 184 to 189 are connected to the rear side of the coupling portion 181. The partitioning walls 182, 183, and 184 to 189 are disposed on the rear side of the flat surface portion 181a, that is, in the right and left parts of the connection terminal group and thus performs a function in which an electrical short circuit is unlikely to occur between the connection terminals. In addition, the upper surface 181a of the coupling portion 181 is formed to be flush with the upper stage surface 115 (refer to FIG. 3) of the upper casing 110, so that a main body side terminal portion can easily perform relative movement from the upper stage surface 115 to the coupling portion 181. In addition, a covered portion 184 blocking an opening in an unused region (slot 123 in FIG. 3) is provided in the board cover 180, such that waste or dust is unlikely to enter the inside of the casing of the battery pack 100 through the slot 123.

The board cover 180 is formed to mainly include the coupling portion 181 having the upper surface 181a that is horizontal in the lateral direction, and a plurality of partitioning wall portions extending thereabove. Partitioning walls 185, 186, and 189 of the partitioning wall portions disposed between the signal terminals constitute low wall portions having a height H2, and the upper end positions thereof become positions lower than the signal terminals (164 to 166) and the arm portions of the LD terminal 168 on the lower side. In contrast, power terminal partitioning walls 182, 183, 184a, 187, and 188 adjacent to each other constitute high wall portions having a height H3 from the upper surface 181*a*. The upper end positions thereof are configured to be positions above the upper end position of the lower terminal component and positions on the lower side of the arm portions of the upper terminal component.

In the power terminals of the connection terminal group, as described with reference to FIG. 5 to FIG. 8, the leg portions of the upper positive electrode terminals 161 and 162 and the lower positive electrode terminals 171 and 172 are arranged in the front-rear direction, and the arm portion sets thereof are disposed side by side in the up-down direction. In a similar manner, the leg portions of the upper negative electrode terminal 167 and the lower negative electrode terminal 177 are arranged in the front-rear direction, and the arm portion sets thereof are disposed side by side in the up-down direction. When the battery pack 100 is mounted in a rated 18 V electric apparatus main body, the potentials of the arm portions of the upper positive electrode terminal 162 and the upper negative electrode terminal 167 become the same as the potentials of the lower positive electrode terminal 172 and the lower negative electrode terminal 177. Therefore, there is no problem even if the upper terminal component and the lower terminal component come into contact with each other. However, when the battery pack 100 is mounted in a rated 36 V electric apparatus main body, the potentials of the upper positive electrode terminal 162 and the upper negative electrode terminal 167 differ from the potentials of the lower positive electrode terminal 172 and the lower negative electrode terminal 177. Therefore, it is important that a short-circuited state due to contact between the upper and lower arm portions be not generated. In addition, it is favorable to have a shape such that a short circuit caused by insertion of a foreign substance is unlikely to occur. Here, in the board cover 180 of the present example, regarding the partitioning walls 182, 183, 184*a*, 187, and 188 of the partitioning wall portions formed to extend in the upward direction from the coupling portion 181, the upper end positions are formed high above to reach a height H3. In addition, not only the wall portions extending upward in the vertical direction but also horizontal wall portions extending in the right-left direction from the upper end positions of vertical wall portions are formed.

FIG. 11(3) is an enlarged view of a part of the board cover 180 in FIG. 11(2) and is a view excluding illustration of a connection terminal part. The partitioning wall 182 has a vertical wall portion 182*a* and a horizontal wall portion 182*b*, and the cross-sectional shape thereof becomes an L-shape. The horizontal wall portion 182*b* has a shape extending in the horizontal direction to reach the inside of a space between the arm portions of the power terminals (upper positive electrode terminal 161 and lower positive electrode terminal 171) adjacent to each other from a part near the upper end of the vertical wall portion 182*a*. In addition, the partitioning wall 183 has a T-shaped cross-sectional shape and is formed to have a vertical wall portion 183*a* and horizontal wall portions 183*b* and 183*c* extending in both directions from the upper end portion of the vertical wall portion 183*a*. The horizontal wall portion 183*b* extends to a side approaching the horizontal wall portion 182*b* adjacent thereto and has a length such that the tip thereof reaches the inside of the space between the arm portions of the upper positive electrode terminal 161 and the lower positive electrode terminal 171. In a similar manner, the horizontal wall portion 183*c* extends to a side approaching the horizontal wall portion 184*b* adjacent thereto and has a length such that the tip thereof reaches the inside of the space between the arm portions of the upper positive electrode terminal 162 and the lower positive electrode terminal 172. A situation in which the horizontal wall portions 182*b*, 183*b*, and 183*c* extend to the inside of the space between this arm portions is clear as seen in the positive electrode terminal group viewed from the front as illustrated in FIG. 11(2). For example, the position of the right side surface of the upper positive electrode terminal 161 and the position of the right side surface of the lower positive electrode terminal 171 are the same position. However, the left end position 182*c* of the horizontal wall portion 182*b* has a length to an extent that it enters the lower part of an arm portion 161*a* of the upper positive electrode terminal 161 to extend to the left side beyond the positions of the left side surfaces of the upper positive electrode terminal 161 and the lower positive electrode terminal 171. The horizontal wall portion 182*b* is positioned on the upper side of an arm portion 171*a* of the lower positive electrode terminal 171.

The lengths of the vertical wall portion 182*a* and the horizontal wall portion 182*b* in the front-rear direction are formed to be longer than the length of the lower positive electrode terminal 171 in the front-rear direction, and the front end positions thereof are substantially the same position as the tip of the arm portions of the lower positive electrode terminal 171, and the rear end positions are on the rear side of the rear end position of the lower positive electrode terminal 171. In this manner, the vertical wall portion 182*a* covers the entire right side surface of the lower positive electrode terminal 171 and also covers the upper side part excluding a part near the center in the right-left direction (part of a distance S5). Moreover, the vertical wall portion 183*a* covers the entire left side surface of the lower positive electrode terminal 171 and the entire right side surface of the lower positive electrode terminal 172, and also covers the upper side part excluding a part near the center in the right-left direction. Here, only the shapes of the vertical wall portion 182*a* and the horizontal wall portion 182*b* of the lower positive electrode terminal 171 part are mentioned. However, regarding the lower positive electrode terminal 172 as well, since the partitioning walls 183 and 184 covering the entire right side surface, the entire left side surface, and the upper side part excluding the central part are provided, even if an external force is applied to the lower positive electrode terminals 171 and 172 so that a force of bending this is applied, lower positive electrode terminals 171 and 172 can be effectively held by the board cover 180, and thus it is possible to drastically reduce a possibility that a power transmission terminal component on the lower side and the terminal component on the upper side may be unintentionally short-circuited.

Based on the same idea as the positive electrode terminal sides (161, 162, 171, and 172), in the negative electrode terminal sides (167 and 177) as well, the large partitioning walls 187 and 188 are provided on both right and left sides of the negative electrode terminal. The partitioning wall 187 has a shape similar to that of the partitioning wall 182, is formed to have the vertical wall portion 187*a* and the horizontal wall portion 187*b*, and has an L-shaped cross section. The horizontal wall portion 187*b* is formed to extend from upper end part of the vertical wall portion 187*a* to the negative electrode terminal side. The partitioning wall 188 is formed to have bilateral symmetry with the partitioning wall 187 and is formed to have the vertical wall portion 188*a* and the horizontal wall portion 188*b*. The horizontal wall portions 187*b* and 188*b* have sizes such that the tip parts enter the space between the arm portion set of the upper negative electrode terminal 167 and the arm portion set of the lower negative electrode terminal 177. However, the horizontal wall portions 187*b* and 188*b* have a predetermined gap S5 to prevent entrance of an apparatus side terminal such as the power tool main bodies 1 and 30 from being hindered. In this manner, since the partitioning walls 187 and 188 are formed to cover the area around the negative electrode terminals (167 and 177) serving as the power terminals, even if a strong external pressure is applied to the upper negative electrode terminal 167 or the lower negative electrode terminal 177 and it moves (is bent) in the front-rear direction, it is possible to drastically reduce a possibility of occurrence of a short circuit phenomenon due to the presence of the wall portions such as the horizontal wall portions 187*b* and 188*b*.

The partitioning walls 185 and 186 between the signal terminal groups (164 to 166) only have a small height H2 in the upward direction. This is because since only signals using small power flow in the signal terminal groups (164 to 166), the risk degree at the time of a short circuit is drastically smaller than that on the power terminal side. In addition, each of the signal terminal groups (164 to 166) constitutes one component, and the arm portions on the upper side and the arm portions on the lower side have the same potentials. Therefore, there is less need to worry about a short circuit. The same applies to the partitioning wall 189 as well. The partitioning wall 184 includes the vertical wall portions 184*a* and 184*d*, which are connected to each other by a closing plate 184*c*. The closing plate 184*c* is a flat plate extending in the vertical direction and the right-left directions and exhibits a function of closing a free space (internal space of the free slot 123 in FIG. 3) between the upper positive electrode terminal 162 and the lower positive electrode terminal 172, and the T terminal 164. The horizontal wall portion 184*b* extending to the positive electrode terminal side is formed near the upper end of the vertical wall portion 184*a*.

The coupling portion 181 fixes the vertical wall portions 182*a*, 183*a*, 184*a*, 184*d*, 185*a*, 186*a*, 187*a*, and 188*a* positioned between the connection terminals by being connected to the front surfaces thereof. The wall portion of the upper surface 181*a* of the coupling portion 181 is formed to be in a state higher than the circuit board 150. The inner part (lower part) of the coupling portion 181 is formed to have a space, and the vertical wall portions 184*a*, 185*a*, 186*a*, and 187*a* are disposed on the rear side thereof. Here, although they are hidden behind the front wall surface 181*b*, the vertical wall portions 182*a*, 183*a*, 184*d*, and 188*a* are similarly formed to extend to the lower side and to come into contact with the circuit board 150. The inner part of this coupling portion 181 is solidified after being filled with a curable liquid resin (which will be described below with reference to FIG. 13) covering the upper surface of the circuit board 150. Due to solidification of the curable resin, parts near the lower ends of the plurality of vertical wall portions 182*a*, 183*a*, 184*a*, 184*d*, 185*a*, 186*a*, 187*a*, and 188*a* and the circuit board 150 are firmly fixed. Three cutout portions 181*c* to 181*e* are formed on the front wall surface 181*b* of the coupling portion 181. The cutout portions 181*c* to 181*e* are formed such that a liquid resin (which will be described below with reference to FIG. 13) equally reaches the rear part and the front part of the circuit board 150. Since the viscosity of the liquid resin is relatively low, the resin flows in the front-rear direction through spaces between the cutout portions 181*c* to 181*e* (details will be described below).

FIG. 12 is a view illustrating only the upper casing 110 extracted from FIG. 3 and is a view for describing the shape of the upper stage surface 115 of the upper casing 110. FIG. 12(1) is a perspective view of the upper casing 110, and FIG. 12(2) is an arrow view viewed in the arrow B direction in FIG. 12(1). In FIG. 12(1), stepped parts are illustrated by applying hatching thereto, such that the area thereof becomes clear. As described with reference to FIG. 11, the power terminals (161, 162, and 167) are formed to be higher than the signal terminals (164 to 166 and 168) in the upward direction by a distance H. This is because the power terminals are formed of a thicker plate material than the signal terminals. Therefore, in the shape of the upper stage surface of the upper casing in the related art, the upper end portions of the power terminals (161, 162, and 167) interfere with the inner wall on the upper stage surface. Here, in the present example, the position of the inner wall surface of the upper stage surface 115 of the upper casing 110 viewed in the up-down direction is configured to partially deviate upward such that clearances of the upper portions of the power terminals (161, 162, and 167) are ensured. It is also conceivable that a method in which only the position of the inner wall surface constitutes a recessed portion depressed in the upward direction is employed. However, if the shape of cross section of the upper stage surface 115 remains without any change, there is a possibility that the thickness of a part on the upper stage surface 115 of the upper casing 110 may become insufficient and the strength may deteriorate locally. Here, in the present example, protrusion portions 115*a* and 115*b* protruding outward are formed on the outer surface of the upper stage surface 115, that is, in the upper portion near parts where the power terminals (161, 162, and 167) are positioned. In this manner, a part of the wall surface of the upper stage surface 115 is configured to deviate upward. Therefore, an accommodation space can be increased in the inner part, and deterioration in strength of the wall surface can also be prevented. In the present example, since a protruding height H4 of the outer wall surface on the upper stage surface 115 is configured to be smaller than a depression height H5 of the inner wall surface, the sizes of the protrusion portions 115*a* and 115*b* can be reduced on the upper stage surface 115, so that the size is settled within a range to be able to be mounted in the power tool main body 1 in the related art without hindrance. In addition, since a stepped portion is partially formed and a step is formed such that the height of the hatched portion becomes higher in the upper stage surface 115 instead of being flush with other surfaces, it is possible to achieve a strength equivalent to or greater than that of the upper casing having the same flat surface shape in the related art.

Next, a method of applying a resin to the circuit board 150 will be described using FIG. 13. FIG. 13 is a perspective view of the circuit board 150. Here, although illustration is omitted, a main region 156*a* and a sub-region 156*b* for mounting electronic elements are provided on the upper surface (front surface) of the circuit board 150. The main region 156*a* is located on the rear side of the connection terminal group, and a protective management IC (which will be described below) including a microcomputer is mounted therein. The sub-region 156*b* is a region on the front side of the connection terminal group. Here, all the electronic elements to be mounted are covered with a curable resin. A curable resin is cured from a liquid state, and a urethane resin can be used, for example. In order to equally fill the upper surface of the circuit board 150 with a liquid urethane resin, an adhesive resin 155 serving as a bank preventing outflow of a liquid resin is adhered to an outer edge part of an element group mounted first in the circuit board 150. Regarding the adhesive resin 155, for example, a bonding agent extracted into a columnar shape from the inside of a tube-shaped container through a slender extraction port is continuously adhered along an outer edge of the region desired to be filled with a urethane resin. At this time, it is important that the bonding agent be adhered along the outer edge part in a seamless manner. The adhesive resin 155 is formed such that one end portion and the other end portion come into contact with the board cover 180. In this manner, when the adhesive resin 155 constituting the outer frame is adhered substantially around the outer edge part where a resin is to be poured, thereafter, a urethane resin in a liquid state is poured on the inner side of the upper surface of the circuit board 150.

The amount of a urethane resin to be poured is set to an amount sufficiently filling the range surrounded by the adhesive resin 155. At this time, at a place that is not desired to be covered with a resin, the outer edge of the place is surrounded by adhesive resins 155*a* to 155*c*, so that the resin that has been poured on the outer side thereof does not enter the range surrounded by the adhesive resins 155*a* to 155*c*. If the position where the urethane resin is to be poured is set near a part indicated by the arrow 156*a* in the main region, the resin does not flow into the range surrounded by the adhesive resin 155*a*. In addition, in the board cover 180, in a state where the wall surface of the coupling portion 181 forming the upper surface 181*a* is high, the rear wall surface of the lower part is in an open state, and the front side becomes the wall surface. Since the cutout portions 181*c* to 181*e* are formed in a part thereof, the resin can flow favorably from the main region 156*a* to the sub-region 156*b*. In this manner, when the entire element mounting surface of the circuit board 150 is covered with a resin and the resin is cured thereafter, it is possible to cover the inside of a target range with the resin with no gap at a uniform height on the front surface on the circuit board 150 side and to protect mounted electronic elements from influence of water or dust. When a double-sided substrate is used as the circuit board 150, the rear surface side may also be covered with a resin through a similar procedure. In addition, a resin may also be applied to parts exempted from filling of a resin (adhesive resin 155), for example, parts near the screw holes and solder portions of lead wires at the time of a post-process after screw fastening is completed and at the time of a post-process after soldering is completed.

Hereinabove, the first example of the present disclosure has been described using FIG. 1 to FIG. 13. However, the battery pack 100 illustrated in the first example can be subjected to various modifications. FIG. 14 is a view illustrating the shapes of an upper terminal component 260 and a lower terminal component 280 according to a first modification example of the present example. FIG. 14(1) is a perspective view, FIG. 14(2) is a left-side view, and FIG. 14(3) is a front view. Each of the upper terminal component 260 and the lower terminal component 280 has two arm portion sets (265 and 266, and 285 and 286) in the right-left direction, and the configuration in which two arm portion sets are aligned in the up-down direction is the same as that in the first example. The configuration in which a leg portion set (267 and 268) of the upper terminal component 260 is disposed side by side with a leg portion set (287 and 288) of the lower terminal component 280 in the front-rear direction is the same as that in the first example. In the lower part on the rear side of right side surfaces 263 and 283 and left side surfaces 264 and 284, as indicated by the arrows 262*a* and 282*a* in FIG. 14(2), bridge portions 262 and 282 protrude to be curved to the rear side. Therefore, this protruding part is used for positioning in the up-down direction when the upper terminal component 260 and the lower terminal component 280 are attached to the circuit board 150. Bent portions 263*a*, 264*a*, 283*a*, and 284*a* (here, 263*a* is not shown in FIG. 14) in which parts extending in projected shapes are folded inward are formed in the front side upper portion of the leg portions 267 and 268, and 287 and 288. The shapes thereof are similar to those in the configuration of the first example illustrated in FIG. 5.

In the upper terminal component 260, the direction of being folded into a U-shape differs from the direction indicated in FIG. 5. Here, a part constituting a bottom portion when the upper terminal component 260 is folded into a U-shape, that is, the bridge portion 262 is formed to be a vertical surface. In the folded shape of the lower terminal component 280, the direction of being folded into a U-shape is the same as the lower terminal component 220 illustrated in FIG. 5, and the bridge portion 282 constitutes a vertical surface. The bridge portions 262 and 282 are disposed in parallel to each other and have a substantially uniform gap in the front-rear direction, and these are disposed to extend substantially in the vertical direction with respect to the front surface of the circuit board 150. In the upper terminal component 260 and the lower terminal component 280, the configuration in which they are manufactured by pressing a flat metal plate is similar to that of the first example. However, the thickness of the flat plate is further increased.

The right side surface 263 and the left side surface 264 have a substantially rectangular shape extending in the vertical direction and are formed such that the arm portions 265 and 266 extend to the front side in a part close to the upper end. Parts near the rear bases of the arm portions 265 and 266, that is, near a chain line B2 have a significant width (length in the up-down direction). The width is gradually reduced as it goes forward, and the width becomes uniform on the front side further beyond an imaginary line B1. The configuration in which fitting portions 265*d* and 266*d* are bent into a curved surface shape having a predetermined radius R1 of curvature on the inner side in a top view is similar to that of the first example illustrated in FIG. 5. In this manner, the arm portions 265 and 266 are formed to extend forward from the upper front side portion of the U-shaped base body portion, and the arm portions 265 and 266 are formed to have spring properties in a non-contact state.

The lower terminal component 280 has the right side surface 283 and the left side surface 284 that are formed by being folded into a U-shape to be parallel to each other, and the bridge portion 282 that connects those to each other. The lower terminal component 280 is provided such that the arm portions 285 and 286 extend forward and obliquely upward from slender upper portions of the right side surface 283 and the left side surface 284. The widths of the arm portions 285 and 286 in the up-down direction are substantially uniform in the front-rear direction. The arm portions 285 and 286 are formed to extend in the horizontal direction on the front side of the imaginary line B1 and are obliquely disposed on the rear side of the imaginary line B1. A cutout portion 291 significantly cut out from the front side is formed below the arm portion set (285 and 286) of the lower terminal component 280. As a result of such formation, the lengths (length in the front-rear direction, that is, the front side of B2) of the arm portions 265 and 266 of the upper terminal component 260 become longer than the lengths (length in the front-rear direction, that is, the front side of the position of the arrow 291) of the arm portions 285 and 286 of the lower terminal component 280. Even in such arm portion sets having different lengths in the front-rear direction, it is preferable that the fitting pressure in the fitting portion of the upper terminal component 260 be the same as the fitting pressure of the lower terminal component 280. If the fitting pressures are not equalized, contact resistance with respect to the flat plate-shaped apparatus side terminal on the power tool main bodies 1 and 30 side changes, so that there is a possibility that a slight difference in heat generation may be generated or the wear situation may vary due to usage for a long period of time. In the present modification example, in order to balance the fitting pressure by the upper terminal component 260 and the lower terminal component 280, the gap of the initial clearance in a non-mounting state of the battery pack is varied. That is, in a state where the battery pack 100 is not mounted in the power tool main body 1 or 30 (detached state), the smallest gap between the right and left arm portions 265 and 266 differs from the gap between the arm portions 285 and 286. Here, the gap between the arm portions 265 and 266 of the upper terminal component 260 is set to 0.2 mm. In contrast, the smallest gap between the arm portions 285 and 286 of the lower terminal component 280 is set to 0.5 mm.

In order to achieve a uniform fitting pressure, the shapes of the upper terminal component 260 and the lower terminal component 280 have also been devised. That is, as illustrated in FIG. 14(2), originally in the upper terminal component 260, a substantially right-angled inner angle as indicated by the dotted line 264b should be formed. Here, the contour of the dotted line 264b is extended in the direction of the arrow 264e to realize a shape in which a reinforcement surface 264c having a right-angled triangular shape in a side view is added. As a result, the contour of this inner angle part becomes oblique as indicated by the arrow 264d, and the attachment rigidity of the arm portions 265 and 266 of the upper terminal component is improved due to this shape change. In accordance with the shape change of the inner angle part of the upper terminal component 260, the shape of the outer angle part of the lower terminal component 280 is cut off in the direction of the arrow 284e from a part of the dotted line 284b to obtain a shape in which a cut-off portion 284c having a right-angled triangular shape in a side view is provided. As a result, the contour of this outer angle part becomes as indicated by the arrow 284d, and the rigidity of the arm portions 285 and 286 of the lower terminal component is deteriorated. In the contour part indicated by the arrow 264d and the arrow 284d, the contours are determined such that they are substantially parallel to each other in a side view and are apart from each other with a uniform gap therebetween. When the cut-off portion 284c is formed, the length of the bridge portion 282 in the up-down direction becomes short. However, since the lower terminal component 280 is small, the lower terminal component 280 has a sufficient strength compared to the upper terminal component 260. Therefore, the strength can be suitably balanced due to these shape changes. In this manner, in the upper terminal component 260, the shape of the inner angle part is changed by adding the reinforcement surface 264c. In the lower terminal component 280, the shape of the outer angle part is changed through strength adjustment by forming the cut-off portion 284c. Accordingly, the strength of both can be balanced, and the fitting pressures to the main body side terminals by the arm portions 265 and 266, and 285 and 286 can be substantially equivalent to each other.

FIG. 14(3) is a view of the upper terminal component 260 and the lower terminal component 280 viewed from the front. The heights in the up-down direction and the attachment positions of the arm portions 265 and 266, and the heights in the up-down direction and the attachment positions of the arm portions 285 and 286 become the same shape and the same positional relationship as the arm portion groups of the upper terminal component 200 and the lower terminal component 220 in the first example illustrated in FIG. 5. However, in the present modification example, the thickness of a using metal plate material differs, and they are manufactured using a thicker plate than the terminal components in the first example illustrated in FIG. 5. Moreover, in a state when the battery pack 100 is not mounted, the smallest gap differs between the arm portion sets on the upper and lower side. That is, the gap between the arm portions 285 and 286 on the lower side in the right-left direction is configured to be larger than the gap between the arm portions 265 and 266 on the upper side in the right-left direction. This has a relationship in which the lengths thereof are inversely proportional to the lengths of the arm portions 265 and 266 and the arm portions 285 and 286 in the mounting direction (front-rear direction) disposed vertically side by side. The long arm portions 265 and 266 face each other with a narrow gap therebetween in an initial state. On the contrary, the short arm portions 285 and 286 face each other with a wide gap therebetween.

As described above, in the first modification example, the upper terminal component 260 and the lower terminal component 280 having a plate thickness of 0.8 mm which is thick are used as the power terminals. Since only a very small current flows in the signal terminal component, similar to the battery pack 15 in the related art, they may be manufactured using a metal plate having a thickness of approximately 0.3 mm. In the present modification example, the rigidity of the power terminals in which a large current flows can be further improved, and the fitting situation can be favorably maintained not only during working but also over a long period of using time. In order to achieve substantially the same fitting pressures of the arm portion sets on the upper and lower side, without being limited to only adjustment of the clearance of the fitting portions and change in shape near the attachment base, it can also be achieved by other changes, particularly, attachment of the plate thickness, selection of materials for the terminal components, and the like.

FIG. 15 is a perspective view illustrating the upper terminal component 260 and a lower terminal component 280A of a second modification example of the present example. In the second modification example, the upper terminal component 260 is the same as that in the first modification example illustrated in FIG. 14. However, the lower terminal component 280A differs in plate thickness and initial gap between the arm portions. That is, the plate thickness of the lower terminal component 280A is thinned to 0.6 mm from 0.8 mm of the lower terminal component 280 illustrated in FIG. 14, and the gap between fitting portions 285d and 286d is narrowed to 0.2 mm from 0.5 mm of the lower terminal component 280 illustrated in FIG. 14. The gap of the fitting portions 265d and 266d of the upper terminal component 260 is 0.2 mm, which is similar to that in the first modification example. In this manner, the fitting pressures can be substantially equivalent to those of the fitting portions 265d and 266d of the upper terminal component 260 by adjusting the plate thickness and the gap between the arm portions 285 and 286 having spring properties. Here, the shapes of the fitting portions 265d and 266d are formed to be half-cylindrical surfaces. Central axes of the cylindrical surfaces are positioned in the vertical direction, and the wall surfaces of the fitting portions 265d and 266d on the inner side become cylindrical surface having a radius R1 of curvature. The wall surfaces of the fitting portions 285d and 286d of the lower terminal component 280A on the inner side are also formed to be cylindrical surfaces having the radius R1 of curvature. It is favorable that the cylindrical shapes of the fitting surfaces of the fitting portions 265d and 266d and the fitting portions 285d and 286d be formed at the equivalent radius R1 of curvature such that the sizes or the shapes of linear or rectangular contact parts become substantially the same as each other. It is preferable that sandwiching pressures (fitting pressure) be substantially equivalent to each other to achieve substantially the same electrical contact resistance by realizing the uniform sizes of the contact parts and the contact regions in this manner.

FIG. 16 is a perspective view illustrating an upper terminal component 200A and the lower terminal component 220 according to a third modification example of the present example. FIG. 16(1) is a view illustrating a state where these are connected to the main body side terminal of a rated 36 V power tool main body 30A. In the third modification example, the shape of the upper terminal component 200A, particularly only the shapes of arm portions 205A and 206A differ from those in the first example, and the configuration of the base body portion of the upper terminal component 200A and the leg portions is the same as that in the first example. The upper terminal component 200A is used as the upper positive electrode terminals 161 and 162 and the upper negative electrode terminal 167. In the upper terminal component 200A, the positions of the fitting portions of the arm portions 205A and 206A on the upper side are positioned on the front side of the positions of the fitting portions of the arm portions 225 and 226 on the lower side, such that the arm portions 205A and 206A significantly extend to the front side. The shapes of the fitting portions facing each other are half-cylindrical surfaces having the equivalent radius R1 of curvature, and the shapes of the fitting portions of the arm portions 205A and 206A and the shapes of the fitting portions of the arm portions 225 and 226 are the same as each other. When the arm portions 205A and 206A are lengthened, a positive electrode terminal 72A of the 36 V side power tool main body is caused to be shorter than that in the related art in accordance with this shape change. The size and the plate thickness of a short bar 79 serving as a short circuit means are the same as those of the short bar 59 illustrated in FIG. 6. However, a semicircular cutout 79d is formed in the upper portion of a terminal portion 79b of the short bar 79. This cutout 79d is provided to prevent the terminal portion 79b from coming into contact with the arm portions 205A and 206A on the upper side when the positive electrode terminal 72A and the terminal portion 79b of the apparatus side terminal relatively move in an are shape as indicated by the arrow 45a or in the horizontal direction for some reason. In this manner, since the cutout 79d is formed in the terminal portion 79b of the short bar 79, when the battery pack 100 is mounted and the power tool is operated, even if relative positional deviation occurs due to the difference between resonance frequencies of the power tool main body 30A and the battery pack 100, it is possible to drastically reduce a possibility of occurrence of a short circuit between the upper terminal component 200A and the lower terminal component 220.

FIG. 16(2) is a view illustrating a state where the upper terminal component 200A and the lower terminal component 220 are connected to the main body side terminal of the power tool main body 1 in the related art. When being mounted on the power tool main body 1 side of rated voltage of 18 V, two sets of the arm portions 205A and 206A and the arm portions 225 and 226 are fitted into the positive electrode input terminal 22. At this time, the contact positions of the fitting portions of the arm portions 205A and 206A with respect to the positive electrode input terminal 22 deviate to the front side of the contact positions of the fitting portions of the arm portions 225 and 226 with respect to the positive electrode input terminal 22. However, since the thickness of the positive electrode input terminal 22 in the vicinity thereof including the contact positions is uniform, if the sizes of the contact portions or the contact regions are equal to each other between that by the arm portions 205A and 206A and that by the fitting portions of the arm portions 225 and 226, a favorable conducting state can be realized, and therefore movement of the contact position does not cause any problem.

FIG. 17 is a perspective view illustrating the upper terminal component 200 and a lower terminal component 220A of a fourth modification example of the present example. FIG. 17(1) is a view illustrating a state where these are connected to the main body side terminal of a power tool main body 30B. In the fourth modification example, only the shapes of the arm portions 225A and 226A of the lower terminal component 220A differ from those in the first example, and other configurations are the same as those in the first example. Here, the positions of the fitting portions of the arm portions 225A and 226A on the lower side are positioned on the front side of the positions of the fitting portions of the arm portions 205 and 206 on the upper side, such that the arm portions 225A and 226A extend to the front side. The rear end position of the short bar 79 is also provided on the front side of that in the related art in accordance therewith. Moreover, a semicircular cutout 72d is formed in a lower portion of a positive electrode terminal 72B. Regarding this cutout 72d, the cutout 72d is provided to drastically reduce a possibility that the positive electrode terminal 72B may come into contact with the arm portions 225A and 226A when the positive electrode terminal 72B and the terminal portion 79b of the apparatus side terminal move as indicated by the arrow 45b for some reason.

FIG. 17(2) is a view illustrating a state where the upper terminal component 200 and the lower terminal component 220A are connected to the main body side terminal of the power tool main body 1 in the related art. Two sets of the arm portions 205 and 206 and the arm portions 225A and 226A are fitted into the positive electrode input terminal 22 on the power tool main body 1 side. Here, the positions of the contact parts of the arm portions 205 and 206 and the positions of the contact parts of the arm portions 225A and 226A are apart from each other in the front-rear direction by a distance L. However, since the sizes of the contact portions or the contact regions are equal to each other between that by the arm portions 205 and 206 and that by the fitting portions of the arm portions 225A and 226A, a favorable conducting state can be realized, similar to the first example.

FIG. 18 is a perspective view illustrating a shape of the terminal portion on the power tool main body 30A side according to a fifth modification example of the present example. In the fifth modification example, the positions of the positive electrode terminal and the negative electrode terminal in the first example and the position of the short bar are vertically inverted. Here, the upper positive electrode terminal 162 and the upper negative electrode terminal 167 are short-circuited by a short bar 89. Regarding the short bar 89, the same component as the short bar 59 (refer to FIG. 6) in the first example can be used, and the short bar 89 need only be cast in a synthetic resin base of the terminal portion of the power tool main body. The configuration in which a positive electrode input terminal 82 is constituted of a terminal portion 82a, a connection portion 82b, and a wiring terminal portion 82c is similar to the positive electrode input terminal 52 (refer to FIG. 6) in the first example. However, since the position for providing the wiring terminal portion 82c has to be on the rear surface side instead of the upper surface of the terminal portion, the shapes of the connection portion 82b and the wiring terminal portion 82c are changed. In a similar manner, a negative electrode input terminal 87 is also provided with a wiring terminal portion 87c at a different position. In accordance with the deviated positions of the positive electrode input terminal 82 and the negative electrode input terminal 87 in the terminal portion, the connection state of the upper cell unit 146 and the lower cell unit 147 is also changed. That is, the upper cell unit 146 is connected to the lower positive electrode terminal 172 and the upper negative electrode terminal 167, and the lower cell unit 147 is connected to the upper positive electrode terminal 162 and the lower negative electrode terminal 177.

As described above, even if the position for providing the short bar 89 is changed, it is possible to realize the battery pack with an automatic voltage switching mechanism of the present example. When this configuration is employed, the attachment positions of the wiring terminal portions 82c and 87c can be drawn out to the rear side instead of being drawn out to the upper side of the terminal portion (refer to FIG. 7). Therefore, the degree of freedom of design of the terminal portions on the power tool main body side increases. Since the short bar 89 has a terminal portion 89b and a terminal portion 89c, and the function thereof can be achieved by causing these to be short-circuited, there is no need to connect the part of a connection portion 89a with a metal plate. The function may be realized by methods in which an electrical connection relationship can be formed with a conductive member, for example, other arbitrary methods such as connection using a lead wire and connection using a fuse element.

FIG. 19 is a circuit diagram illustrating a state where the battery pack 100 of the present example is connected to the power tool main body 1 in the related art. The power tool main body 1 in the related art is configured to include the positive electrode input terminal 22, the negative electrode input terminal 27, and the LD terminal 28 on the apparatus side. The trigger switch 4 and a DC motor 5 are connected to places between the positive electrode input terminal 22 and the negative electrode input terminal 27. A switching element M101 constituted of a semiconductor is provided between the motor 5 and the negative electrode input terminal 27. A drain-to-source of the switching element M101 is connected to a power supply path of the motor 5, and a gate is connected to the positive electrode input terminal 22 via a resistor R101. In addition, the gate of the switching element M101 is connected to the LD terminal 28 via a resistor R102. In general, the LD terminal 28 on the battery pack 100 side is in a high impedance state. At this time, a positive voltage is applied to the gate of the switching element M101 via the resistor R101, and the switching element M101 is thus in the conducting state. At this time, if the LD terminal 168 drops to a ground potential due to a discharging prohibition signal 341 from the battery pack 100 side, the potential of the gate of the switching element M101 becomes a voltage realized by dividing the voltage of the positive electrode input terminal 22 using the resistors R101 and R102, and this partial potential becomes a potential for blocking a source-to-drain of the switching element M101. As a result, the power supply path to the motor 5 is blocked, and therefore rotation of the motor 5 stops. The potential of this LD terminal 168 is switched in accordance with control of a controller 350 on the battery pack 100 side, and switching is executed when in a state where the voltage of the battery cell has dropped to a predetermined value, that is, a so-called over-discharge state, when the current flowing in the battery cell exceeds the regulated upper limit value, when the temperature of the battery cell exceeds the upper limit value, and the like. The discharging prohibition signal 341 is an example of "a control signal" in the present disclosure, and the LD terminal 168 is an example of "a signal terminal" in the present disclosure.

As illustrated in FIG. 4, the battery pack 100 is configured to have an upper positive electrode terminal (upper positive) 162, a lower positive electrode terminal (lower positive) 172, an upper negative electrode terminal (upper negative) 167, and a lower negative electrode terminal (lower negative) 177. In addition, the battery pack 100 has the LD terminal 168 as a signal terminal. In addition to those, other signal terminal groups (T terminal 164, V terminal 165, and LS terminal 166) are provided in the battery pack 100. However, illustration thereof is omitted herein. The output of the upper cell unit 146 is connected to the upper positive electrode terminal 162 and the lower negative electrode terminal 177. That is, the positive electrode (positive output) of the upper cell unit 146 is connected to the upper positive electrode terminal 162, and the negative electrode (negative output) of the upper cell unit 146 is connected to the lower negative electrode terminal 177. In a similar manner, the positive electrode (positive output) of the lower cell unit 147 is connected to the lower positive electrode terminal 172, and the negative electrode (negative output) of the lower cell unit 147 is connected to the upper negative electrode terminal 167.

In each of the upper cell unit 146 and the lower cell unit 147, five lithium ion battery cells are connected in series. A protection IC 300 for monitoring the voltages of the battery cells, a protection IC 320, and the controller 350 are connected to the upper cell unit 146 and the lower cell unit 147. When both end voltages of each of the battery cells in the upper cell unit 146 are input to the protection IC 300, the protection IC 300 executes a cell balancing function, a cascade connecting function, and a disconnection detecting function, in addition to an over-charging protecting function and an over-discharging protecting function. The protection IC 300 is a commercially available integrated circuit serving as "a lithium ion battery protection IC". The protection IC 300 has a built-in power source circuit for obtaining power to operate the protection IC from the voltage of the upper cell unit 146. In addition, when the voltages of the battery cells in the upper cell unit 146 drop to be smaller than a predetermined value and are thus in an over-discharged state, a signal (high signal) 305 indicating over-discharge of the protection IC 300 is output to the controller 350. When the voltages of the battery cells in the upper cell unit 146 have reached a predetermined value or larger at the time of charging and are thus in an over-charged state, a signal (high signal) 306 indicating over-charge is output to the controller 350.

The protection IC 320 is connected to the lower cell unit 147. Here, the controller 350 is further provided in the circuit of the lower cell unit 147, that is, in the circuit between the lower positive electrode terminal 172 and the upper negative electrode terminal 167. That is, the protection circuit provided in parallel with the upper cell unit 146 is constituted of only the protection IC 300. In contrast, the protection circuit provided in parallel with the lower cell unit 147 is constituted of the protection IC 320 and the controller 350. The controller 350 includes a micro-controller unit (MCU, a so-called "microcomputer"). Outputs (over-discharge signal 305 and overcharge signal 306) from the protection IC 300, outputs (over-discharge signal 325 and overcharge signal 326) from the protection IC 320, and a signal from a cell temperature detection means 331 are input to the controller 350. For example, the microcomputer of the controller 350 includes a voltage detection circuit referred to as an analog front end (AFE) measuring a value of a current flowing from an output voltage of a current detection circuit 327 to the lower cell unit 147. Driving power of the controller 350 is generated by a power source circuit 321 connected to the lower cell unit 147, and a power source voltage (VDD1) is supplied to the controller 350. Each of the protection IC 300, the protection IC 320, and the controller 350 is an example of "a protection circuit" in the present disclosure. The protection circuit is directly connected to any one of the cell units or is indirectly connected via another protection circuit. The protection circuit monitors the state of the battery cells constituting the cell units and outputs a signal corresponding to the state of the battery cells. A circuit in which any one of the protection IC 300, the protection IC 320, and the controller 350 is combined becomes an example of "a protection circuit" in the present disclosure. In addition, the protection IC 300 is an example of "a first protection circuit" in the present disclosure, the protection IC 320 is an example of "a second protection circuit" in the present disclosure, and the controller 350 is an example of "a controller" in the present disclosure. The controller is directly connected to any one of the cell units or is indirectly connected via another protection circuit. In addition, the power source circuit 321 is an example of "a power source circuit" in the present disclosure, and the power source voltage (VDD1) is an example of "a power source voltage" in the present disclosure. Moreover, the cell temperature detection means 331 is an example of "a detection unit" and "a temperature detection unit" in the present disclosure, the current detection circuit 327 is an example of "a detection unit" and "a current detection unit" in the present disclosure, and each of a temperature detected by the cell temperature detection means 331 and a current detected by the current detection circuit 327 is an example of "a physical quantity" in the present disclosure.

A shunt resistor 329 is provided on the ground side of the lower cell unit 147, but no shunt resistor is provided on the upper cell unit 146 side. This is because a current value can be measured using only the shunt resistor 329 when the upper cell unit 146 and the lower cell unit 147 are connected in series. Meanwhile, when the upper cell unit 146 and the lower cell unit 147 are connected in parallel, an actual measurement current value on the upper cell unit 146 side cannot be measured. However, the controller 350 may perform monitoring such that a current value of the upper cell unit 146 is equivalent to the lower cell unit 147. A shunt resistor and a voltage detection circuit may be configured to be provided on the ground side of the upper cell unit 146, such that a current value on the lower cell unit 147 side is also directly monitored by the microcomputer of the controller 350.

The controller 350 monitors a current value and a cell temperature and monitors states of the upper cell unit 146 and the lower cell unit 147, thereby integrally controlling both operation situations. In addition, when the power tool main body 1 needs an emergency stop, the discharging prohibition signal 341 is emitted and the potential of the LD terminal 168 is changed, so that the operation on the power tool main body 1 side is stopped via the LD terminal 28. The most important matter in monitoring these using the controller 350 is the amperage flowing in the battery cells included in the upper cell unit 146 and the lower cell unit 147. In recent power tools, it has become possible to extract a large current from the battery pack 100 as the performance of battery cells is improved and the capacity is increased. However, from the viewpoint of the life-span and heat generation, it is preferable that battery cells be limited to a predetermined amperage (current upper limit value or smaller). Therefore, in order to particularly monitor the currents flowing in the battery cells, the controller 350 monitors the current value using the shunt resistor 329 and the current detection circuit 327 interposed in the middle of a power supply line of the lower cell unit 147.

Regarding a management protection circuit of the lower cell unit 147 constituted of the protection IC 320, the controller 350, the power source circuit 321, the current detection circuit 327, and the like, a circuit configured to be integrated in one chip as "a battery management IC" may be used. Meanwhile, regarding the protection IC 300 for the upper cell unit 146, the same protection IC widely used in the battery pack 15 in the related art (refer to FIG. 1) can be used, such as a protection IC commercially available as "a battery protection IC" for five cells. The operation of the protection IC 320 is substantially similar to that of the protection IC 300. When a state where the voltages of the battery cells in the lower cell unit 147 have dropped to a predetermined lower limit value (over-discharged state) is detected, the over-discharge signal 325 is sent out to the controller 350. In addition, while the battery pack 100 is mounted in an external charging device (not illustrated) and charging is performed, when the protection IC 320 detects that the voltages of the battery cells have exceeded a predetermined upper limit value, the overcharge signal 326 indicating an over-charged state is sent out to the controller 350. The controller 350 sends out a charging stoppage signal to the charging device (not illustrated) via the LS terminal 166 (refer to FIG. 4). As described above, since a battery cell protection circuit is mounted in each of the upper cell unit 146 and the lower cell unit 147, protection of the battery through detailed battery monitoring can be realized.

In the present example, the protection circuit of the upper cell unit 146 includes only the protection IC 300 and includes no microcomputer. In contrast, in addition to the protection IC 320, the controller 350 including a microcomputer is provided in the protection circuit of the lower cell unit 147. Furthermore, the power source circuit 321 generates power for operating the controller 350 using electric power of the lower cell unit 147. Since the battery pack 100 of the present example is an 18 V/36 V voltage switchable type, if a microcomputer is mounted on the protection circuit on the upper cell unit 146 side, the ground potential of the controller 350 changes at the time of series-connection and at the time of parallel-connection of two cell units. Meanwhile, if the power source circuit 321 is provided on the lower stage side, the ground potential of the power source circuit 321 does not change. Here, in the present example, the controller 350 having a microcomputer mounted therein is provided in the circuit of the lower cell unit 147 instead of the circuit of the upper cell unit 146. Due to this disposition of a microcomputer, the controller 350 including a microcomputer can be stably operated with an output voltage of a rated 18 V/36 V switchable type. The ground potential of the controller 350 corresponds to "a ground potential of the controller" in the present disclosure.

When the controller 350 including a microcomputer is provided in only the circuit on one cell unit side, a problem of imbalance in power consumption between two cell units occurs. Although power consumption of the controller 350 is extremely small, power consumption on the lower cell unit 147 side is greater than power consumption on the upper cell unit 146 side. If an imbalance state of power consumption continues for a long time, the potential on the lower cell unit 147 side becomes lower than the upper cell unit 146, which is not preferable. Particularly, the reason is that when the upper cell unit 146 and the lower cell unit 147 are connected in parallel and a rated voltage of 18 V is output, a circulation current flows due to voltage imbalance between the cell units immediately after the parallel-connection state. Therefore, in the present example, a current consumption control means 310 having a function of adjusting the consumption current amount with respect to the lower cell unit 147 is provided in the circuit of the upper cell unit 146 having less power consumption. The current consumption control means 310 is interposed on one side of two cell units having less power consumption, that is, in parallel with the upper cell unit 146. The current consumption control means 310 is mounted in the circuit board 150 (refer to FIG. 4) as a load circuit separate from the integrated protection IC 300. The current consumption control means 310 is an example of "a consumption current controller" in the present disclosure.

The current consumption control means 310 is controlled to be operated in conjunction with operation of the controller 350. The microcomputer included in the controller 350 can switch between retention and cancellation of the power source voltage (VDD1) applied to itself and has an ordinary operation state (normal mode) and an operation stoppage state (so-called sleep state). While the microcomputer of the controller 350 retains the power source voltage VDD1, the protection IC 300 is also in an operation state by switching the state of a start-up terminal 301 utilized as a control signal. In the present example, the circuit of the current consumption control means 310 has been devised. The current consumption control means 310 is configured to allow a current for adjusting power consumption to flow therein in conjunction with a state where the microcomputer of the controller 350 is holding the power source voltage VDD1. Moreover, the current consumption control means 310 switches the state of the start-up terminal 301. As a result, when the controller 350 starts up, the protection IC 300 also starts up at the same time in conjunction therewith. Since the power source circuit 321 of the controller 350 is a common circuit also serving as the protection IC 320, when the microcomputer starts up, the protection IC 320 also starts up at the same time. Due to the current consumption control means 310, the consumption currents consumed by a cell set (lower cell unit 147) to which the controller 350 is connected and the other cell set (upper cell unit 146) become the same as each other.

The current consumption control means 310 is an electric circuit configured to include a plurality of switching elements M31 to M33 such as FETs, and a plurality of resistors (resistors R31 to R35). Regarding a basic circuit configuration, the resistors R31 and R34 constituting two dummy loads in series-connection are connected to a part between both terminals of the upper cell unit 146, and the circuit is switched between ON and OFF by the switching element M32. A source terminal of the switching element M32 is connected to the positive electrode of the upper cell unit 146, and a drain terminal is connected to the resistor R31. A gate terminal of the switching element M32 is connected to a connection point between the resistors R32 and R35. One end of the resistor R32 is connected to the source terminal of the switching element M32, and the other end is connected to the gate terminal of the switching element M32. One end of the resistor R35 is connected to the gate terminal of the switching element M32, and the other end is connected to the drain terminal of the switching element M33. The switching element M33 inputs the power source voltage (VDD1) of the microcomputer included in the controller 350 to a gate signal and performs switching between ON and OFF in conjunction with the power source voltage VDD1. The source terminal of the switching element M33 is subjected to grounding, and the resistor R33 is connected to a part between the source terminal and the gate terminal of the switching element M33. The resistor R33 is provided such that the switching element M33 is stably switched in accordance with a voltage change of the gate signal. Regarding such a current consumption control means 310, when the power source voltage VDD1 of the microcomputer is ON, the gate potential of the switching element M33 becomes the VDD1 (high level), and when the power source voltage VDD1 is OFF, the gate potential of the switching element M33 is 0 V (low level). The same signal as the gate signal of the switching element M33 is also input to the protection IC 320. Consequently, the switching element M33 is in an OFF state. When the switching element M33 is in the OFF state, the switching element M32 is also in the OFF state. Accordingly, current paths to the dummy load side by the resistors R31 and R34 are blocked, so that power consumption by the current consumption control means 310 is zero. In order to cause the protection IC 300 to be also OFF at the time of this state, the switching element M31 that inputs the potential at the connection point between the resistors R31 and R34 as a gate signal (operation signal 302) is further provided. The drain terminal of the switching element M31 is connected to the start-up terminal 301 of a built-in power source (not illustrated) of the protection IC 300, and the source terminal is connected to the negative electrode of the upper cell unit 146. The operation signal 302 is a signal indicating an operation state of the current consumption control means 310 and indicates that the current consumption control means 310 is operated, that is, the microcomputer of the controller 350 is also operated at the time of a high level. Meanwhile, when the current consumption control means 310 is not operated, that is, when the microcomputer of the controller 350 is stopped, the operation signal 302 becomes low and the start-up terminal 301 is in a high impedance state, so that the protection IC 300 is stopped.

The negative potential (reference potential A) of the upper cell unit 146 becomes the ground potential at the time of parallel-connection of the upper cell unit 146 and the lower cell unit 147 but is equivalent to the positive potential of the lower cell unit 147 at the time of series-connection. In this connection state, the potential of the upper cell unit 146 is not applied to the resistor R31 because the switching element M31 is OFF, so that the start-up terminal 301 is not connected and is in a high impedance state. Meanwhile, when the switching element M32 is ON and a current flows in the dummy load, partial voltages of the resistors R31 and R32 are applied to the gate terminal of the switching element M31. Therefore, the switching element M31 is ON. Consequently, the start-up terminal 301 is connected to the reference potential A. Therefore, power is supplied to the built-in power source inside the protection IC 300, so that the protection IC 300 starts up. In a connection form as described above, power consumed by the microcomputer of the controller 350 on the lower cell unit 147 side can also be consumed inside the circuit of the upper cell unit 146 by the current consumption control means 310. Moreover, in accordance with switching between operation and stoppage of the current consumption control means 310, start-up and stoppage control of the protection IC 300 itself can also be performed together. Thus, the microcomputer of the controller 350 can control start-up and stoppage of the protection circuit of the lower cell unit 147 and the protection circuit of the upper cell unit 146 in conjunction therewith.

The state of the microcomputer of the controller 350 includes three stages, such as a normal mode, a sleep mode, and a shut-down mode. The normal mode is a state where the microcomputer is starting up at all times. The sleep mode is a mode in which the microcomputer intermittently starts up by itself and repeats operation of stoppage for 5 seconds after a start-up for 50 milliseconds. The shut-down mode is a state where the power source voltage VDD1 is not supplied at all and is a state where the microcomputer is completely stopped. The microcomputer is operated when the battery pack 100 is mounted or not mounted in the power tool main body 1. However, when the battery pack 100 is not mounted, or when the power tool is not used for a certain period of time or longer even if the battery pack 100 is mounted, for example, when another trigger operation is not performed for approximately two hours after a trigger operation has ended, the microcomputer is in the sleep state. Even in this sleep state, the current consumption control means 310 is operated in conjunction with a start-up of the microcomputer. In addition, the protection IC 300 also starts up via the current consumption control means 310. When the trigger switch 4 of the power tool main body 1 is pressed and a current flows in the motor 5, the microcomputer of the controller 350 detects increase in current value detected by the current detection circuit 327 and returns to the normal state.

In the present example, in the case of a configuration in which a microcomputer is included in only one protection circuit of a plurality of cell units, increase in potential difference between the plurality of cell units caused by being neglected for a long period of time in a state where the battery pack is detached has been resolved by adding the current consumption control means 310 performing power consumption as much as that in the microcomputer for the protection circuits of other cell units in which no microcomputer is provided. Therefore, balance of a consumption current in each of the plurality of cell units can be adjusted, and thus it is possible to realize a battery pack in which voltage balance for every cell unit is not deteriorated even after being stored for a long period of time.

A residual quantity display means 335 for displaying the battery residual quantity is provided in the battery pack 100. When the switch 190 (refer to FIG. 4) for displaying the residual quantity is pressed, the battery residual quantity is displayed by the number of emitting diodes of four light emitting diodes (not illustrated). A signal of the switch 190 for displaying the residual quantity is input (not illustrated herein) to the controller 350, and the microcomputer of the controller 350 performs light-on control of the light emitting diodes of the residual quantity display means 335. Here, the battery residual quantity displayed by the residual quantity display means 335 may be displayed based on both end voltages of one cell unit of the upper cell unit 146 and the lower cell unit 147 or may be displayed based on the lowest voltage value of ten battery cells.

An output of an upper voltage detection circuit 322 connected to the upper positive electrode terminal 162 is input to the controller 350. This output indicates the potential of the upper cell unit 146 when the battery pack 100 is not mounted in the power tool main bodies 1 and 30 or an external charging device (not illustrated). Meanwhile, when the battery pack 100 is mounted in the power tool main body 1 for a low voltage (18 V), since the upper positive electrode terminal 162 and the lower positive electrode terminal 172 are connected to each other, the positive electrodes in the upper cell unit 146 and the lower cell unit 147 have the same potentials, and the negative electrodes have the same potentials. From this, the microcomputer included in the controller 350 can determine whether the battery pack 100 is in a non-mounted state, is mounted in a low voltage apparatus main body, or is mounted in a high voltage apparatus by comparing the potential of the upper positive electrode terminal 162 and the potential of the lower positive electrode terminal 172. In order to detect the potential of the lower positive electrode terminal 172, it is preferable that the controller 350 be configured to be able to acquire the positive potential of a battery cell 147a in the uppermost stage of the battery cells in the lower cell unit 147. In this manner, the microcomputer provided in the circuit of the lower cell unit 147 can determine whether the upper cell unit 146 and the lower cell unit 147 of the battery pack 100 are in a series-connection state (state of being mounted in a 36 V apparatus) or in a parallel-connection state (state of being mounted in an 18 V apparatus). In this manner, the microcomputer can also monitor the voltage value on the upper cell unit 146 side exceeding a range (voltage in the lower cell unit 147) in which the power source voltage is acquired, and therefore the microcomputer can determine the connection state of the voltage switchable battery pack 100 and perform optimal control corresponding to the determined connection state. The upper voltage detection circuit 322 is an example of "a detection unit" and "a first voltage detection unit" in the present disclosure, and the potential of the upper cell unit 146 is an example of "a physical quantity" and "a voltage of a first cell unit" in the present disclosure.

The LD terminal 168 is a terminal for transmitting a signal for stopping the power tool main body 1 from the battery pack 100 side or a signal for stopping an operation of an electric apparatus using a battery pack (not illustrated) as a power source. In order to change the state of the LD terminal 168, the controller 350 switches the gate signal (discharging prohibition signal 341) input to a switching element M41 of a semiconductor from an ordinary low state ("discharging allowed" from the battery pack 100) to a high state ("discharging prohibited" from the battery pack 100). For example, the switching element M41 is a P-type field effect transistor (FET). The drain side is connected to the LD terminal 168, and the source side is subjected to grounding. Accordingly, during a normal time of the switching element M41 (when the discharging prohibition signal 341 is low), the LD terminal 28 is in a high impedance state, and the potential of the LD terminal 28 is substantially equivalent to the voltage of the positive electrode input terminal 22 on the power tool main body 1 side. Meanwhile, when the discharging prohibition signal 341 is switched to a high state in accordance with control from the controller 350, the source-to-drain of the switching element M41 is subjected to grounding due to conduction. Therefore, the potential of the LD terminal 28 on the power tool main body 1 side drops to the ground potential. As a result, due to deterioration in the gate potential of the switching element M101 on the power tool main body 1 side, that is, the partial potential caused by partial resistors R101 and R102, the source-to-drain of the switching element M101 is in a non-conducting state, so that the power circuit of the power tool main body 1 is blocked and rotation of the motor 5 is inhibited. In this manner, since rotation of the motor 5 of the power tool main body 1 can be inhibited in response to the discharging prohibition signal 341 emitted by the controller 350 of the battery pack 100, the controller 350 can quickly stop operation of the power tool or the electric apparatus at the time of occurrence of an event in which power supply from the battery pack 100 has to be halted, for example, an excessive current at the time of discharging, deterioration in cell voltage at the time of discharging (over-discharging), and an abnormal rise of the cell temperature (excessive temperature), so that it is possible to protect not only the battery pack 100 but also the power tool main body 1.

FIG. 20 is a circuit diagram of the battery pack 100 of the present example and is a view illustrating a state where the battery pack 100 is connected to an 18 V power tool main body 1A with a main body side microcomputer. Here, the internal configuration on the battery pack 100 side is completely the same as that illustrated in FIG. 19, and only the configuration on the power tool main body 1A side differs. No microcomputer is included on the power tool main body 1 side illustrated in FIG. 19. However, in recent power tools, the use of a controller 60 having a microcomputer for controlling the motor 5 has increased. The power tool main body 1A includes a power source circuit 61, and the controller 60 is operated using a uniform low voltage (reference voltage VDD2) generated by the power source circuit 61. The controller 60 includes a microcomputer and monitors or controls various states inside the power tool main body 1A using the microcomputer. A switch state detection circuit 63 outputting a high signal or a low signal in accordance with an output of a battery voltage detection circuit 62 and a connection state of a trigger switch 34 is connected to the controller 60. In the present example, a DC motor 35 is provided in a power path between the positive electrode input terminal 22 and the negative electrode input terminal 27, and the operation switch 34 (trigger switch) for turning on and off the rotation of the motor 35 is provided in the circuit thereof. The switching element M101 (semiconductor) and a shunt resistor R111 are inserted between the motor 35 and the negative electrode input terminal 27. For example, the switching element M101 is a field effect transistor (FET), and the gate signal thereof is sent by the controller 60. Both end voltages of the shunt resistor R111 are detected by a current detection circuit 64, and a value thereof is output to the controller 60. In this circuit diagram, the motor 35 is illustrated as a DC motor with a brush. However, a configuration of driving a three-phase brushless motor using a known inverter circuit may be adopted. In such a case, the rotation of the motor 35 may be stopped by connecting the switching element M101 in series in a power path input to an inverter circuit (not illustrated), or causing the controller 60 in place of the switching element M101 to control a switching element (not illustrated) included in an inverter circuit.

The LD terminal 28 of the power tool main body 1A is connected to the controller 60 via a resistor R112. Moreover, the reference voltage VDD2 is connected to the controller 60 side of the resistor R112 via a resistor R113. Therefore, when the LD terminal 28 is in a high impedance state, a voltage close to VDD2 is applied to an input line 65 of the controller 60, and when the LD terminal 28 drops to the ground potential, the partial voltages of the resistors R113 and R112, that is, a voltage drastically lower than the reference voltage VDD2 is transmitted to an input port of the controller 60 through the input line 65. The controller 60 detects a change in the potential of this input line 65, controls the gate signal of the switching element M101, and controls allowance or stoppage of power supply to the motor 35.

In this manner, on the power tool main body 1A side, a circuit for stopping the motor 35 is provided in accordance with a discharging prohibition signal input via the LD terminals 168 and 28. However, when the controller 60 is provided on the power tool main body 1A side, instead of a configuration in which the controller 350 on the battery pack 100 side monitors an overcurrent and stops the motor 5 on the power tool main body 1A side, it is preferable that the controller 60 on the power tool main body 1A side directly monitor an overcurrent using the current detection circuit 64. When the controller 350 on the battery pack 100 side monitors an overcurrent, an average control condition (threshold value for an overcurrent) that can be applied to a plurality of power tool main bodies has to be set. However, when the controller 60 on the power tool main body 1A side monitors an overcurrent, an optimal control condition (high threshold value for an overcurrent) can be set for the power tool main body 1A. Therefore, the controller 350 can avoid output limitation of the power tool due to the set average control condition (low threshold value for an overcurrent). Avoidance of this output limitation is particularly effective for new power tools to be released in the future, and it is possible to realize control in which capability of a new power tool main body 1A is maximized.

In the present example, the controller 350 on the battery pack 100 side determines whether or not the controller 60 having a microcomputer is included on the power tool main body 1 or 1A side where the battery pack 100 is mounted and changes a condition for overload protection on the battery pack 100 side in accordance with a determination result. Specifically, as in FIG. 19, when no microcomputer is included on the power tool main body 1 side, an overcurrent limit value at the time of a low voltage output is set to a threshold value for the power tool main body 1A with no microcomputer, for example, 20 A (default value). A range of this default value may be suitably set in accordance with the capacity or the performance of battery cells to be used. Since this overcurrent limit value is equivalent to a value set for the battery pack 15 in the related art, the power tool main body 1A with no microcomputer in the related art can be driven using the battery pack 100 of the present example. Meanwhile, when a microcomputer is included on the power tool main body 1A side, the overcurrent limit value at the time of a low voltage output is not set for the battery pack 100 side, and the microcomputer of the controller 60 on the power tool main body 1A side takes charge of monitoring an overcurrent value. As a result, the controller 60 can monitor an optimal current along the characteristics of the using motor 5 or the configuration characteristics of the power tool main body 1A and the like, and therefore it is possible to avoid a problem that the capability of the power tool main body 1A may not be able to be effectively exhibited due to excessively limited the overcurrent limit value on the battery pack 100 side. In addition, the power tool main body 1A can maximize the capability of the battery pack 100, and thus a high-output power tool can be realized. In this manner, changing the condition for overload protection on the battery pack 100 side between the low voltage side and a high voltage side denotes that the controller 60 on the power tool main body side can perform overload protection that is optimal for the power tool main body 1A while there is still room for a higher output and further improvement in low voltage power tool main bodies to be newly released in the future.

In order to determine whether or not the controller 60 having a microcomputer is included on the power tool main body 1 or 1A side, an LD terminal voltage detection circuit 328 for detecting a value of a voltage applied to the LD terminal 28 is newly provided inside the battery pack 100. The LD terminal voltage detection circuit 328 is connected to the LD terminal 168 through a connection line 342, and the LD terminal voltage detection circuit 328 outputs an output corresponding to a terminal voltage to the controller 350. The microcomputer included in the controller 350 determines whether or not the controller 60 including a microcomputer is present on the power tool main body side by measuring the LD terminal voltage after the battery pack 100 is mounted and while the discharging prohibition signal 341 is not emitted. In a case of the power tool main body 1 having no microcomputer, as it can be seen from the circuit diagram in FIG. 19, the power tool main body 1 is in a state where a voltage substantially equivalent to that of the positive electrode input terminal 22 is applied to the LD terminal 28. Since the microcomputer of the controller 350 detects a voltage of the upper positive electrode terminal 162 using the upper voltage detection circuit 322, the microcomputer can determine whether or not a microcomputer is included in the power tool main body 1 by comparing the voltage of the upper positive electrode terminal 162 and the LD terminal voltage. Meanwhile, as it can be seen from the circuit diagram in FIG. 20, in a case of the power tool main body 1A having a microcomputer, a voltage substantially equivalent to the reference voltage VDD2 (for example, 5 V or 3.3 V) for driving a microcomputer is applied to the LD terminal 28. Thus, the microcomputer of the controller 350 can easily determine that a microcomputer is included in the power tool main body 1A by only detecting the LD terminal voltage without comparing it with the voltage of the upper positive electrode terminal 162 using the upper voltage detection circuit 322. As described above, since the connection line 342 and the LD terminal voltage detection circuit 328 are provided in the battery pack 100, the controller 350 can easily determine whether a tool is an electronic control supporting tool including a low voltage-driven controller such as a microcomputer on the power tool main body or the electric apparatus main body side, or a non-supporting tool. In addition, the controller 350 can change a control parameter, for example, the overload protection condition for monitoring the battery cells in accordance with determination results. Here, the value for the control parameter to be changed may be stored in advance in a non-volatile memory included in the microcomputer, such that any stored value is read out and set in accordance with the determination results. The LD terminal voltage detection circuit 328 is an example of "a detection unit" and "a second voltage detection unit" in the present disclosure, and the voltage of the LD terminal 168 is an example of "a physical quantity" in the present disclosure.

FIG. 21 is a circuit diagram of a state where the battery pack 100 is mounted in the power tool main body 30 that can support a high load. Regarding a feature point of the power tool main body 30 that can support a high load, the power tool main body 30 has terminals (positive electrode input terminal 52, negative electrode input terminal 57, and terminal portions 59b and 59c of short bar) on the apparatus side respectively corresponding to the positive electrode terminals (162 and 172) and the negative electrode terminals (167 and 177) of the battery pack 100. The short bar 59 is a metal component having the terminal portion 59b on one side and having the terminal portion 59c on the other side. When the battery pack 100 is mounted on the power tool main body 30 side, the lower positive electrode terminal 172 and the lower negative electrode terminal 177 is short-circuited due to the short bar 59. In addition, the positive electrode input terminal 52 of the power tool main body 30 is connected to the upper positive electrode terminal 162, and the negative electrode input terminal 57 is connected to the upper negative electrode terminal 167. In this manner, an output of the upper cell unit 146 and the lower cell unit 147 in series-connection, that is, a rated voltage of 36 V can be obtained using the shapes of two divided main body side terminals. The configuration on the power tool main body 30 side is substantially the same as the internal configuration of the power tool main body 1A illustrated in FIG. 20. A motor 45 is a rated 36 V motor. However, similar to the motor 35 illustrated in FIG. 20, a brushless DC motor may be driven using an inverter circuit. The switching element M101 is provided in series with the power circuit for the motor 45. The ON and OFF state of the switching element M101 is controlled based on the gate signal output from the controller 60. Rotation of the motor 45 is stopped by turning off the switching element M101. In the high voltage power tool main body 30 as well, the procedure of sending out the discharging prohibition signal 341 from the battery pack 100 side is completely the same as those of the circuits illustrated in FIG. 19 and FIG. 20. That is, when the controller 350 on the battery pack 100 side is controlled, the source-to-drain of the switching element M41 is conducted, and when the LD terminal 168 drops to the ground potential, the state is transmitted to the input port of the microcomputer included in the controller 60. Therefore, the controller 60 can detect the state as a discharging prohibition signal from the battery pack 100 side. However, in the 36 V power tool main body 30, discharge prohibited control due to an overcurrent is configured to be performed by the controller 60 on the tool main body side, such that the battery pack 100 side is not involved in monitoring related to an overcurrent, or the threshold value for stoppage due to an overcurrent is sufficiently raised to a value close to the limit value for the battery cells so that the microcomputer of the controller 350 does not have to be practically involved in monitoring the current value. As a result, it is possible to achieve both a higher output of the battery pack 100 and maintenance of compatibility with the battery pack 15 in the related art.

Next, a procedure in which the controller 350 of the battery pack 100 outputs a discharging prohibition signal will be described using FIG. 22. A series of procedures illustrated in FIG. 22 can be executed with software by a microcomputer using a program stored in the controller 350 in advance and can be automatically executed when the battery pack 100 starts up. First, the microcomputer determines whether the upper cell unit 146 and the lower cell unit 147 of the battery pack 100 are in parallel-connection or in series-connection by determining whether the connected power tool main body is a low voltage (18 V) apparatus or a high voltage (36 V) apparatus (Step 371). In a case of series-connection, a parameter for series-connection is set as a control parameter of the controller 350 (Step 372). In addition, in a case of parallel-connection, a control parameter for parallel-connection is set (Step 373). Here, regarding the control parameter, for example, it is conceivable to adopt a current limit value $I_{max}$, a cell voltage upper limit value $V_{max}$ during charging, a cell voltage lower limit value $V_{min}$ during discharging, an upper limit value $T_{max}$ for the cell temperature, and the like. Here, the current limit value $I_{max}$ during discharging at the time of parallel-connection is set to 20 A, and the current limit value $I_{max}$ during discharging at the time of series-connection is not set (no limit value) or is set to a drastically larger value (for example, within a range of approximately 40 to 80 A) than that at the time of parallel-connection. The upper limit value $T_{max}$ for the cell temperature during discharging is 80° C. regardless whether the connection state is series-connection or parallel-connection. The cell voltage lower limit value $V_{min}$ during discharging is 2.5 V/cell regardless whether the connection state is series-connection or parallel-connection.

Next, the microcomputer determines whether a battery cell having the cell voltage lower limit value $V_{min}$ (predetermined value) or smaller is present based on monitoring results of the voltages of the battery cells included in the lower cell unit 147 (Step 374). Here, when the cell voltage lower limit value $V_{min}$ or smaller is present in any battery cell, the process proceeds to Step 378. When all cell voltages are larger than the cell voltage lower limit value $V_{min}$, the microcomputer subsequently determines whether or not the over-discharge signal 305 from the protection IC 300 side is high (Step 375). The presence of a high over-discharge signal denotes that any battery cell in the upper cell unit 146 has the cell voltage lower limit value $V_{min}$ or smaller. Therefore, in such a case, the process proceeds to Step 378. In a case of No in Step 375, the microcomputer determines whether or not a peak current value detected by the current detection circuit 327 is a predetermined threshold value $I_1$ or larger (Step 376). Here, a peak current value I may be detected by simply monitoring a momentary value of a peak current, or an influence of a current protruding in a spire-shaped may be excluded by detecting an average current within time windows that have been divided to a certain extent. In a state where the upper cell unit 146 and the lower cell unit 147 are connected in series, and when the cell current limit value $I_{max}$ is not set, the process skips Step 376 and proceeds to Step 377.

Next, the microcomputer determines whether the battery temperature detected by the cell temperature detection means 331 is a predetermined threshold value $T_1$ or larger (Step 377). Here, thermistors TH1 and TH2 are provided in both the upper cell unit 146 and the lower cell unit 147 and temperatures are measured. When any temperature becomes the threshold value $T_1$ or larger, the process proceeds to Step 378. When both temperatures are smaller than the threshold value $T_1$ in Step 377, the process returns to Step 371. When both temperatures become the threshold value $T_1$ or larger, the microcomputer of the controller 350 sends out the discharging prohibition signal 341 to stop the motors 5, 35, and 45 of the power tool main bodies 1, 1A, and 30 and turns on the switching element M41 such that the LD terminal 168 drops to the ground potential. Thereafter, the process returns to Step 371 (Step 378). The controller 350 can monitor the state of the battery cell, and as necessary, the controller 350 can stop an operation state of the power tool or the electric apparatus in which the battery pack 100 is mounted using the discharging prohibition signal 341, by repeating the foregoing procedure.

Next, a specific circuit configuration of the residual quantity display means 335 and the upper voltage detection circuit 322 of the battery pack 100 will be described using FIG. 23. FIG. 23 illustrates a configuration of the residual quantity display means 335 and a configuration part of the upper voltage detection circuit 322 in detail, and other configurations on the battery pack 100 side are the same as those of the battery pack 100 in FIG. 19 to FIG. 21. The microcomputer of the controller 350 has an input output port group 353, and four input output port thereof are connected to light emitting diodes LD0 to LD3 inside the residual quantity display means 335. In addition, switching elements M0 are provided between the power source voltage VDD1 and each of the light emitting diodes LD0 to LD3 inside the residual quantity display means 335. One input output port IO0 of four input output ports IO0 to IO3 is connected to the gate. In addition, the gate terminal of the switching element M3 is connected to another input output port (IO3) of the four input output ports. The switching element M3 is used for controlling connection or blockage of the source-to-drain of a switching element M4.

Regarding a basic configuration, the upper voltage detection circuit 322 is constituted of resistors R6 and R7, and intermediate potentials thereof are input to an input port AN0 of the controller 350 as a voltage (detection of upper potential voltage) of the upper cell unit 146. The switching element M4 constituted of an FET is interposed between the resistor R6 and the upper positive electrode terminal 162. The gate terminal of the switching element M4 is connected to the drain terminal of the switching element M3 controlled to be turned on and off through the input output port IO3. That is, when the light emitting diode LD3 is turned off, if the input output port IO3 is OFF, the switching element M3 is OFF. Accordingly, the gate potential of the switching element M4 remains high, so that the source-to-drain of the switching element M4 is conducted (ON) and detection of an upper potential voltage is input to the input port AN0 of the microcomputer. An input port group 352 (AN0, AN1, and the like) has an A/D converting function of converting an input analog signal into a digital signal. Meanwhile, when IO3 is increased in order to turn on the light emitting diode LD3, the switching element M3 is in an ON state, so that the gate terminal of the switching element M4 drops to the ground potential. Therefore, the source-to-drain of the switching element M4 is blocked (OFF). In such connection, the controller 350 can detect a voltage of the upper positive electrode terminal 162 using the input port AN0.

As described above, the controller 350 needs total three ports including two input ports AN1 and AN2 for inputting an output of the cell temperature detection means 331 in addition to the input port AN0 for inputting a voltage of the upper positive electrode terminal 162. The cell temperature detection means 331 includes two thermistors including the thermistor TH1 measuring the temperature of the upper cell unit 146 and the thermistor TH2 measuring the temperature of the lower cell unit 147. However, preparing a microcomputer having three input ports AN0 to AN2 for inputting three items including a voltage of the upper positive electrode terminal 162, an output of the thermistor TH1, and an output of the thermistor TH2 leads to increase in cost of the microcomputer and increase in size of the chips. Here, FIG. 24 illustrates a configuration that is devised to cause these three inputs to share one input port AN0.

FIG. 24 is an input/output circuit diagram of a microcomputer 351 inside the controller 350. In FIG. 24, the microcomputer 351 has the input port group 352 and the input output port group 353. The input port group 352 has a function of converting an input analog signal into a digital signal, and one input port AN1 thereof is connected for inputting a signal from the thermistors TH1 and TH2 and an upper voltage detection circuit 322A. The input output port group 353 is an input output port serving as both an input port and an output port. Here, four input output ports IO0 to IO3 are connected to the light emitting diodes (LD0 to LD3), respectively. The switching element M0 for controlling ON/OFF of supplying power (VDD1) to the light emitting diode LD0 to LD3 is connected to the input output port IO0. A resistor R5 is connected to the gate-to-source of the switching element M0, and the switching element M0 and the resistor R5 constitute a switching means 364 controlling ON and OFF of the light emitting diode LD0 to LD3. The input output ports IO1 to IO3 are connected to the light emitting diodes LD1 to LD3 and are connected to the gate terminals of the switching elements M1 to M3, respectively.

In two thermistors TH1 and TH2, one terminal is connected to the reference voltage VDD1 of the microcomputer 351 via a common resistor Ra and the other terminal is connected to the ground via the switching elements M1 and M2. For example, the thermistors TH1 and TH2 are NTC thermistors having characteristics in which the resistance value falls when the temperature rises. The thermistors TH1 and TH2 are disposed in the vicinity of the battery cells such that the microcomputer 351 measures the temperatures of the battery cells. Here, it is favorable that the thermistor TH1 be disposed in the vicinity of the upper cell unit 146 and the thermistor TH2 be disposed in the vicinity of the lower cell unit 147. The switching elements M1 to M3 are semiconductor switches that can electrically switch between ON and OFF. The drain terminal of the switching elements M1 and M2 is connected to the other terminal of TH1 and TH2, and the source terminal is connected to the ground. The drain terminal of the switching element M3 is connected to the upper voltage detection circuit 322A via a resistor Rb, and the source terminal is connected to the ground. The gate terminals of these switching elements M1 to M3 are respectively connected to the input output ports IO1 to IO3 of the microcomputer 351, and the source terminal is subjected to grounding. The grounding resistors R6 to R8 for causing the gate-to-source to be 0 V when the input output ports IO1 to IO3 are opened are provided between the gate terminal and the source terminal of the switching elements M1 to M3, respectively.

Regarding four light emitting diodes LD0 to LD3, diodes having an arbitrary color can be used. Here, green or red diodes are used. In the circuits of the light emitting diodes LD0 to LD3, the resistors R0 to R3 for limiting a current are connected in series. The resistors R0 to R3 having the same resistance value can be used. Here, in the input output port IO0, connection to the gate terminal and connection to the light emitting diode LD0 of the switching element M0 are performed in common. In this manner, the input output port IO0 can be set to either high or low by connecting the switching element M0 and the light emitting diode LD0 to the input output port IO0 in parallel-connection, and a circuit surrounded by the dotted line can be utilized as the switching means 364 for switching between turning on or not turning on all the light emitting diodes LD0 to LD3. When turning on other light emitting diodes LD1 to LD3, they can be turned on by causing the output of the input output ports IO1 to IO3 to be lower (ground potential) in a state where the light emitting diode LD0 is turned on.

In the input output ports IO1 to IO03, when the light emitting diodes LD0 to LD3 are turned off, any one signal of the thermistors TH1 and TH2 and the upper voltage detection circuit 322A is selected and is input to the input port AN1. That is, any one output of the input output ports IO1 to IO3 is switched to be high while the input output port IO0 is low, so that the outputs of the thermistors TH1 and TH2 and the upper voltage detection circuit 322A can be selectively input to the input port AN1. In addition, even when any of the light emitting diodes LD0 to LD3 is turned on, if the signal of the input output port IO0 is in a high impedance state for a period during which the microcomputer 351 acquires the outputs of the thermistors TH1 and TH2 and the upper voltage detection circuit 322A, these outputs can be sequentially input to the input port AN1 in time series. When the outputs are input to this input port AN1, all the light emitting diodes LD0 to LD3 are in an OFF state. However, while being turned off, temperature detection is performed by the thermistors TH1 and TH2, or voltage detection is performed by the upper voltage detection circuit 322A, and then the light emitting diodes LD0 to LD3 return to the ON state again. That is, a procedure is repeated as follows: the light emitting diode is turned off→detection is performed by the thermistor TH1→the light emitting diode is turned off after being turned on again for a certain period of time→detection is performed by the thermistor TH2→the light emitting diode is turned off after being turned on again for a certain period of time→voltage detection is performed by the upper voltage detection circuit 322A→the light emitting diode is turned on again. The time required for temperature detection performed by the thermistors TH1 and TH2 and voltage detection performed by the upper voltage detection circuit 322A is 1 millisecond, for example. If these steps of detection are performed sequentially at intervals of 50 milliseconds, an ON time of 49 milliseconds is present after the OFF time of 1 millisecond. Therefore, three steps of detection including temperature detection performed by the thermistors TH1 and TH2 and voltage detection performed by the upper voltage detection circuit 322A can be completed during 150 milliseconds. At this time, if any of the light emitting diodes LD0 to LD3 is turned on, an OFF state of the light emitting diode of 1 millisecond is included for every 50 milliseconds. However, human eyes feel such an interval of an OFF state the same as a continuous ON state, a temporary OFF state is not a problem.

FIG. 25 is a table showing a corresponding relationship between the input output ports IO0 to IO3 and an output state of each of output apparatuses in FIG. 24. The vertical axis indicates an ON state of the light emitting diode (LED), detection performed by the thermistors TH1 and TH2, and the voltage detection state of the upper voltage detection circuit 322A. Signal levels of the input output port group 353 at the time of detection are indicated in fields 353a and 353b. Here, for example, when the battery capacity is within a range of 25 to 50%, only the light emitting diode LD0 is turned on. When the battery capacity is within a range of 50% to 75%, two light emitting diodes LD0 and LD1 are turned on. When the battery capacity is within a range of 75% to smaller than 100%, three light emitting diodes LD0 to LD2 are turned on. In a case of a fully charged state, four light emitting diodes LD0 to LD3 are turned on. First, control of turning on the light emitting diodes LD0 to LD3 will be described. In order to turn on only the light emitting diode LD0 (LD0: ON), only the input output port IO0 is caused to be low (ground potential) as indicated in the second line of the field 353a, and IO1 to IO3 are caused to be in a high impedance state. In order to turn on two lights, that is, the light emitting diodes LD0 and LD1 (LD0 and LD1: ON), the input output ports IO0 and IO1 are caused to be low as indicated in the third line of the field 353a, and IO2 and IO3 are caused to be in a high impedance state. In order to turn on three lights, that is, the light emitting diodes LD0 to LD2 (LD0, LD1, and LD2: ON), the input output ports IO0 to IO2 are caused to be low as indicated in the fourth line of the field 353a, and only IO3 is caused to be in a high impedance state. In order to turn on all the light emitting diodes LD0 to LD3 (LD0, LD1, LD2, and LD3: ON), all the input output ports IO0 to IO3 are caused to be low as indicated in the fifth line of the field 353a. Through such control, the residual quantity of the battery voltage can be displayed by turning on the light emitting diodes LD0 to LD3. When the input output port IO0 is in a high impedance state as indicated in the field 353a, all the light emitting diodes LD0 to LD3 can be turned off.

When temperature detection is performed by the thermistors TH1 and TH2, as indicated in the field 353b, the input output port IO0 of the input output port group 353 need only be high, and any one corresponding signal level of the thermistors TH1 and TH2 need only be high (VDD1 potential). For example, when detection is performed by the thermistor TH1, if IO1 is turned on (high), the switching element M1 is turned on, and a predetermined voltage is applied to both ends of the thermistor TH1, so that the microcomputer 351 can detect the voltage value of the thermistor TH1 from the input port AN1. When detection is performed by the thermistor TH2, if IO2 is turned on (high), the switching element M2 is turned on, and the microcomputer 351 can detect the voltage value of the thermistor TH2 from the input port AN1. When voltage detection is performed by the upper voltage detection circuit 322A, if the input output port IO0 is caused to be high and IO3 is turned on (high), the switching element M3 is turned on, and the microcomputer 351 can detect the voltage value of the upper voltage detection circuit 322A (upper cell unit 146) from the input port AN1. At this time, the input output ports IO1 and IO2 need to be low. In this manner, the signal of IO0 remains in a high state in any case, and the signal levels of IO1 to IO3 are sequentially switched from a low state to a high state. Even if the input output port IO0 is caused to be in a high impedance state, that is, a turned off state instead of a high state, temperature detection performed by the thermistors TH1 and TH2 and voltage detection performed by the upper voltage detection circuit 322A can be selectively performed. As described above, since a plurality of input signals are input to the input port AN1 in a switching manner using signals of the input output ports IO1 to IO3, only one input port AN1 can be required, and the number of input ports can be reduced.

Example 2

FIG. 26 is a circuit diagram of a battery pack 100A according to a second example of the present disclosure and is a view illustrating a state where the battery pack 100A is connected to the power tool main body 1 in the related art. The battery pack 100A has a rated voltage of 18 V, which cannot be switched. The controller including the microcomputer described in FIG. 19 to FIG. 21 is applied to the voltage-fixed battery pack 100A instead of the voltage switchable battery pack 100. In FIG. 26, the power tool main body 1 indicated on the left side is completely the same as the power tool main body 1 illustrated in FIG. 19. The battery pack 100A has a form in which the upper cell unit 146 and the protection circuit (protection IC 300) that belongs thereto, the current consumption control means 310, the lower positive electrode terminal 172, and the lower negative electrode terminal 177 are removed from the battery pack 100 illustrated in FIG. 19. Here, the same reference sign numbers are applied to the same elements and the same circuits. A cell unit 148 is substantially the same as the lower cell unit 147. However, the upper side and the lower side are not distinguished from each other, and the shape of a separator (not illustrated) holding the battery cells changes. Accordingly, reference signs having different numbers are applied thereto. In the battery pack 15 in the related art, the cell unit 148 is monitored by only the protection IC 320 without providing the controller 350 illustrated in FIG. 26. However, in the present example, the controller 350 having a microcomputer is added by adding the protection IC 320 to the inside of the protection circuit of the battery cell. In this manner, since a protection circuit provided with a microcomputer is employed, on the battery pack 100A side, it is possible to determine whether or not the power tool main body side includes a microcomputer, so that control of the microcomputer on the battery pack 100A side can be changed depending on the presence or absence thereof.

When the battery pack 100A is mounted in the power tool main body 1 and the trigger switch 34 is pushed to be in state where a current flows, the controller 350 returns to the normal mode from the start-up or the sleep state. When starting up to this normal mode, the battery pack 100A measures the voltage of the LD terminal 168 using the LD terminal voltage detection circuit 328. Through this measurement, the controller 350 can detect whether or not the power tool main body 1 includes a microcomputer. When there is a microcomputer, the control parameter is changed. In the example of FIG. 26, the controller 350 determines that the power tool main body 1 has "no microcomputer". Therefore, the control parameter remains to be set for a power tool having no microcomputer, that is, a default value. Similar to that indicated in the first example, this control parameter includes an overcurrent threshold value, an over-discharging voltage value, an upper limit value for the battery cell temperature, and the like.

A current flowing in the cell unit 148 is measured by the microcomputer included in the controller 350 by monitoring both end voltages of the shunt resistor 329 using the current detection circuit 327. As a result of this measurement, when the control parameter for monitoring a current exceeds the overcurrent threshold value, the microcomputer of the controller 350 sets the discharging prohibition signal 341 to be high, such that rotation of the motor 35 is stopped. In this manner, since the current value is monitored by the microcomputer of the controller 350 instead of the protection IC 320, it is possible to perform various control using the microcomputer.

FIG. 27 is a circuit diagram of the battery pack 100A according to the second example of the present disclosure and is a view illustrating a state where the battery pack 100A is connected to the 18 V power tool main body 1A with a microcomputer. In this diagram, the power tool main body 1A illustrated on the left side is completely the same as that illustrated in FIG. 20. In addition, the battery pack 100A illustrated on the right side is completely the same as that illustrated in FIG. 26. Switching of the condition for overload protection in the controller 350 is mainly the current limit value during discharging. When the battery pack 100A is mounted in the power tool main body 1 in the related art having no microcomputer, the controller 350 limits the current limit value $I_{max}$ to approximately 20 A. However, when the power tool main body 1A includes a microcomputer, the current of the power tool main body is monitored by the main body side microcomputer. Therefore, there is no need to provide the current limit value $I_{max}$ set in the controller 350. Thus, the controller 350 is not provided with the current limit value $I_{max}$ or is set to have a current upper limit value (for example, 60 A) that can be drawn out from the cell unit 148. The current upper limit value that can be drawn out is not determined based on the restriction on the power tool main body 1A side but depends on the performance of the battery cell. In this manner, on the battery pack 100A side, since there is no need to limit the capability of the battery pack more than necessary any longer, while supporting the battery packs that can draw out larger current in accordance with improvement in performance of battery cells, the power tool main body 1A side can draw out the capability thereof as much as possible. Furthermore, since current limitation similar to that in the related art is also performed with respect to the power tool main body 1 in the related art, it is possible to realize the battery pack 100A having high compatibility and high reliability. In the second example, switching of the condition for overload protection may be realized by changing the cell temperature detection value, the over-discharging voltage value, and the like without being limited to only the peak current value and the average current value. In addition, overload protection corresponding to computation results may be performed by providing a threshold value for all of these values such that not only overload protection is performed simply by determining whether or not the value has exceeded the threshold value but also utilizing that the controller 350 includes a microcomputer, and by performing computation using these parameters. In this manner, when a computing expression is used, for example, it is possible to perform control in which the threshold value for the over-discharging voltage is increased when the cell temperature is high and the threshold value for the over-discharging voltage is decreased when the cell temperature is low by performing control such that the over-discharging voltage changes between when the cell temperature is high and low. As a result of monitoring of the controller 350, when the power tool needs to be stopped, the discharging prohibition signal 341 is sent out to the switching element M41 from the controller 350, and the source-to-drain of the switching element M41 is conducted. Therefore, the LD terminal 28 on the power tool main body 1A side is in a low level, and rotation of the motor 5 is stopped.

Example 3

FIG. 28 is a perspective view illustrating a battery pack 400 of a third example of the present disclosure. A plurality of connection terminals that are interlocked with terminals of a charging device or a tool main body to be electrically conducted are provided in the battery pack 400. Each of the connection terminals provided herein is constituted of two connection terminal components separated from each other in the up-down direction and has a feature in the shapes of the connection terminal components. The appearance shape of the battery pack 400 is substantially the same as the battery pack 100 illustrated in the first example. The only difference in appearance is that a stepped portion (refer to 115a and 115b in FIG. 12) partially raised on an upper stage surface 415 of an upper casing 410 is not formed, and a depression portion (refer to 111a in FIG. 12) is not formed in the corner portion on the left front side of a lower stage surface 411. A plurality of slots 420 are disposed in a stepped portion at a connection part between the upper stage surface 415 and the lower stage surface 111. However, the width and the size of the slot 420 are substantially equivalent to those of the battery pack 100 in the first example. A raised portion 432 is formed on the rear side on the upper stage surface, and a latch 441 is provided on both right and left sides of the raised portion 432.

Ten battery cells 446 are accommodated inside a lower casing 401. Here, the upper cell unit and the lower cell unit having five battery cells in series-connection are provided, and a rated voltage of 18 V that is an output of the cell units in parallel-connection is output. That is, the battery pack 400 is a voltage-fixed type. Each of the connection terminals constitutes one terminal with two terminal components such as one terminal component on the upper side and another terminal component on the lower side. That is, the charging positive electrode terminal is constituted of an upper positive electrode terminal 461 and a lower positive electrode terminal 471, and these are short-circuited. The discharging positive electrode terminal is constituted of an upper positive electrode terminal 462 and a lower positive electrode terminal 472, and these are short-circuited. Between the upper positive electrode terminal 461 and the lower positive electrode terminal 471, and between the upper positive electrode terminal 462 and the lower positive electrode terminal 472, a self-controlled protector (not illustrated) is connected therebetween.

The negative electrode terminal is constituted of an upper negative electrode terminal 467 and a lower negative electrode terminal 477, and these are connected to each other. In this manner, since one connection terminal is configured to be divided into two connection terminal components, the number of contact parts and the total area with respect to the apparatus side terminal on the power tool main body 1 side increase. Therefore, a problem such as heat generation due to a contact failure easily caused by vibration when the power tool is operated is unlikely to occur, so that the power tool can be stably used for a long period of time and the long-life battery pack 400 can be realized.

In the connection terminals, the signal terminals for transmitting a signal, that is, each of a T terminal set (upper T terminal 464 and lower T terminal 474), a V terminal set (upper V terminal 465 and lower V terminal 475), an LS terminal group (upper LS terminal 466 and lower LS terminal 476), and an LD terminal group (upper LD terminal 468 and lower LD terminal 478) is also constituted of two terminals, and upper and lower terminals are connected to each other and have the same potentials. The upper connection terminals (461 to 462 and 464 to 468) and the lower connection terminals (471 to 472 and 474 to 478) are fixed to a circuit board 450. A battery cell protection IC is mounted in this circuit board 450, but a microcomputer or light emitting diodes for displaying a battery residual quantity is not provided.

FIG. 29 is an enlarged view of a part of the connection terminal in FIG. 28. Both the upper terminal components (465 to 468) and the lower terminal components (476 to 478) have a substantially L-shape in a side view. The leg portions of the upper and lower terminal components are fixed to the circuit board 450 side by side in the mounting direction. This fixing method is a method similar to that in the first example illustrated in FIG. 4 and FIG. 5. The leg portions penetrate the attachment holes of the circuit board 450, and soldering is performed from the rear side of the circuit board 450. In each of the upper terminal components (465 to 468) and the lower terminal components (476 to 478), a fitting portion 478c bent into a substantially V-shape such that a part of a gap between the arm portions on both sides becomes narrow is formed. In the fitting portions in the battery pack in the related art, a substantially V-shaped mountain part is disposed to be orthogonal to the insertion direction of the apparatus side terminal. That is, in the terminal components in the related art, a ridgeline of a substantially V-shaped mountain part (for example, an apex part on the inner surface side of a part indicated in the fitting portion 478c) is configured to vertically extend. However, in the present example, the extending direction of the ridgeline is obliquely formed instead of the up-down direction. Therefore, the length of a contact part of the plate-shaped main body side terminal and the terminal component with respect to the fitting portion can be increased.

FIG. 30(1) is a perspective view illustrating an upper terminal component 480. However, illustration of the leg portions of the upper terminal component 480 is omitted, and only a part positioned on the upper side of the circuit board 450 is illustrated. The upper terminal component 480 is realized by cutting out a flat plate formed of a conductive metal through pressing, bending the cut plate into a U-shape thereafter, and forming a predetermined bent shape in arm portions. Here, a surface that constitutes a U-shaped bottom portion, that is, a bridge portion 482 is folded to become the rear side, and a right side surface 483 and a left side surface 484 are formed on the front side from both right and left sides of the bridge portion 482 extending in the vertical direction. The right side surface 483 and the left side surface 484 are formed to have bilateral plane symmetry, and the right side surface 483 and the left side surface 484 constitute surfaces parallel to each other with a uniform gap. Right and left arm portions 485 and 486 are formed on the front side from the front side of the upper portion of the right side surface 483 and the left side surface 484, and proximal parts of the arm portions 485 and 486, that is, flat surface portions 485*a* and 486*a* constitute parallel surfaces having the right-left direction at the same position as the right side surface 483 and the left side surface 484. Crooked portions 485*b* and 486*b* bent inward are formed on the front side of the flat surface portions 485*a* and 486*a*. The crooked portions 485*b* and 486*b* have a flat surface shape. However, the large folded portion directed outward is disposed such that the ridgeline of its mountain becomes oblique.

Fitting portions 485*c* and 486*c* mountain-folded in a substantially V-shape are formed in front of the crooked portions 485*b* and 486*a*. The fitting portions 485*c* and 486*c* are parts having a shape projected toward the inner side. In the part, when the battery pack 100 is mounted, summit parts on the inner side of the fitting portions 485*c* and 486*c* come into contact with and slide in plate-shaped apparatus side terminals. Therefore, even if they have a substantially V-shape, the peak parts (summit parts) thereof are configured to have the large radius R1 of curvature or a small radius of curvature. This is because electrical contact resistance is reduced by decreasing slide resistance between the apparatus side terminal and the fitting portions 485*c* and 486*c* at the time of sliding and increasing the contact area with respect to the fitting portions 485*c* and 486*c* at the time of non-sliding and being in contact. Guide portions 485*d* and 486*d* for guiding plate-shaped apparatus side terminals to be inserted between the fitting portions 485*c* and 486*c* are connected to the front side of the fitting portions 485*c* and 486*c*. The guide portions 485*d* and 486*d* have a substantially flat surface shape and have a shape expanding in the right-left direction as they go to the front side. Accordingly, tip portions 485*e* and 486*e* of the arm portions 485 and 486 have a shape positioned below the arm portions 485 and 486. In the tip portions 485*e* and 486*e*, rounded corner portions are formed to depict a small radius of curvature.

FIG. 30(2) is a view for describing a positional relationship between the apparatus side terminal and the contact part in the fitting portions 485*c* and 486*c*. Here, only a part of the arm portion 486 on the left side is illustrated. However, the arm portion 485 on the right side has plane symmetry only, and the shape is similar thereto. A width W of the arm portion 486 in the height direction is uniform along the front-rear direction. However, the contact part of the fitting portion 486*c* becomes a position indicated by the bold line. The contact part indicated by this bold line constitutes a linear contact portion or a contact region having a narrow width and a rectangular shape. Regarding the contact part indicated by the bold line, the contact length becomes W/cos θ times with respect to the length (=W) when the fitting portion 486*c* is formed on a vertical line. In this manner, disposition is performed such that the longitudinal direction of the contact portion or the contact region of the fitting portion 486*c* becomes oblique with respect to the mounting direction of the apparatus side terminal on the contact surface with respect to the apparatus side terminal. Therefore, the contact portion or the contact region can be increased, and the contact area with respect to the apparatus side terminal on the power tool main body side can be expanded. As a result, the contact resistance between the apparatus side terminal and the fitting portion 486*c* can be reduced, and heat generation of the terminals caused by increase in contact resistance can be effectively suppressed. In addition, since generation of an arc between the fitting portion 486*c* and the apparatus side terminal can be suppressed, the arm portions 485 and 486 can be prevented from being damaged or fusion-cut. Regarding the upper positive electrode terminals 461 and 462 and the lower positive electrode terminals 471 and 472 constituting the power terminals, similar to the first example, the positive electrode terminals of the upper cell unit 146 and the lower cell unit 147 may be connected to each other, such that it is applied to a battery pack that can be switched between a low voltage side and a high voltage side similar to the first example. In such a case, in the fitting portions of the upper terminal component 200 (refer to FIG. 5) and the lower terminal component 220 (refer to FIG. 5) described in the first example, the shapes of the arm portions and the fitting portions in the third example may be applied.

Regarding the terminals (upper terminal components 464 to 466 and 468 and lower terminal components 474 to 476 and 478 in FIG. 28) for transmitting a signal as well, fitting portions are formed in two stages on the upper and the lower side, and these are configured to have the same potentials such that the same signal flows. However, the upper and lower parts of the signal terminals may be configured to increase the number of transmitting signals by forming the parts to have different potentials and causing the apparatus side terminal on the power tool main body side to be similarly formed in a separated manner. In addition, regarding the terminals for transmitting a signal, since it is less necessary to use terminal components that are completely separated in a vertical direction, the terminals may be formed as terminal components that are vertically coupled to each other. Next, a shape of a vertically coupled terminal component 500 will be described with reference to FIG. 31.

FIG. 31 is a perspective view illustrating a shape of the terminal component 500. However, illustration of the leg portions of the terminal component 500 is omitted, and only a part positioned on the upper side of the circuit board 450 is illustrated. In the terminal component 500, an arm portion piece 506 on the upper side and an arm portion piece 510 on the lower side are formed in an approximately half part on the front side of an arm portion 505 on the right side by forming a cutout groove 508 vertically dividing the arm portion 505. Similarly, an arm portion piece 507 on the upper side and an arm portion piece 511 on the lower side are formed in an approximately half part on the front side of an arm portion 506 on the left side by forming a cutout groove 512 vertically dividing the arm portion 506. In this manner, the terminal component 500 is divided into the arm portion pieces 506 and 507 on the upper side and the arm portion pieces 510 and 511 on the lower side by the cutout grooves 508 and 512. Therefore, in one terminal component 500, a configuration of having two sets of arm portions can be realized, so that it is possible to realize a signal terminal that can retain a favorable fitting state. Fitting portions (506*c* and 507*c*) and fitting portions (510*c* and 511*c*) to be fitted into a plate-shaped main body side connection terminal are respectively formed in the terminal set (506 and 507) on the upper side and the terminal set (510 and 511) on the lower side (here, the fitting portions 506c and 510c are not shown in FIG. 31). In the fitting portions (506c and 507c) on the upper side, the longitudinal direction of the contact portion or the contact region is obliquely disposed. In a similar manner, in the fitting portions (510c and 511 c) on the lower side, the longitudinal direction of the contact portion or the contact region is obliquely disposed. The longitudinal directions of the contact portion or the contact region of the fitting portions on the upper side and the lower side are disposed to be arranged in a row. The fitting portions on the upper side and the lower side are disposed to be at the same positions when viewed in the front-rear direction. The longitudinal directions of the contact portion or the contact region of the fitting portions on the upper side and the lower side may be disposed not to be arranged in a row. In addition, the directions of inclinations in the longitudinal directions of the fitting portions on the upper side and the lower side may be the opposite directions without being aligned. For example, the shape of the arm portion set (506 and 507) on the upper side may be changed to realize a shape that is obtained by vertically inverting the terminal set (510 and 511) on the lower side, that is, the shape having plane symmetry with respect to the horizontal surface. As described above, when the longitudinal direction of the contact region of the fitting portion is formed in an oblique direction instead of the vertical direction, compared to an example in the related art in which the fitting portion is orthogonal to the mounting direction, the length of the fitting portion can be increased. Therefore, contact resistance can be reduced.

Hereinabove, in the third example, the shapes of the connection terminals (480 and 500) used in a voltage-fixed battery pack have been described. However, the shapes of these terminals may be configured to be applied to a voltage switchable battery pack as in the first example. For example, the signal terminal component 240 illustrated in FIG. 9 may employ the way of disposing the fitting portions of the terminal component 500 illustrated in FIG. 31.

Hereinabove, the present disclosure has been described based on the examples. However, the present disclosure is not limited to the examples described above, and various changes can be made within a range not departing from the gist thereof. For example, in the example described above, an 18 V/36 V voltage switchable battery pack has been described. However, the switchable voltage ratio is not limited thereto only, and other voltage ratios that can be switched by a combination of series-connection and parallel-connection may be adopted.

The invention claimed is:

1. A battery pack comprising:
a plurality of cell units that is switchable between an output of series-connection and an output of parallel-connection, wherein each cell unit of the plurality of cell units comprises a plurality of battery cells connected in series,
a plurality of protection circuits wherein each protection circuit that monitors a state of the battery cells is provided for every cell unit, and
a microcomputer, wherein signals of the plurality of protection circuits are input to the microcomputer, the plurality of cell units comprise a lower cell unit that is positioned on a ground side when the plurality of cell units are connected in series, and the microcomputer is connected to one protection circuit of the plurality of protection circuits that is provided in the lower cell unit.

2. The battery pack according to claim 1, further comprising:
a power source circuit that generates a power for driving the microcomputer,
wherein the power source circuit generates the power from an output of the lower cell unit.

3. The battery pack according to claim 1, further comprising:
an adjustment circuit, configured for balancing a total power consumption of the protection circuit including the microcomputer in the lower cell unit and a power consumption of the protection circuits in the cell units other than the lower cell unit,
wherein the adjustment circuit is provided on a side of the cell units other than the lower cell unit.

4. The battery pack according to claim 1,
wherein a condition for an overload protection is changed depending on whether the plurality of cell units are connected in series or connected in parallel.

5. The battery pack according to claim 1,
wherein a condition for an overload protection is changed depending on whether a main body side microcomputer is included or the main body side microcomputer is not included on an electric apparatus main body side on which the battery pack is mounted.

6. A battery pack comprising:
at least a first cell unit and a second cell unit as cell units in which each cell unit comprises a plurality of battery cells that are connected in series,
wherein the cell units are configured to be switched between a series-connection state and a connection state other than the series-connection state, in the series-connection state the first cell unit and the second cell unit are connected to each other in series while the first cell unit is connected to a higher voltage side than the second cell unit,
wherein the battery pack includes
a controller that is directly or indirectly connected to at least one of the first cell unit and the second cell unit and is configured to monitor a state of the battery cells constituting the first cell unit and a state of the battery cells constituting the second cell unit and to be able to output a control signal for controlling a discharging of the battery pack,
a power source circuit that is connected to the controller and is configured to be able to supply a power source voltage to the controller, and
a casing that accommodates the first cell unit, the second cell unit, the controller, and the power source circuit and is configured to be able to connect the battery pack to an electric apparatus main body, and
wherein the power source circuit is configured to be connected to one of the first cell unit and the second cell unit, the controller is configured to be connected to the power source circuit and a negative electrode of the one of the first cell unit and the second cell unit, and the power source circuit is configured to generate the power source voltage from a voltage input from the one of the first cell unit and the second cell unit and to supply the power source voltage to the controller.

7. The battery pack according to claim 6,
wherein the power source circuit is configured to be connected to the second cell unit such that the power source voltage is supplied from the second cell unit to the controller via the power source circuit.

8. The battery pack according to claim 6, further comprising:
- a detection unit that is connected to the controller,
- wherein the detection unit is configured to detect a physical quantity related to the battery pack or the electric apparatus main body connected to the battery pack and to output an information of the physical quantity to the controller.

9. The battery pack according to claim 8, further comprising:
- a first voltage detection unit as the detection unit connecting an other of the first cell unit and second cell unit and the controller to each other,
- wherein the first voltage detection unit is configured to output an information of a voltage of the other of the first cell unit and second cell unit to the controller as the physical quantity.

10. The battery pack according to claim 6,
- wherein the controller is configured to control a discharging or a charging of the battery pack in accordance with the connection state of the cell units.

11. The battery pack according to claim 8, further comprising:
- a second voltage detection unit as the detection unit configured to be able to be connected to a terminal of the electric apparatus main body,
- wherein the second voltage detection unit is configured to output an information of a voltage input from the terminal of the electric apparatus main body to the controller as the physical quantity.

12. The battery pack according to claim 6,
- wherein the controller is configured to control a discharging or a charging of the battery pack in accordance with a kind of the electric apparatus main body connected to the battery pack.

13. An electric apparatus comprising:
- the battery pack according to claim 1; and
- at least a first electric apparatus main body as an electric apparatus main body that is able to be connected to the battery pack,
- wherein when the battery pack is connected to the first electric apparatus main body, the battery pack is in a series-connection state in which the plurality of cell units are connected to each other in series, and
- wherein when the battery pack is not connected to the first electric apparatus main body, the battery pack is in a non-connection state in which the plurality of cell units are electrically independent from each other.

14. An electric apparatus comprising:
- the battery pack according to claim 1; and
- at least a second electric apparatus main body as an electric apparatus main body that is able to be connected to the battery pack,
- wherein when the battery pack is connected to the second electric apparatus main body, the battery pack is in a parallel-connection state in which the plurality of cell units are connected to each other in parallel, and
- wherein when the battery pack is not connected to the second electric apparatus main body, the battery pack is in a non-connection state in which the plurality of cell units are electrically independent from each other.

15. An electric apparatus comprising:
- the battery pack according to claim 6; and
- at least a first electric apparatus main body as an electric apparatus main body that is able to be connected to the battery pack,
- wherein when the battery pack is connected to the first electric apparatus main body, the battery pack is in a series-connection state in which the first cell unit and the second cell unit are connected to each other in series, and
- wherein when the battery pack is not connected to the first electric apparatus main body, the battery pack is in a non-connection state in which the first cell unit and the second cell unit are electrically independent from each other.

16. An electric apparatus comprising:
- the battery pack according to claim 6; and
- at least a second electric apparatus main body as an electric apparatus main body that is able to be connected to the battery pack,
- wherein when the battery pack is connected to the second electric apparatus main body, the battery pack is in a parallel-connection state in which the first cell unit and the second cell unit are connected to each other in parallel, and
- wherein when the battery pack is not connected to the second electric apparatus main body, the battery pack is in a non-connection state in which the first cell unit and the second cell unit are electrically independent from each other.

* * * * *